(12) United States Patent
Okamoto et al.

(10) Patent No.: US 7,395,245 B2
(45) Date of Patent: Jul. 1, 2008

(54) CONTENT USAGE MANAGEMENT SYSTEM AND SERVER USED IN THE SYSTEM

(75) Inventors: Ryuichi Okamoto, Moriguchi (JP); Katsumi Tokuda, Minoh (JP); Kouji Miura, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 591 days.

(21) Appl. No.: 10/161,673

(22) Filed: Jun. 5, 2002

(65) Prior Publication Data
US 2003/0061165 A1  Mar. 27, 2003

(30) Foreign Application Priority Data
Jun. 7, 2001 (JP) .............................. 2001-172000

(51) Int. Cl.
*H04L 9/32* (2006.01)
(52) U.S. Cl. .............................. 705/59; 705/51; 726/29
(58) Field of Classification Search ............ 705/50–52, 705/59; 726/26, 29
See application file for complete search history.

(56) References Cited

U.S. PATENT DOCUMENTS

| 5,337,357 | A | * | 8/1994 | Chou et al. | .................. 705/56 |
| 5,671,412 | A | * | 9/1997 | Christiano | ............... 707/104.1 |
| 5,892,900 | A | * | 4/1999 | Ginter et al. | .................. 726/26 |
| 5,949,876 | A | | 9/1999 | Ginter et al. | |

(Continued)

FOREIGN PATENT DOCUMENTS

EP   1 081 575   3/2001

(Continued)

OTHER PUBLICATIONS

"RioPort Launches Beta Version of Next Generation Audio Manager Software for Simple, No-hassle Access to the World of Downloadable Audio". Business Wire. Mar. 13, 2000.*

(Continued)

*Primary Examiner*—Andrew J. Fischer
*Assistant Examiner*—Joshua Murdough
(74) *Attorney, Agent, or Firm*—Wenderoth, Lind & Ponack, L.L.P.

(57) ABSTRACT

A content usage management system includes a terminal device using content as digital production and a server device managing usage of the content on the terminal device. The server device includes a license information memory unit that memorizes license information indicating a usage rule of the content based on a user of the terminal device, and a license ticket issuance unit that generates a license ticket as right information indicating a part or all of a usage rule on the license information corresponding to the user based on a request from the user. The terminal device includes a requesting unit that requests usage of the content to the server device according to the user's designation, a receiving unit that receives the license ticket sent from the server device, and a content usage control unit that controls usage of the content according to the usage rule indicated on the received license ticket. The requesting unit makes a request by sending expected information indicating content to be requested and a usage volume of the content, and the license ticket issuance unit generates a license ticket according to the expected information sent from the requesting unit and sends the license ticket to the terminal device.

8 Claims, 54 Drawing Sheets

U.S. PATENT DOCUMENTS

| | | | |
|---|---|---|---|
| 5,968,175 A | 10/1999 | Morishita et al. | |
| 6,073,124 A | 6/2000 | Krishnan et al. | |
| 6,169,976 B1 * | 1/2001 | Colosso | 705/59 |
| 6,810,389 B1 * | 10/2004 | Meyer | 705/59 |
| 6,873,975 B1 | 3/2005 | Hatakeyama et al. | |
| 7,096,268 B1 | 8/2006 | Shoda et al. | |

FOREIGN PATENT DOCUMENTS

| | | |
|---|---|---|
| GB | 2 316 503 | 2/1998 |
| JP | 7-319691 | 12/1995 |
| JP | 10-222063 | 8/1998 |
| JP | 10-333901 | 12/1998 |
| JP | 2000-293439 | 10/2000 |
| JP | 2001-142472 | 5/2001 |
| WO | 00 42555 | 7/2000 |
| WO | 00/58811 | 10/2000 |
| WO | 00/58962 | 10/2000 |

OTHER PUBLICATIONS

U.S. Appl No. 10/060,351, by Akio Hagashi et al., entitled "*Content Usage Management System and Content Usage Management Method*".

Kaplan Marc A., entitled *IBM Cryptolopes™, Superdistribution and Digital Rights Management* IBM Cryptolopes, Superdistribution and Digital Rights Management, Dec. 30, 1996.

\* cited by examiner

Fig.8

| Details of reproduction right \ Details of terminal capability information | Reproduction is available ∞ times | Reproduction is available plural times | Reproduction is available 1 time |
|---|---|---|---|
| License information: available reproduction number of times is 1 only | License information: available reproduction number of times is 1 is to be generated | License information: available reproduction number of times is 1 is to be generated | License information: available reproduction number of times is 1 is to be generated |
| License information: available reproduction number of times is 1 and License information: available reproduction number of times is ∞ | License information: available reproduction number of times is ∞ is to be generated | License information: available reproduction number of times is 1 is to be generated | License information: available reproduction number of times is 1 is to be generated |
| License information: available reproduction number of times is N and License information: available reproduction number of times is ∞ | License information: available reproduction number of times is ∞ is to be generated | License information: available reproduction number of times is N is to be generated | License information: available reproduction number of times is 1 is to be generated |

Fig. 10

| Details of reproduction right / Details of terminal capability information | Reproduction is available ∞ times | Reproduction is available plural times | Reproduction is available 1 time |
|---|---|---|---|
| Connection frequency: continuous connection | License information: available reproduction number of times is 1 is to be generated | License information: available reproduction number of times is 1 is to be generated | License information: available reproduction number of times is 1 is to be generated |
| Connection frequency: once a day | License information: available reproduction number of times is N is to be generated | License information: available reproduction number of times is 1 is to be generated | License information: available reproduction number of times is 1 is to be generated |
| Connection frequency: once a week | License information: available reproduction number of times is ∞ is to be generated | License information: available reproduction number of times is N is to be generated | License information: available reproduction number of times is 1 is to be generated |

Fig. 11

| Details of reproduction right / Details of terminal capability information | Reproduction is available ∞ times | Reproduction is available plural times | Reproduction is available 1 time |
|---|---|---|---|
| Connection cost: ~xxx yen | License information: available reproduction number of times is 1 is to be generated | License information: available reproduction number of times is 1 is to be generated | License information: available reproduction number of times is 1 is to be generated |
| Connection cost: xxx yen~ | License information: available reproduction number of times is ∞ is to be generated | License information: available reproduction number of times is N is to be generated | License information: available reproduction number of times is 1 is to be generated |

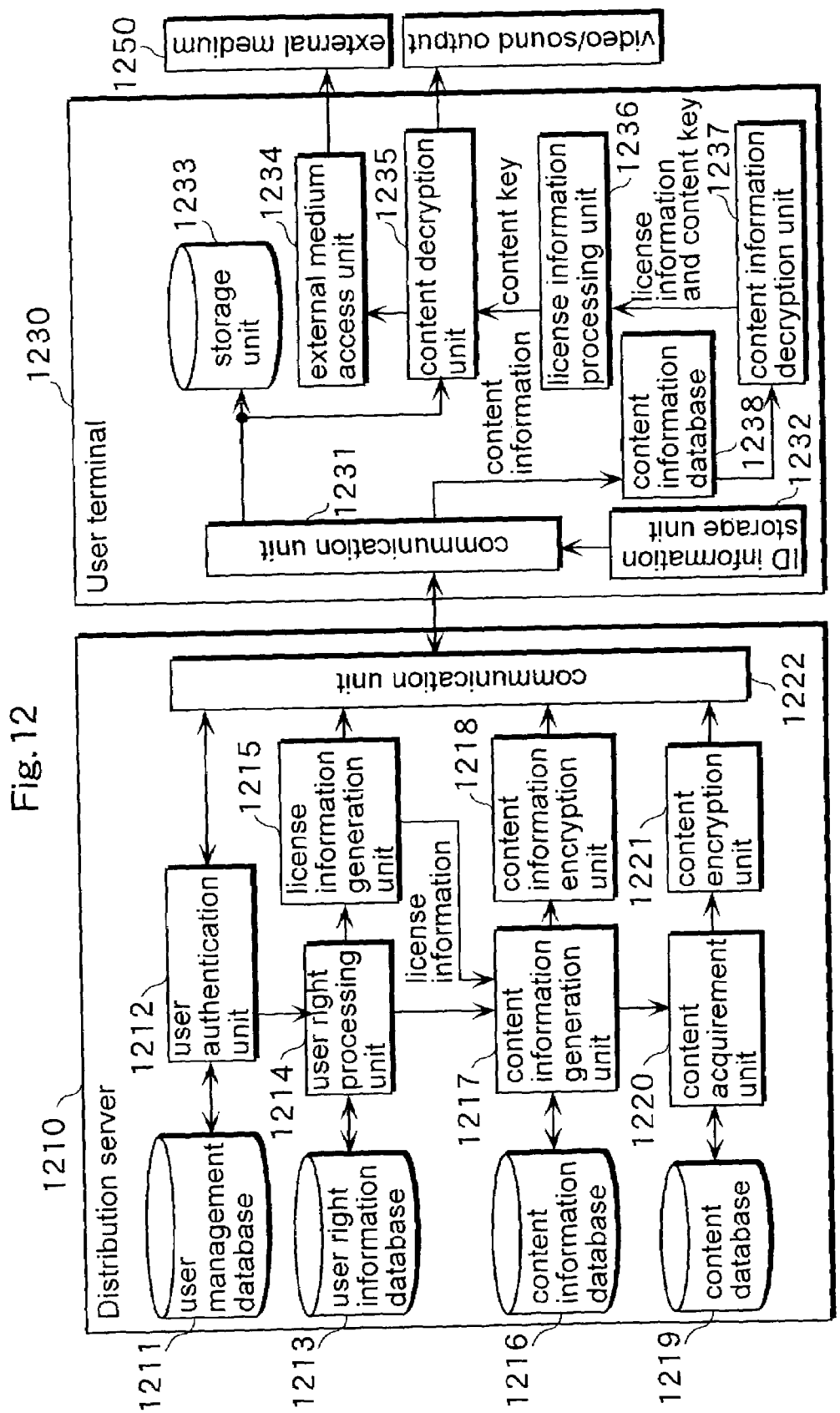

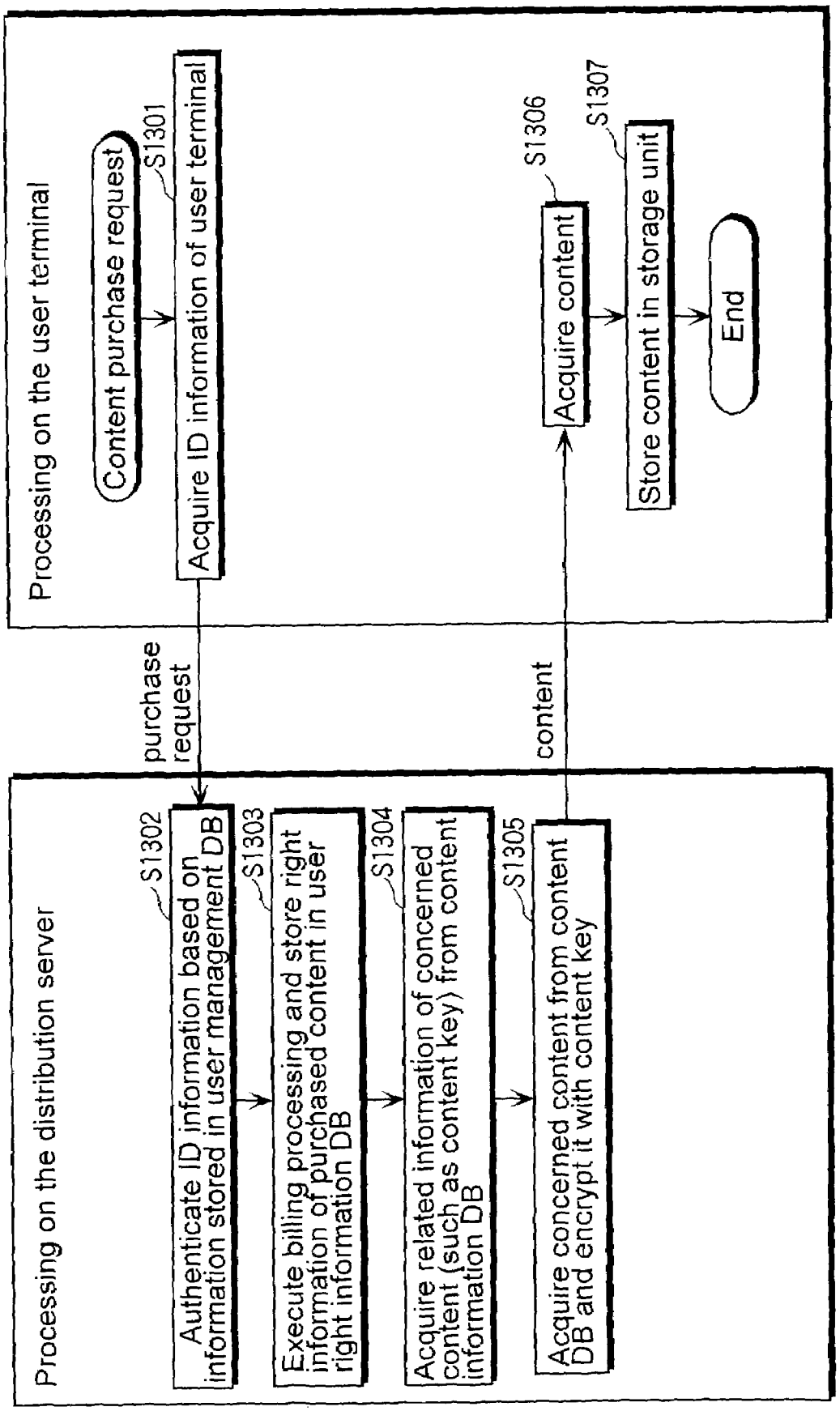

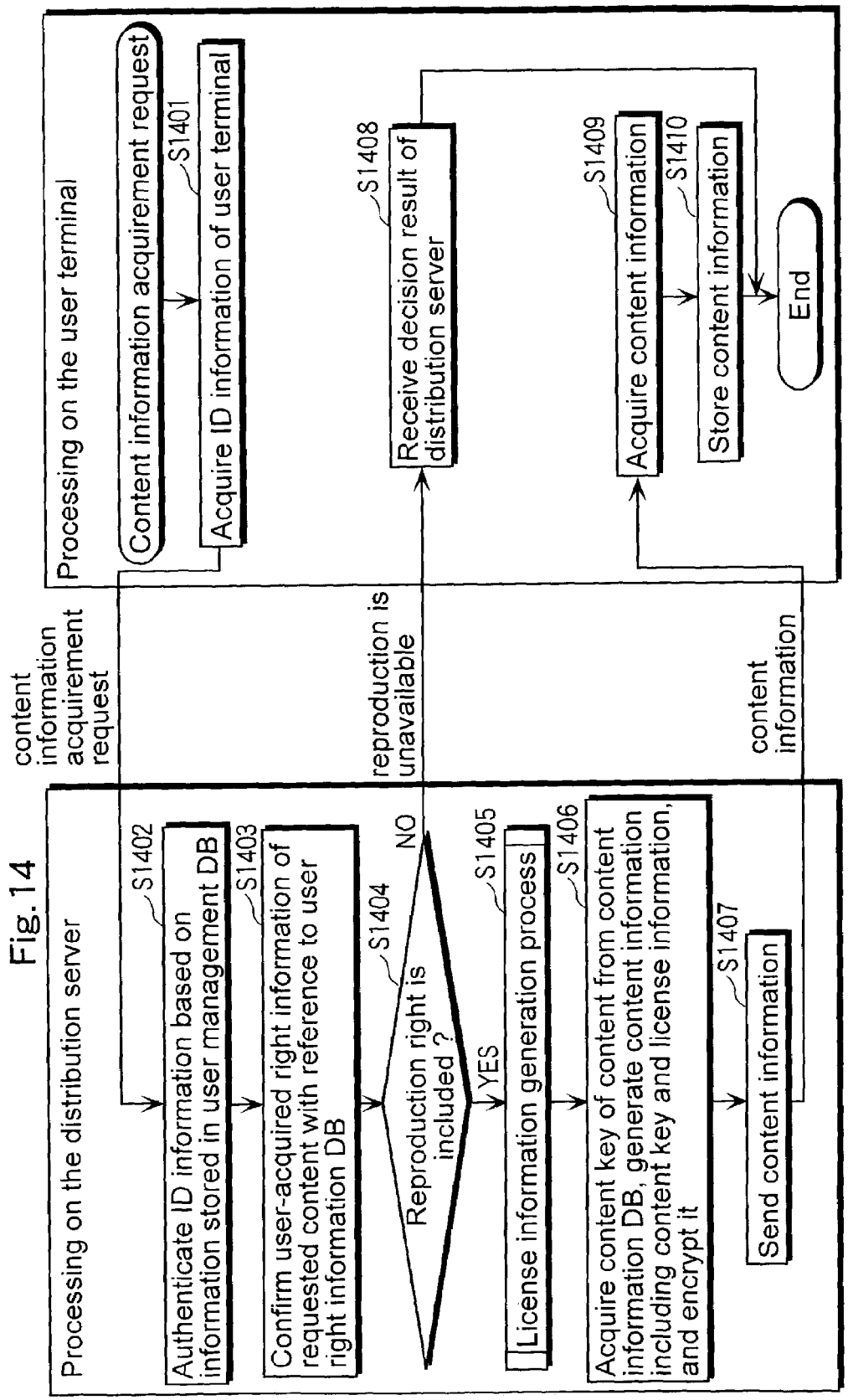

Fig. 16

| Details of reproduction right \ Information on service type | Reproduction is available ∞ times | Reproduction is available plural times | Reproduction is available 1 time |
|---|---|---|---|
| Movie distribution service | License information: available reproduction number of times is 1 is to be generated | License information: available reproduction number of times is 1 is to be generated | License information: available reproduction number of times is 1 is to be generated |
| Music distribution service | License information: available reproduction number of times is ∞ is to be generated | License information: available reproduction number of times is N is to be generated | License information: available reproduction number of times is 1 is to be generated |

Fig. 18

| Details of reproduction right / Information on service type | Reproduction is available ∞ times | Reproduction is available plural times | Reproduction is available 1 time |
|---|---|---|---|
| New | License information: available reproduction number of times is 1 is to be generated | License information: available reproduction number of times is 1 is to be generated | License information: available reproduction number of times is 1 is to be generated |
| Nearly new | License information: available reproduction number of times is N is to be generated | License information: available reproduction number of times is N is to be generated | License information: available reproduction number of times is 1 is to be generated |
| Old | License information: available reproduction number of times is ∞ is to be generated | License information: available reproduction number of times is N is to be generated | License information: available reproduction number of times is 1 is to be generated |

Fig. 23

| Details of reproduction right / Information on user reliability | Reproduction is available ∞ times | Reproduction is available plural times | Reproduction is available 1 time |
|---|---|---|---|
| Payment method: cash payment for a bill | License information: available reproduction number of times is 1 is to be generated | License information: available reproduction number of times is 1 is to be generated | License information: available reproduction number of times is 1 is to be generated |
| Payment method: credit card | License information: available reproduction number of times is ∞ is to be generated | License information: available reproduction number of times is N is to be generated | License information: available reproduction number of times is 1 is to be generated |

Fig. 25

| Details of reproduction right / Information on user reliability | Reproduction is available ∞ times | Reproduction is available plural times | Reproduction is available 1 time |
|---|---|---|---|
| Status: platinum member | License information: available reproduction number of times is ∞ is to be generated | License information: available reproduction number of times is N is to be generated | License information: available reproduction number of times is 1 is to be generated |
| Status: silver member | License information: available reproduction number of times is N is to be generated | License information: available reproduction number of times is 1 is to be generated | License information: available reproduction number of times is 1 is to be generated |
| Status: ordinary member | License information: available reproduction number of times is 1 is to be generated | License information: available reproduction number of times is 1 is to be generated | License information: available reproduction number of times is 1 is to be generated |

Fig. 30

User Information Table 50

| Terminal ID | User ID | |
|---|---|---|
| ×××111 | ×××AAA | |
| ×××222 | | |
| ×××333 | ×××BBB | |
| | | |

Fig.31

Usage Right Management Table 60

| User ID (60A) | UR-Us (60B) |
|---|---|
| ×××AAA | For Surfer George |
|  | For Kyojien |
|  | ⋮ |
| ×××BBB | For Spider Girl |
|  | ⋮ |
|  |  |

# CONTENT USAGE MANAGEMENT SYSTEM AND SERVER USED IN THE SYSTEM

BACKGROUND OF THE INVENTION (1) Field of the Invention

The present invention relates to a content usage management system that distributes license information, which allows a user who requests usage of a content to use the content on the user's terminal under a certain usage rule, via a communication network from a management device.

(2) Description of the Prior Art

In recent years, systems that distribute some digital productions such as music, videos and games via the Internet or digital broadcasting have been developed, and a part of them is now in a phase for practical use. For distributing these contents, the methodology of content usage control, which restricts the number of times of reproduction (play/playback), moving and copying of the distributed content, have also been examined from a viewpoint of copyright protection, etc. The conventional digital content distribution systems, as disclosed in the Japanese Laid-Open Patent Application Nos. 2000-48076 and 2000-293439, have been modeled to distribute a usage rule of the content for each user together with the content itself to a recipient side to make everything be managed by a user terminal side.

For example, when a user wants to purchase a right to see the movie "Matrix" three times, the user terminal receives the content of the movie together with its usage rule indicating, "Matrix can be viewed three times" via communication from a distribution server, and the reproduction of the content is under the management according to the usage rule. Once the above-mentioned usage rule is sent to the user terminal, the distribution server is no longer involved with the usage rule of the user.

When "Matrix" is viewed by reproducing the content stored in the user terminal, a process to reduce by one is executed for each viewing of the content from the number of views permitted in the usage rule that is managed by the user terminal. Then, a process is executed to prohibit any views when the number of views permitted becomes zero.

FIG. 1 shows a structure of the conventional digital content distribution system.

A distribution server 110 is equipped with a user management database 111 that stores ID information, etc. of the user registered as a member, a content information database 116 that stores a usage rule of a content, a content database 119 that stores a content, a user authentication unit 112 that executes user authentication, a content information generation unit 117 that generates content information including information on a usage rule of a content and an encryption key, a content information encryption unit 118 that encrypts the content information, a content acquirement unit 120 that acquires the content which is specified from the content database 119, a content encryption unit 121 that encrypts a content, and a communication unit 122 that communicates with a user terminal 130.

On the other hand, the user terminal 130 is equipped with a communication unit 131 that communicates with the distribution server 110, an ID information storage unit 132 that stores ID information, a storage unit 133 that stores the encrypted content, a content information decryption unit 137 that decrypts the content key and usage rule from the received content information, a usage rule management unit 138 that manages the usage rule and the content key of the content, a usage rule processing unit 139 that performs processing for judging whether or not the usage rule is met when the content is reproduced, and a content decryption unit 135 that decrypts the content with the content key acquired from the usage rule processing unit 139 when the usage rule is met.

FIG. 2 shows a processing flow in the case where the user terminal 130 purchases a content from the distribution server 110 in this digital content distribution system. When a user requests to purchase a content, the distribution server 110 and the user terminal 130 perform the following processing.

S201: The communication unit 131 in the user terminal 130 acquires ID information of the user terminal 130 which is stored in the ID information storage unit 132, and sends this ID information with the content purchase request to the distribution server 110.

S202: The user authentication unit 112 receiving this information through the communication unit 122 on the distribution server 110 collates the received ID information with the ID information stored in the user management database 111 to execute user authentication, and then passes the content purchase request to the content information generation unit 117.

S203: The content information generation unit 117 executes billing processing for the content purchase, acquires the usage rule and the content key information of the purchased content from the content information database 116, and then passes the content key with the information of the purchased content to the content acquirement unit 120. Also, the content information generation unit 117 generates the content information including information of the usage rule and content key, and passes the content information to the content information encryption unit 118. The content information encryption unit 118 then encrypts the content information.

S204: The content acquirement unit 120 acquires the relevant content from the content database 119, and the content encryption unit 121 encrypts this content with the content key. The communication unit 122 on the distribution server 110 sends the encrypted content and the encrypted content information to the user terminal 130.

S205: The communication unit 131 in the user terminal 130 receives (1) the encrypted content and (2) the encrypted content information including the content key and usage rule information, and S206: sends the encrypted content to the storage unit 133 to be stored.

S207: The encrypted content information is also sent to the content information decryption unit 137. The content information decryption unit 137 decrypts the encrypted content information, takes out the content key and usage rule, and stores them in the usage rule management unit 138.

FIG. 3 shows a processing flow in the case where the user terminal 130 reproduces a content in this digital content distribution system. When the user requests to reproduce the content, the user terminal 130 performs the following processing.

S301: The usage rule processing unit 139 acquires the usage rule and content key for the relevant content being managed in the usage rule management unit 138, and S302: checks the reproduction number of times (how many times the content is permitted to be reproduced) in the usage rule.

S303: If it is judged that the reproduction number of times is larger than 0,

S304: the reproduction number of times in the usage rule is decremented, and

S305: the usage rule is stored in the usage rule management unit 138.

S306: The content decryption unit 135 acquires the relevant content from the storage unit 133, and S307: decrypts the content with the content key passed from the usage rule processing unit 139, and reproduces the content.

When the reproduction number of times is judged not to be larger than 0 in Step S303, it terminates the reproduction process.

In order to avoid any leaks of confidential information, the ID information storage unit 132, the content information decryption unit 137 and the usage rule management unit 138 that handle the confidential information are generally realized in a security module such as an IC card, and this security module is loaded to the user terminal 130. In this case, when the information of the usage rule and content key is transferred to the usage rule processing unit 139 from the usage rule management unit 138, this information is encrypted and outputted from the security module. In addition, when the usage rule updated by the usage rule processing unit 139 is stored in the usage rule management unit 138, the updated usage rule is encrypted once again for sending out to the security module. In the conventional digital content distribution system, the usage rule of the content for each user is managed in such a way at the user terminal side.

However, when the usage rule for each user is entirely managed at the user terminal, a complex management scheme of the usage rule is necessary for the user terminal. Although such a function does not put a big load on the user terminal that can easily perform a complex processing like a PC, it can be a heavy load for portable equipment such as a mobile phone or a home appliance.

SUMMARY OF THE INVENTION

The present invention is available to solve these conventional problems. Accordingly, an object of the present invention is to provide a content usage management system that allows the distribution server to control usage of a content on a user terminal in a reliable and most desirable manner so as to reduce a load on the user terminal.

In order to achieve the above-mentioned object, the content usage management system according to the present invention comprises a terminal device using content as a digital production and a server device managing usage of the content on the terminal device. The server device includes: a license information memory unit operable to memorize license information indicating a usage rule of the content based on a user who uses the terminal device; and a license ticket issuance unit operable to generate a license ticket as right information indicating a part or all of a usage rule indicated by the license information corresponding to the user, and send the license ticket to the terminal device based on a request from the user. The terminal device includes: a requesting unit operable to request content usage to the server device according to a designation of the user; a receiving unit operable to receive the license ticket sent from the server device; and a content usage control unit operable to control content usage according to the usage rule indicated by the received license ticket. The requesting unit makes a request by sending expected information indicating content to be requested and a usage volume of the content to the server device, and the license ticket issuance unit generates the license ticket according to the expected information sent from the requesting unit and sends the license ticket to the terminal device.

According to this structure, it is possible to optimize the details of the license information which is to be sent from the distribution server device to the user terminal, in accordance with the usage volume directed by the user. Therefore, the content usage on the usage terminal can be controlled in a reliable and most desirable manner, and a load on the user terminal can be reduced.

Note that, in the present specification, "usage (use)" of a content includes all operations for using the content such as "reproduction (play)", "moving" and "copying" of the content and "printing" of the content for an electronic book.

The content usage management system may comprise a terminal device and a server device managing usage of digital content on the terminal device, wherein the server device manages a usage rule of a user in a dynamic manner, generates a part or all of the usage rule as license information and sends the license information to the terminal device; and the terminal device controls content usage based on the received license information.

According to this structure, it is possible to optimize the details of the license information which is to be sent from the distribution server to the user terminal at the distribution server side, in accordance with the capability of the user terminal, service type, user reliability, and so on.

Note that the present invention can be realized as the server device and the terminal device included in the content usage management system, a content usage management method including characteristic steps that are executed on the server device and the terminal device, or a program that causes a personal computer or the like to execute these steps. It is needless to say that the program can be widely distributed via a recording medium such as a DVD and a transmission medium such as the Internet.

BRIEF DESCRIPTION OF THE DRAWINGS

These and other objects, advantages and features of the present invention will become more apparent from the following detailed description when taken in conjunction with the accompanying drawings that illustrate specific embodiments of the present invention. In the Drawings:

FIG. 8 is a diagram that shows a sample of a license information generation rule in the digital content distribution system according to the first embodiment.

FIG. 10 is a diagram that shows a sample of the license information generation rule in the digital content distribution system according to the first embodiment.

FIG. 11 is a diagram that shows a sample of the license information generation rule in the digital content distribution system according to the first embodiment.

FIG. 12 is a block diagram that shows a structure of the digital content distribution system according to the second embodiment of the present invention.

FIG. 13 is a flow chart that shows the processing which is executed when a content is purchased in the digital content distribution system according to the second embodiment.

FIG. 14 is a flow chart that shows the processing which is executed when content information is acquired in the digital content distribution system according to the second embodiment.

FIG. 16 is a diagram that shows a sample of a license information generation rule in the digital content distribution system according to the second embodiment.

FIG. 18 is a diagram that shows a sample of the license information generation rule in the digital content distribution system according to the second embodiment.

FIG. 23 is a diagram that shows a sample of a license information generation rule in the digital content distribution system according to the third embodiment.

FIG. 25 is a diagram that shows a sample of the license information generation rule in the digital content distribution system according to the third embodiment.

FIG. 30 is a diagram that shows a sample structure of a user information table held in the user information database indicated in FIG. 27.

FIG. 31 is a diagram to show a sample structure of a usage right management table held in the usage right database indicated in FIG. 27.

FIG. 48 is a flow chart to show the content reproduction process which is executed in the client and the rendering plug-in.

FIG. 52 is a flow chart to show the content writing process which is executed in the client and the storage plug-in.

DETAILED DESCRIPTION OF THE PREFERRED EMBODIMENTS

The following is a detailed explanation of the digital content distribution system according to the embodiments of the present invention.

The First Embodiment

Figure 1:
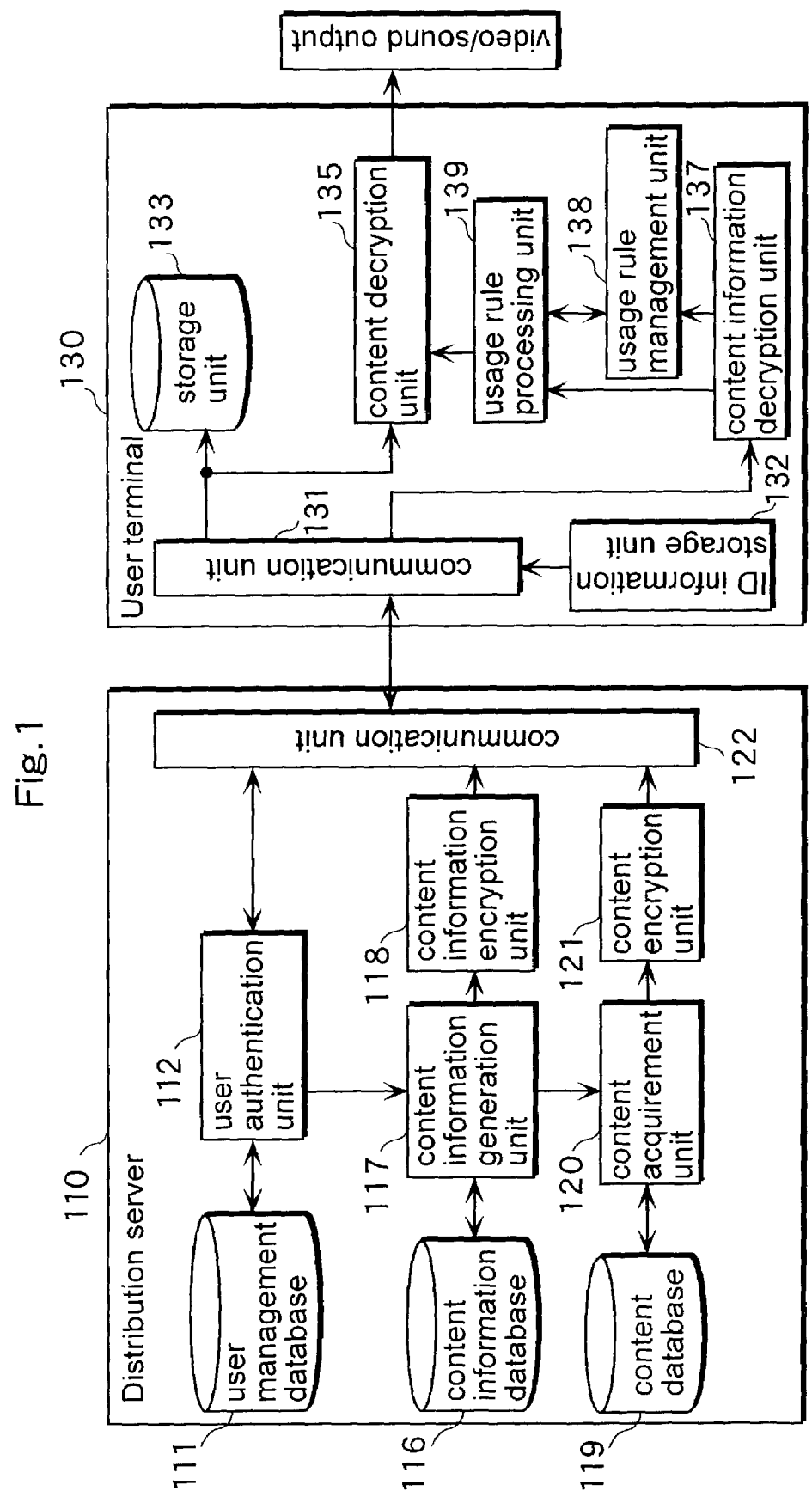
FIG. 1 is a block diagram that shows a structure of the conventional digital content distribution system.
Figure 2:
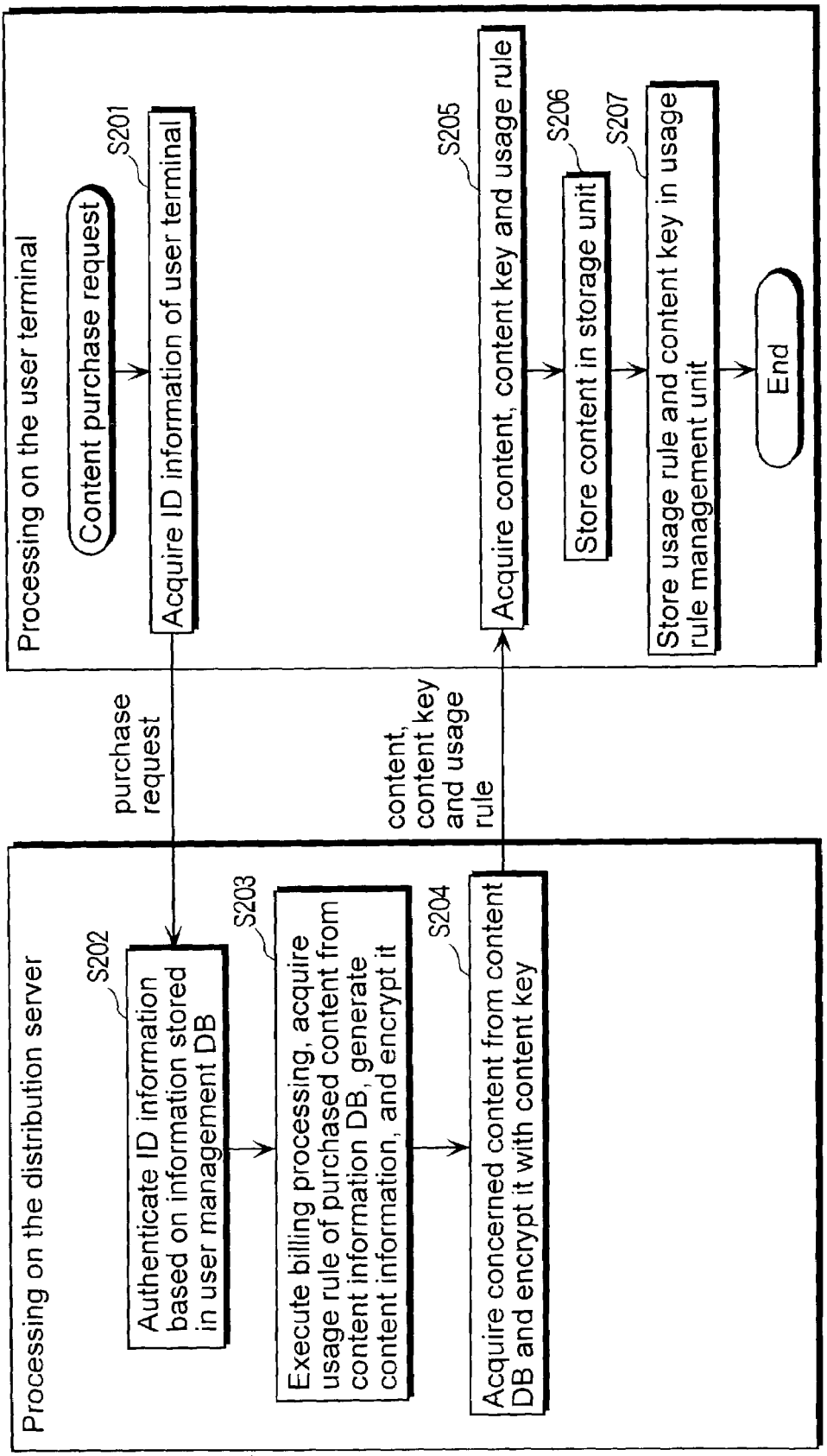
FIG. 2 is a flow chart that shows the processing which is executed when a content is purchased in the conventional digital content distribution system.
Figure 3:
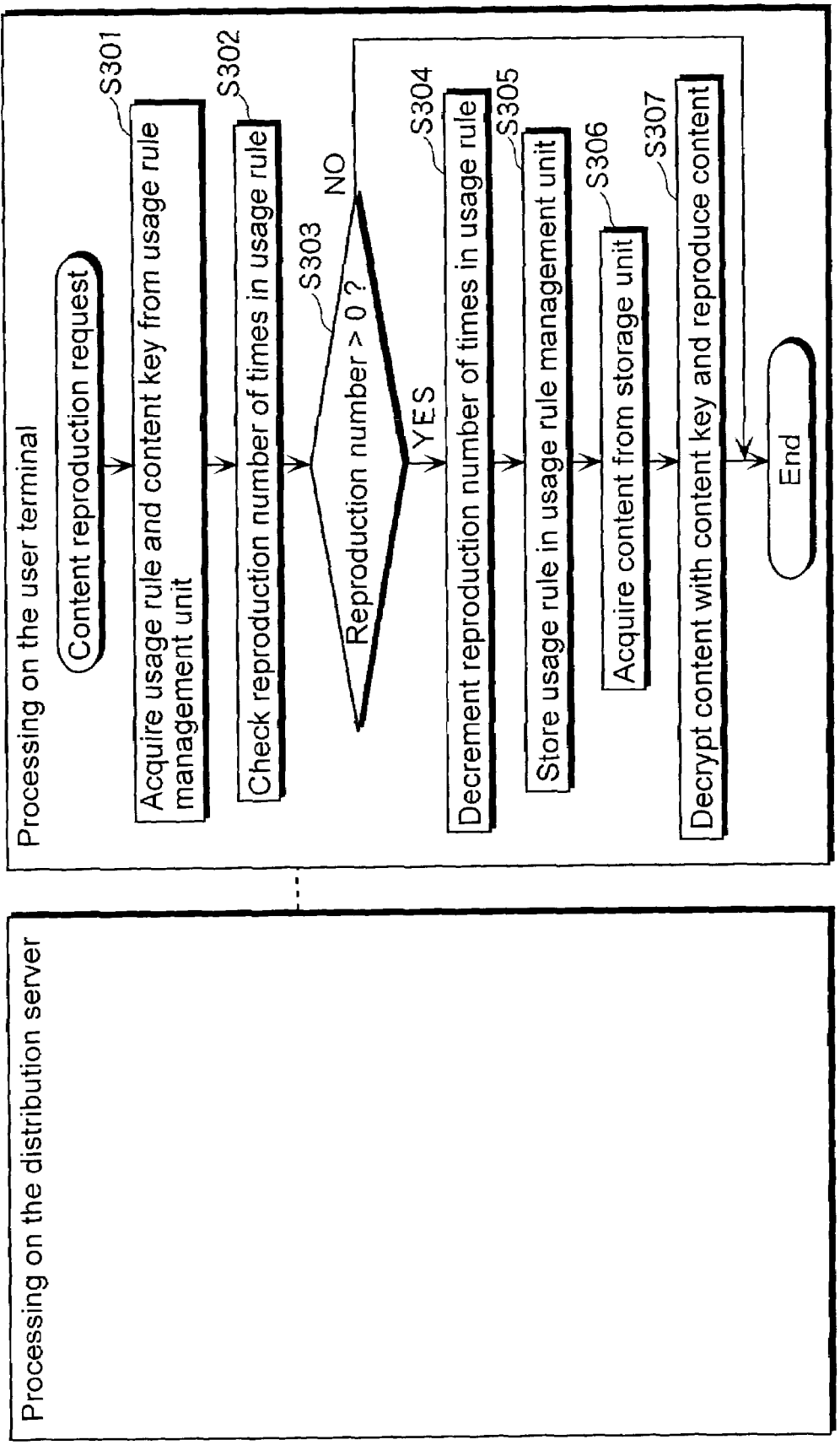
FIG. 3 is a flow chart that shows the processing which is executed when the content is reproduced in the conventional digital content distribution system.
Figure 4:
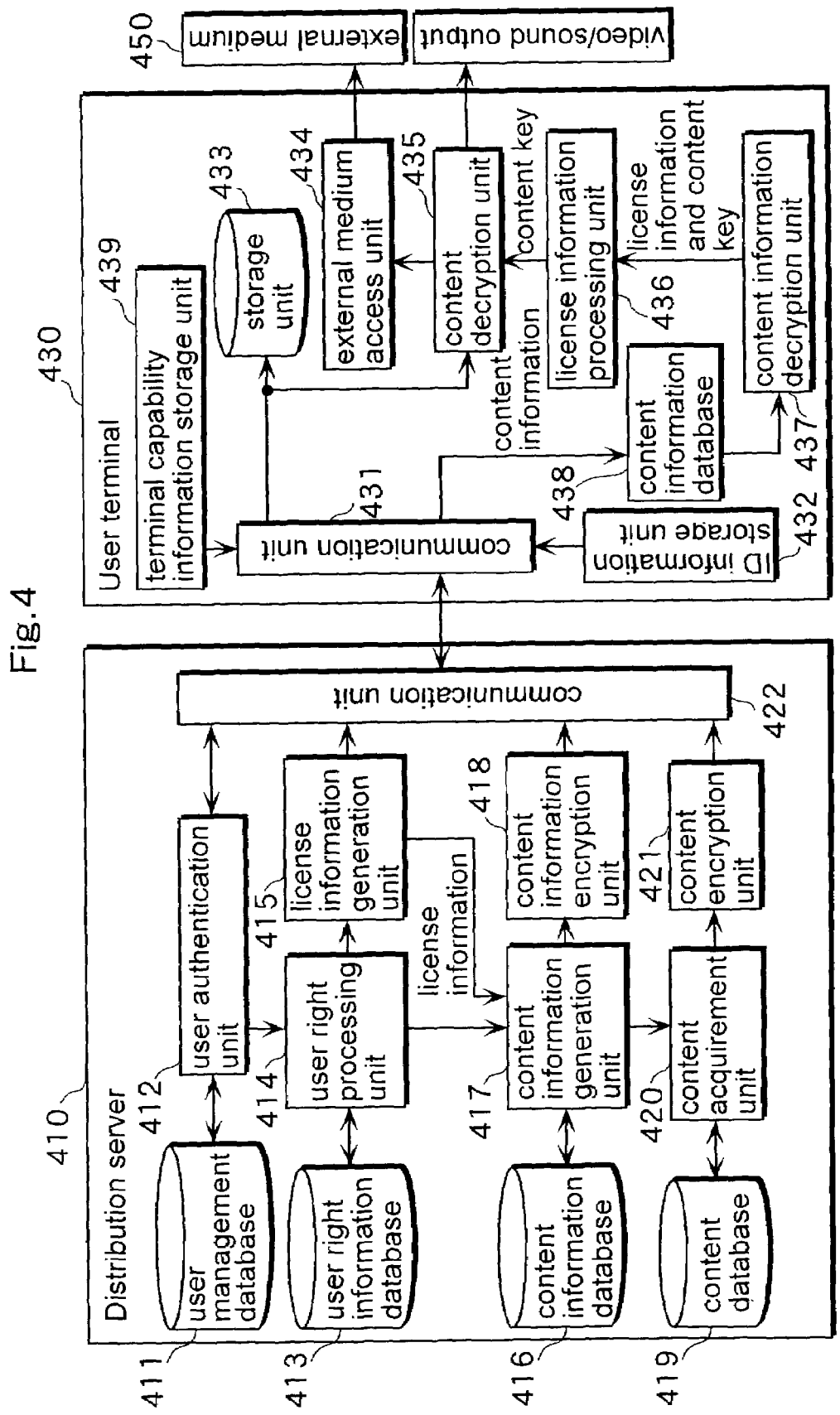
FIG. 4 is a block diagram that shows a structure of the digital content distribution system according to the first embodiment of the present invention.

The digital content distribution system according to the first embodiment of the present invention includes a distribution server 410 and a user terminal 430, as shown in FIG. 4. The distribution server 410 includes a user management database 411 which stores ID information, etc. of a user who has registered as a member, a user right information database 413 which stores user right information for a content, a content information database 416 which stores content-related information (such as a content key), a content database 419 which stores a content, a user authentication unit 412 which executes user authentication, a user right processing unit 414 which registers and updates user right information for a content, a license information generation unit 415 which generates license information of a requested content, a content information generation unit 417 which generates content information including license information and content key information, a content information encryption unit 418 which encrypts content information, a content acquirement unit 420 which acquires a content specified by the content database 419, a content encryption unit 421 which encrypts a content, and a communication unit 422 which communicates with the user terminal 430.

On the other hand, the user terminal 430 includes a communication unit 431 which communicates with the distribution server 410, an ID information storage unit 432 which stores ID information, a terminal capability information storage unit 439 which stores terminal capability information indicating the capability of the user terminal 430, a storage unit 433 which stores an encrypted content, a content information database 438 which stores encrypted content information, a content information decryption unit 437 which acquires content information from the content information database 438 and decrypts a content key and license information, a license information processing unit 436 which decides whether the content key can be used or not based on the license information, a content decryption unit 435 which decrypts the content with the content key acquired from the license information processing unit 436, and an external medium access unit 434 which outputs a content to an external medium 450 such as a semiconductor memory card.

In this system, the right information of each user for the content is managed basically by the distribution server 410. The content purchased (or pre-contracted) by the user is encrypted and stored in the storage unit 433 of the user terminal 430. When the content stored on the user terminal 430 is used, the request is outputted on/to the distribution server 410 from the user terminal 430. The distribution server 410 confirms the usage rule (or contract rule, hereinafter also referred to as "UR-Us") for the content requested by the user, and if there are usage rights of the user, the distribution server 410 distributes the information (hereinafter also referred to as "LT") including the content information (or license information, hereinafter also referred to as "UR-Uc") and the content key to the user terminal 430 of the user.

The license information includes usage rule information for reproduction, moving and copying of the content, and the user terminal 430 controls usage of the content based on the license information.

Figure 5:
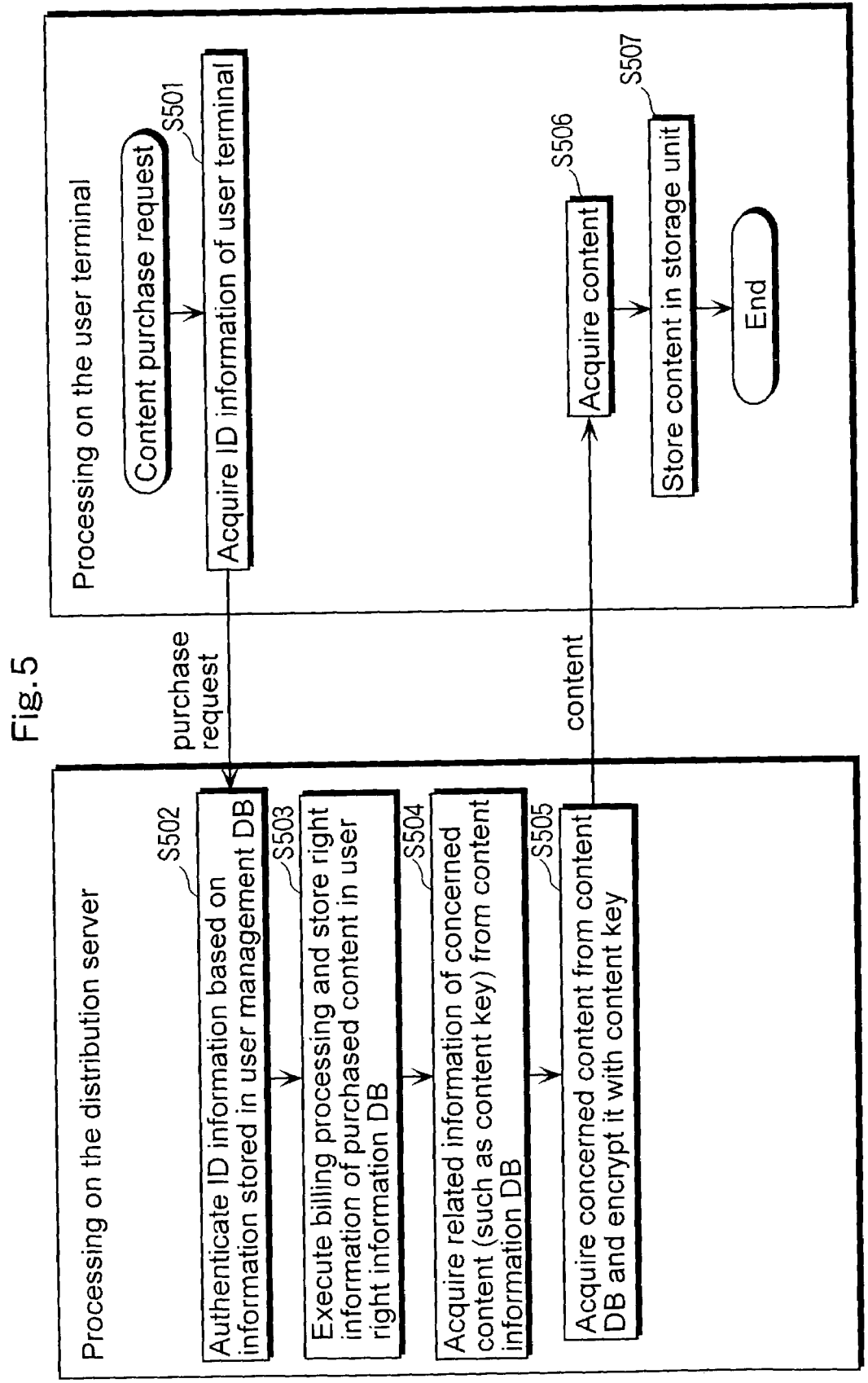
FIG. 5 is a flow chart that shows the processing which is executed when a content is purchased in the digital content distribution system according to the first embodiment.

FIG. 5 is a flow chart, which shows processing that is executed when the user terminal 430 purchases a content from the distribution server 410 in the digital content distribution system according to the present embodiment.

When the user makes a content purchase request, the distribution server 410 and the user terminal 430 perform the following processing.

S501: The communication unit 431 of the user terminal 430 acquires the ID information of the user terminal 430 that is stored in the ID information storage unit 432, and sends the ID information and the content purchase request to the distribution server 410.

S502: Once the user authentication unit 412 receives this information via the communication unit 422 of the distribution server 410, the user authentication unit 412 collates the received ID information with the ID information stored in the user management database 411 for the user authentication, and passes the content purchase request to the user right processing unit 414.

S503: The user right processing unit 414 executes billing processing for the content purchase and registers the user's right information (UR-Us) for the purchased content to the user right information database 413.

S504: The content information generation unit 417 acquires the related information (such as the content key) of the concerned content from the content information database 416 and passes the acquired information to the content acquirement unit 420.

S505: The content acquirement unit 420 acquires the concerned content from the content database 419, and the content encryption unit 421 encrypts this content with the content key. The communication unit 422 of the distribution server 410 sends the encrypted content to the user terminal 430.

S506: Once the communication unit 431 of the user terminal 430 receives the encrypted content, S507: the communication unit 431 sends the content to the content storage unit 433 to have the encrypted content stored.

Figure 6:
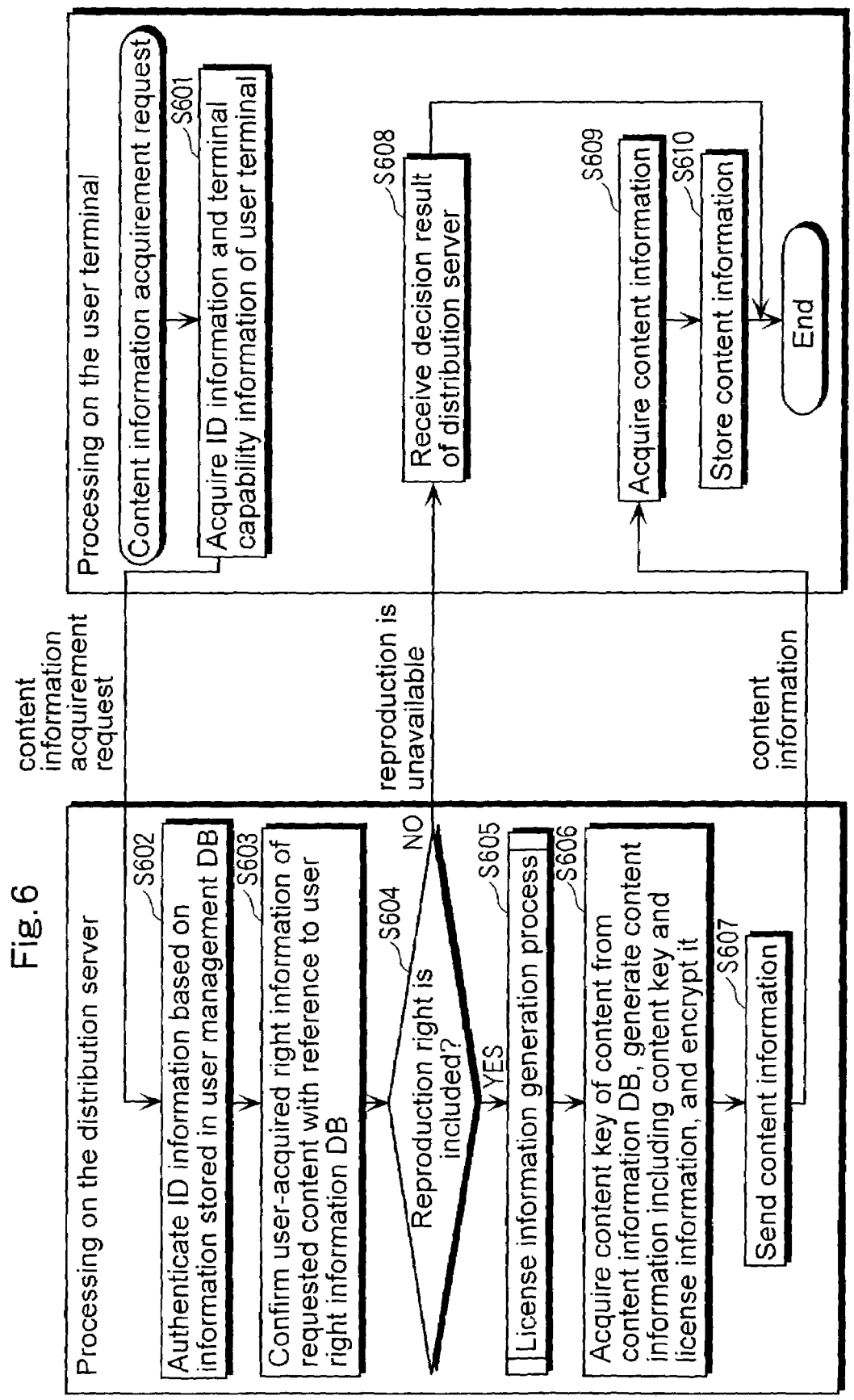
FIG. 6 is a flow chart that shows the processing which is executed when content information is acquired in the digital content distribution system according to the first embodiment.

Next, the processing (content information acquirement process) in the case where the user terminal 430 in the digital content distribution system according to the present embodiment acquires the content information to reproduce the content will be explained with reference to FIG. 6.

When there is a request made by the user to acquire the content information for reproducing the content, the distribution server 410 and the user terminal 430 perform the following processing.

S601: The communication unit 431 in the user terminal 430 acquires the ID information of the user terminal 430 that is stored in the ID information storage unit 432 and the terminal capability information that is stored in the terminal capability information storage unit 439, and sends these information and the content information acquirement request (hereinafter also referred to as "LT issuance request") to the distribution server 410.

Note that the terminal capability information indicates what kind of license information the user terminal 430 can process. More specifically, as for the values indicating the available reproduction number of times which is described in the license information, the terminal capability information indicates the values that the user terminal 430 can process. For example, the terminal capability information is the information indicating that "only the license information describing that the available reproduction number of times is 1 can be processed".

S602: Once the user authenticating unit 412 receives the ID information through the communication unit 422 on the distribution server 410, the user authenticating unit 412 collates the received ID information with the ID information stored in the user management database 411 for the user authentication, and passes the user information and the content information acquirement request to the user right processing unit 414. Also, the communication unit 422 on the distribution server 410 passes the received terminal capability information to the license information generation unit 415.

S603: With reference to the user right information database 413, the user right processing unit 414 confirms the right information for the user who is specified with the user information passed in S602 and of the content which has been subject to the content information acquirement request.

S604: When the right information that is confirmed in S603 includes the reproduction right, the user right processing unit 414 passes the details of the reproduction right to the license information generation unit 415. Here, the details of the reproduction right are the information indicating how many times the content can be reproduced, for example, the information indicating that "the content can be reproduced N times". After that, S605: the license information generation process will be executed as described below.

S606: The content information generation unit 417 reads out the content key of the concerned content from the content information database 416, and generates the content information (LT) including this content key and the license information that is generated in the license information generation process. The content information encryption unit 418 encrypts this content information.

S607: The communication unit 422 on the distribution server 410 sends the encrypted content information to the user terminal 430.

Note that when the user's right information does not include the reproduction right of the concerned content in S604, the distribution server 410 sends the notice that the content cannot be reproduced to the user terminal 430 (S608).

On the other hand, at the side of the user terminal 430,

S609: once the communication unit 431 of the user terminal 430 receives the content information, S610: the communication unit 431 sends the content information to the content information database 438 to have the content information stored.

Figure 7:
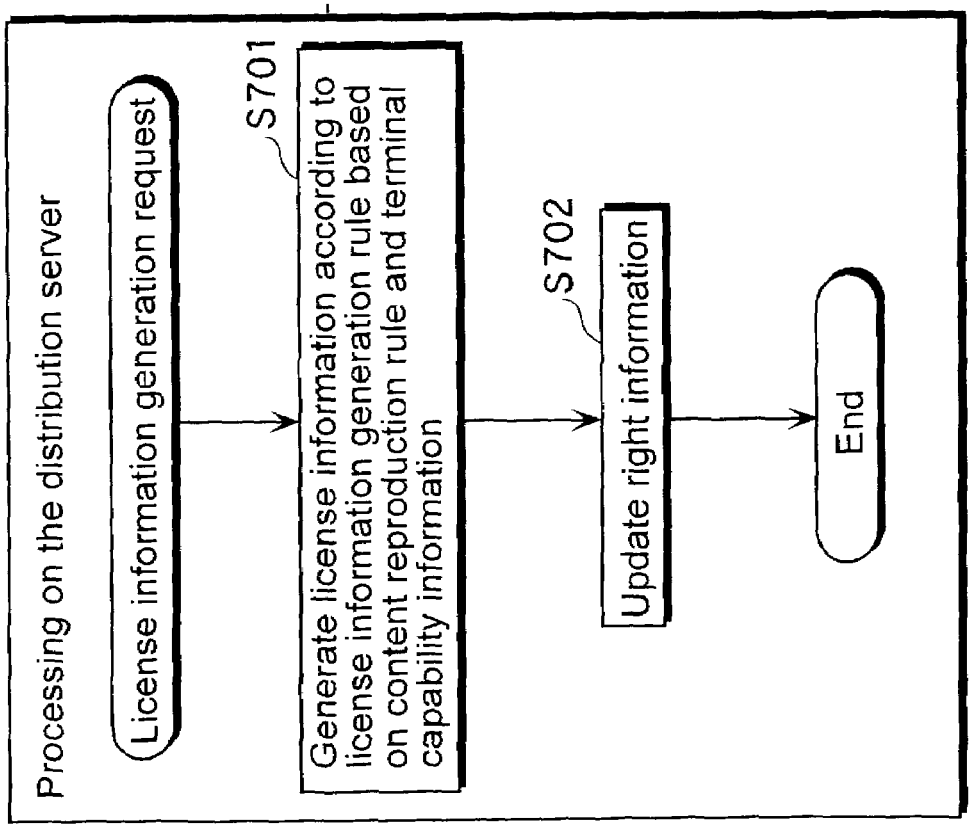
FIG. 7 is a flow chart that shows the processing which is executed when license information is generated in the digital content distribution system according to the first embodiment.

FIG. 7 shows the processing flow in the case where the distribution server 410 generates the license information (UR-Uc/LT) (the license information generation process) in the digital content distribution system according to the present embodiment.

When there is a license information generation request, the distribution server 410 performs the following processing.

S701: The license information generation unit 415 generates the license information according to the license information generation rule (whose sample is shown in FIG. 8) describing the generation rule of the license information based on the details of the terminal capability information which is received in S602 and those of the reproduction right which are received in S604, and passes the generated license information to the content information generation unit 417.

The rule as shown in FIG. 8 determines the details of the license information to be generated based on the details of the reproduction right and the terminal capability information.

S702: The user right processing unit 414 updates the details of the reproduction right in the right information which is stored in the user right information database 413 (or decrements the value of the available reproduction number of times which is described in the reproduction right by the value of the available reproduction number of times which is described in the license information generated in S701).

Note that when the available reproduction number of times is infinitely large among the reproduction rights, the user right processing unit 414 does not update the details of the reproduction right.

Here, the license information generation rule as shown in FIG. 8 will be explained in detail.

As shown in FIG. 8, the following three types of terminal capability information are defined: "only the license information describing that the available reproduction number of times is 1 can be processed", "the license information describing that the available reproduction number of times is 1 and the license information describing that the available reproduction number of times is ∞ can be processed", and "the license information describing that the available reproduction number of times is N and the license information describing that the available reproduction number of times is ∞ can be processed."

For example, when the detail of the reproduction right received in S604 is "reproduction is available ∞ times" and the terminal capability information received in S602 is "only the license information describing that the available reproduction number of times is 1 can be processed", it means that the license information describing that the available reproduction number of times is 1 is to be generated. Also, when the detail of the reproduction right received in S604 is "reproduction is available ∞ times" and the terminal capability information received in S602 is "the license information describing that the available reproduction number of times is 1 and the license information describing that the available reproduction number of times is ∞ can be processed", it means that the license information describing that the available reproduction number of times is ∞ is to be generated. Furthermore, when the detail of the reproduction right received in S604 is "reproduction is available ∞ times" and the terminal capability information received in S602 is "the license information describing that available reproduction number of times is N and the license information describing that the available reproduction number of times is ∞ can be processed", it means that the license information describing that the available reproduction number of times is ∞ is to be generated. Note that N is a finite integral value of 2 or more.

Next, when the detail of the reproduction right received in S604 is "reproduction is available plural times" and the terminal capability information received in S602 is "only the license information describing that the available reproduction number of times is 1 can be processed", it means that the license information describing that the available reproduction number of times is 1 is to be generated. Also, when the detail of the reproduction right received in S604 is "reproduction is available plural times" and the terminal capability information received in S602 is "the license information describing that the available reproduction number of times is 1 and the license information describing that the available reproduction number of times is ∞ can be processed", it means that the license information describing that the available reproduction number of times is 1 is to be generated. Furthermore, when the detail of the reproduction right received in S604 is "reproduction is available plural times" and the terminal capability information received in S602 is "the license information describing that available reproduction number of times is N and the license information describing that the available reproduction number of times is ∞ can be processed", it means that the license information describing that the available reproduction number of times is N is to be generated. Note that N is a finite integral value of 2 or more.

Furthermore, when the detail of the reproduction right received in S604 is "reproduction is available 1 time", for example, it means that the license information describing that the available reproduction number of times is 1 is to be generated in the sample as shown in FIG. 8.

Figure 9:
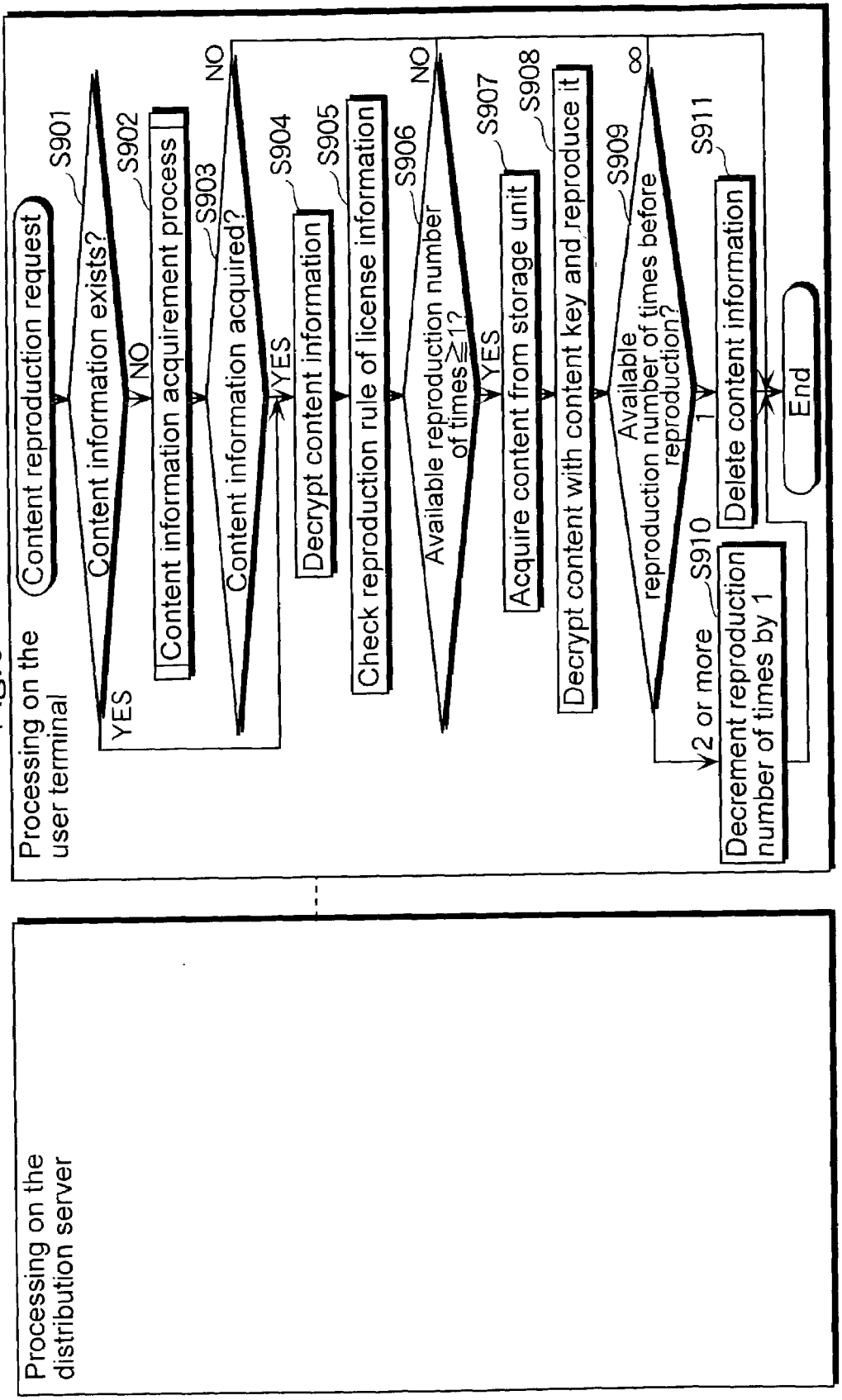
FIG. 9 is a flow chart that shows the processing which is executed when the content is reproduced in the digital content distribution system according to the first embodiment.

FIG. 9 shows a processing flow in the case where the user terminal 430 reproduces a content in the digital content distribution system according to the present embodiment. When there is a content request made by a user, the user terminal 430 performs the following processing.

S901: The content information decryption unit 437 checks whether the content information corresponding to the content whose reproduction is requested exists in the content information database 438 or not. When the content information exists, the processings in S902 and S903 are skipped to proceed with the processing in S904.

S902: When the content information does not exist in S901, the above-mentioned content information acquisition process is executed.

S903: When the content information can be acquired because the content information acquirement process is executed, S904: the content information decryption unit 437 decrypts the content information to obtain the license information and the content key, and passes them to the license information processing unit 436.

S905: The license information processing unit 436 checks the reproduction rule described in the license information;

S906: when the available reproduction number of times is 1 or more,

S907: the license information processing unit 436 acquires the content from the storage unit 433, and S908: decrypts the content with the content key to reproduce it.

S909-S911: After the reproduction of the content, the content information stored in the content information database 438 is updated.

Here, when the available reproduction number of times before the reproduction is 2 or more and finite, the available reproduction number of times which is described in the license information in the content information is decremented by 1. Also, when the available reproduction number of times before the reproduction is 1, the processing for deleting or canceling the content information is performed. When the available reproduction number of times is infinitely large, the content information is not updated.

Furthermore, when the content information cannot be acquired from the distribution server 410 in S903 and when it is decided in S906 that the content cannot be reproduced, the processing is completed without reproducing the content.

Note that although an example of "reproduction" has been explained as one form of "usage" of a content in the present embodiment, the usage is not limited to reproduction of a content but may include any actions such as copying a content to the external medium 450, printing and others.

Also, the terminal capability information has been explained in the present embodiment on the assumption that it is the information indicating at which values the available reproduction number of times which is described in the license information are for allowing the license information to be processed. However, the terminal capability information is not limited to that, but may be the information indicating whether the time management such as a reproduction effective period, how frequent the distribution server is connected and how much the cost of connection to the distribution server is, for example.

Furthermore, the license information generation rule may change depending upon the details of the terminal capability information. For example, the rule in the case where the terminal capability information indicates the frequency of connection to the distribution server is that as shown in FIG. 10 (as a sample), and the rule in the case where the terminal capability information indicates the cost of connection to the distribution server is that as shown in FIG. 11 (as a sample).

Here, the license information generation rule on the connection frequency as shown in FIG. 10 will be explained.

As shown in FIG. 10, the following three types of the connection frequency are defined: "continuous connection", "once a day", and "once a week". In FIG. 10, when the detail of the reproduction right is "reproduction is available ∞ times" and the connection frequency is "continuous connection", the license information describing that "the available reproduction number of times is 1" is to be generated. That is, it means that the license information is issued for every reproduction. Also, when the detail of the reproduction right is "reproduction is available ∞ times" and the connection frequency is "once a day", that is, the connection is made about once a day, the license information describing that "the available reproduction number of times is N" is to be generated. Note that N is a finite integer of 2 or more. Furthermore, when the detail of the reproduction right is "reproduction is available ∞ times" and the connection frequency is "once a week", that is, the connection is made about once a week, it means that the license information describing that "the available reproduction number of times is ∞" is to be generated.

Also, in FIG. 10, when the detail of the reproduction right is "reproduction is available plural times" and the connection frequency is "continuous connection", the license information describing that "the available reproduction number of times is 1" is to be generated. That is, it means that the license information is issued for every reproduction. Also, when the detail of the reproduction right is "reproduction is available plural times" and the connection frequency is "once a day", that is, the connection is made about once a day, the license information describing that "the available reproduction number of times is 1" is to be generated. Furthermore, when the detail of the reproduction right is "reproduction is available plural times" and the connection frequency is "once a week", that is, the connection is made about once a week, it means that the license information describing that "the available reproduction number of times is N" is to be generated. Note that N is a finite integer of 2 or more.

Furthermore, in FIG. 10, when the detail of the reproduction right is "reproduction is available one time", it means that the license information describing that "the available reproduction number of times is 1" is to be generated for any type of the connection frequency. In this manner, the license information can flexibly be changed and issued depending upon the frequency of connection to the user terminal 430.

Here, the license information generation rule on the connection cost as shown in FIG. 11 will be explained.

In FIG. 11, when the detail of the reproduction right is "reproduction is available ∞ times" and the connection cost is "~xxx yen", that is, xxx yen or less, it means that the license information describing that "the available reproduction number of times is 1" is to be generated. On the other hand, when the detail of the reproduction right is "reproduction is available ∞ times" and the connection cost is "xxx yen ~", that is, more than xxx yen, it means that the license information describing that "the available reproduction number of times is ∞" is to be generated. Note that xxx is an integer of 0 or more.

Also, in FIG. 11, when the detail of the reproduction right is "reproduction is available plural times" and the connection cost is "~xxx yen", that is, xxx yen or less, it means that the license information describing that "the available reproduction number of times is 1" is to be generated. On the other hand, when the detail of the reproduction right is "reproduction is available plural times" and the connection cost is "xxx yen ~", that is, more than xxx yen, it means that the license information describing that "the available reproduction number of times is N" is to be generated. Note that xxx is an integer of 0 or more and N is a finite integer of 2 or more.

Furthermore, in FIG. 11, when the detail of the reproduction right is "reproduction is available 1 time", it means that the license information describing that "the available reproduction number of times is 1" is to be generated regardless of the connection cost. In this manner, the license information can flexibly be changed and issued depending upon the cost of connection to the user terminal 430.

As mentioned above, in the digital content distribution system according to the first embodiment, the distribution server can distribute the license information that is most suitable to the user terminal according to the capability of the user terminal.

When the license information is generated and distributed based on the usage rule describing that reproduction is available N times, for example, it is possible to connect to the distribution server frequently as in the case of a mobile phone. Also, it is possible to distribute the license information describing that reproduction is available 1 time to the equipment whose processing load should be lightened in the terminal. On the contrary, it is also possible to distribute the license information describing the N-time reproduction right to the equipment like a PC which has difficulty connecting to the distribution server frequently but can perform complicated processing in the terminal.

The Second Embodiment

The digital content distribution system according to the second embodiment for the present invention includes a distribution server 1210 and a user terminal 1230, as shown in FIG. 12. The distribution server 1210 includes a user management database 1211 which stores ID information, etc. of a user who has registered as a member, a user right information database 1213 which stores user right information for a content, a content information database 1216 which stores content-related information (such as a content key, services to which a content belongs, etc.), a content database 1219 which stores a content, a user authentication unit 1212 which executes a user authentication, a user right processing unit 1214 which registers and updates user right information for a content, a license information generation unit 1215 which generates license information of a requested content, a content information generation unit 1217 which generates content information including license information and information on a content key, a content information encryption unit 1218 which encrypts content information, a content acquirement unit 1220 which acquires a content specified by the content database 1219, a content encryption unit 1221 which encrypts a content, and a communication unit 1222 which communicates with the user terminal 1230.

On the other hand, the user terminal 1230 includes a communication unit 1231 which communicates with the distribution server 1210, an ID information storage unit 1232 which stores ID information, a storage unit 1233 which stores an encrypted content, a content information database 1238 which stores encrypted content information, a content information decryption unit 1237 which acquires content information from the content information database 1238 and decrypts a content key and license information, a license information processing unit 1236 which decides whether or not the content key can be used based on the license information, a content decryption unit 1235 which decrypts the content with the content key acquired from the license information processing unit 1236, and an external medium access unit 1234 which outputs the content to an external medium 1250.

In this system, the right information of each user for the content is managed basically by the distribution server 1210. The content purchased (or pre-contracted) by the user is encrypted and stored in the storage unit 1233 of the user terminal 1230. When the content stored in the user terminal 1230 is used, the request is outputted to the distribution server 1210 from the user terminal 1230. The distribution server 1210 confirms the usage rule (or contract rule) for the content requested by the user, and if there are usage rights of the user, the distribution server 1210 distributes the content information (the information including the license information and the content key) to the user. The license information includes usage rule information for reproduction, moving and copying of the content, and the user terminal 1230 controls usage of the content based on the license information.

FIG. 13 is a flow chart, which shows processing that is executed when the user terminal 1230 purchases a content from the distribution server 1210 in the digital content distribution system according to the present embodiment. When the user makes a content purchase request, the distribution server 1210 and the user terminal 1230 perform the following processing.

S1301: The communication unit 1231 of the user terminal 1230 acquires the ID information of the user terminal 1230 that is stored in the ID information storage unit 1232, and sends the ID information and the content purchase request to the distribution server 1210.

S1302: Once the user authentication unit 1212 receives this information via the communication unit 1222 of the distribution server 1210, the user authentication unit 1212 collates the received ID information with the ID information stored in the user management database 1211 for the user authentication, and passes the content purchase request to the user right processing unit 1214.

S1303: The user right processing unit 1214 executes billing processing for the content purchase and registers the user's right information for the content purchased to the user right information database 1213.

S1304: The content information generation unit 1217 acquires the related information (such as the content key) of the concerned content from the content information database 1216 and passes the acquired information to the content acquirement unit 1220.

S1305: The content acquirement unit 1220 acquires the concerned content from the content database 1219, and the content encryption unit 1221 encrypts this content with the content key. The communication unit 1222 of the distribution server 1210 sends the encrypted content to the user terminal 1230.

S1306: Once the communication unit 1231 of the user terminal 1230 receives the encrypted content, S1307: the communication unit 1231 sends the content to the storage unit 1233 to have it stored.

Next, the processing (content information acquirement process) that is executed in the case where the user terminal 1230 in the digital content distribution system according to the present embodiment acquires the content information to reproduce the content will be explained with reference to FIG. 14.

When there is a request made by the user to acquire the content information for reproducing the content, S1401: the communication unit 1231 of the user terminal 1230 acquires the ID information of the user terminal 1230 that is stored in the ID information storage unit 1232, and sends the information and the content information acquirement request to the distribution server 1210.

S1402: Once the user authenticating unit 1212 receives the ID information through the communication unit 1222 of the distribution server 1210, the user authentication unit 1212 collates the received ID information with the ID information stored in the user management database 1211 for the user authentication, and passes the user information and the content information acquirement request to the user right processing unit 1214.

S1403: With reference to the user right information database 1213, the user right processing unit 1214 confirms the right information for the user who is specified with the user information passed in S1402 and of the content that has been subject to the content information acquirement request.

S1404: When the right information that is confirmed in S1403 includes the reproduction right, the user right processing unit 1214 passes the details of the reproduction right to the license information generation unit 1215. Here, the details of the reproduction right are the information indicating how many times the content can be reproduced, the information indicating that "reproduction is available N times," for example. After that, S1405: the license information generation process will be executed as described below.

S1406: The content information generation unit 1217 reads out the content key of the concerned content from the content information database 1216, and generates the content information including this content key and the license information which is generated in the license information generation process. The content information encryption unit 1218 encrypts this content information.

S1407: The communication unit 1222 of the distribution server 1210 sends the encrypted content information to the user terminal 1230.

Note that when the user's right information does not include the reproduction right of the concerned content in S1404, the distribution server 1210 sends the notice that the content cannot be reproduced to the user terminal 1230 (S1408).

On the other hand, at the user terminal side,

S1409: once the communication unit 1231 of the user terminal 1230 receives the content information (LT), S1410: the communication unit 1231 sends the content information (LT) to the content information database 1238 to have it stored.

Figure 15:
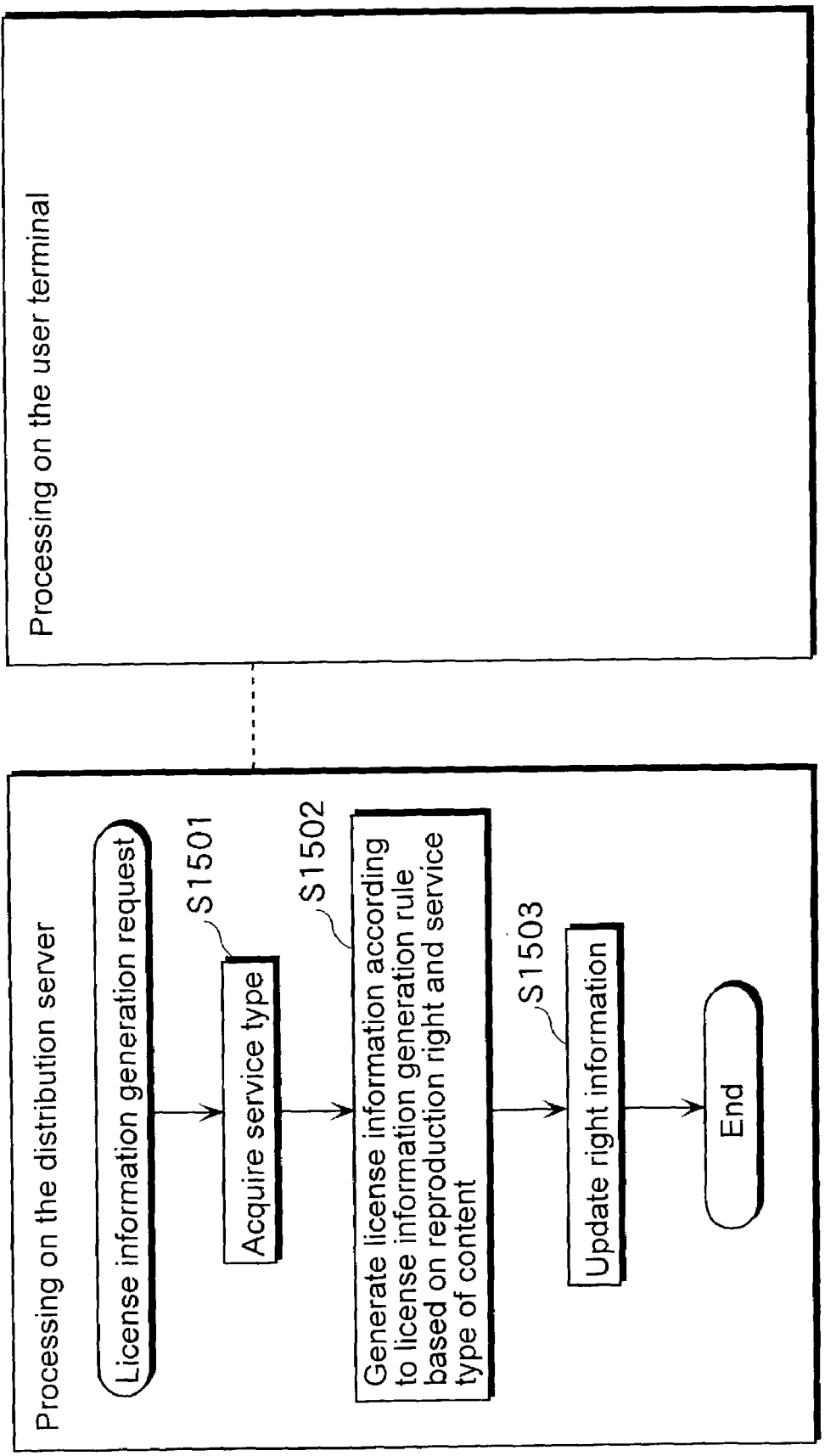
FIG. 15 is a flow chart that shows the processing which is executed when the license information is generated in the digital content distribution system according to the second embodiment.

FIG. 15 shows the processing flow in the case where the distribution server 1210 generates license information (the license information generating process) in the digital content distribution system according to the present embodiment. When there is a license information generation request, S1501: the license information generation unit 1215 obtains the information on a service type to which the content subject to the content information acquirement request belongs from the content information database 1216.

In the present embodiment, the service type is, for example, the information on the content type such as music distribution and movie distribution.

S1502: The license information generation unit 1215 generates the license information according to the license information generation rule (a sample of which is shown in FIG. 16) describing the generation rule of the license information based on the information on the reproduction right which is received in S1404 and on the service type which is obtained in S1501, and passes the generated license information to the content information generation unit 1217.

S1503: The user right processing unit 1214 updates the details of the reproduction right in the right information which are stored in the user right information database 1213 (or decrements the value of the available reproduction number of times which is described in the reproduction right by the value of the available reproduction number of times which is described in the license information generated in S1502).

Note that when the available reproduction number of times is infinitely large among the reproduction rights, the user right processing unit 1214 does not update the details of the reproduction right.

The license information generation rule as shown in FIG. 16 will now be explained.

The rule as shown in FIG. 16 determines the details of the license information to be generated based on the information on the reproduction right detail and the service type. As for the service type, the following two types are defined: "movie distribution service" and "music distribution service".

According to the license information generation rule as shown in FIG. 16, when the detail of the reproduction right received in S1404 is "reproduction is available ∞ times" and the information on the service type received in S1501 is "movie distribution service", the license information describing that "the available reproduction number of times is 1" is to be generated.

On the other hand, when the detail of the reproduction right received in S1404 is "reproduction is available ∞ times" and the information on the detail of the service received in S1501 is "music distribution service", the license information describing that "the available reproduction number of times is ∞" is to be generated.

Also, when the detail of the reproduction right received in S1404 is "reproduction is available plural times" and the information on the service type received in S1501 is "movie distribution service", the license information describing that "the available reproduction number of times is 1" is to be generated.

On the other hand, when the detail of the reproduction right received in S1404 is "reproduction is available plural times" and the information on the service type obtained in S1501 is "music distribution service", the license information describing that "the available reproduction number of times is N" is to be generated. Note that N is a finite integer of 2 or more.

Furthermore, when the detail of the reproduction right received in S1404 is "reproduction is available 1 time", for example, it means that the license information describing that "the available reproduction number of times is 1" is to be generated for any type of the information on the service type.

In this manner, it becomes possible to generate the license information flexibly for each service type, that is, for each content type.

Figure 17:
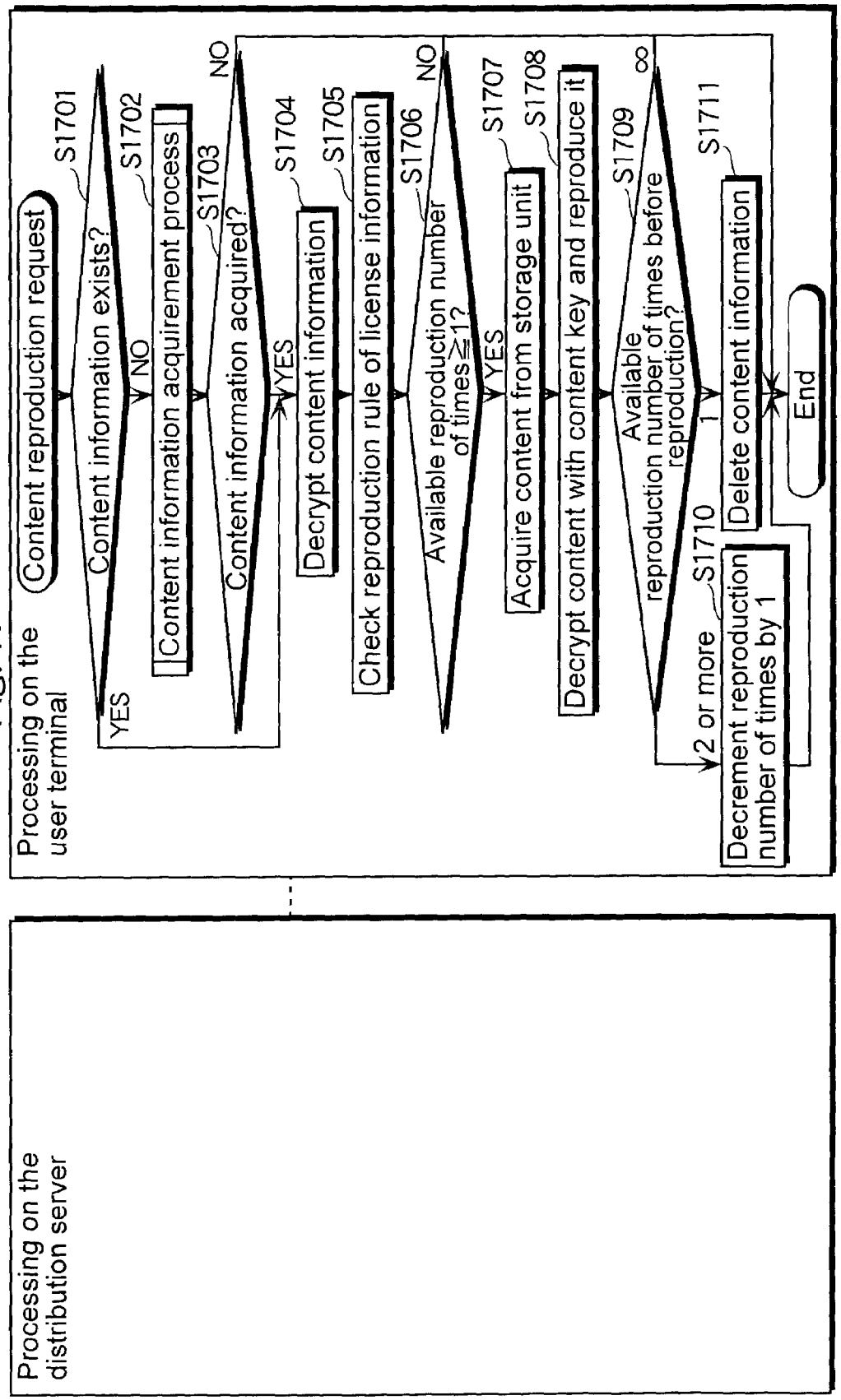
FIG. 17 is a flow chart that shows the processing which is executed when the content is reproduced in the digital content distribution system according to the second embodiment.

FIG. 17 shows a processing flow in the case where the user terminal 1230 reproduces a content in the digital content distribution system according to the present embodiment.

When there is a content request made by a user,

S1701: the content information decryption unit 1237 checks whether or not the content information corresponding to the content whose reproduction is requested exists in the content information database 1238. When the content information exists in the content information database 1238, the processing in S1702 and S1703 is skipped to move on to the processing in S1704.

S1702: When the content information does not exist in S1701, the above-mentioned content information acquirement process is executed.

S1703: When the content information can be acquired because the content information acquirement process is executed, S1704: the content information decryption unit 1237 decrypts the content information to obtain the license information and the content key, and passes them to the license information processing unit 1236.

S1705: The license information processing unit 1236 checks the reproduction rule described in the license information.

S1706: When the license information processing unit 1236 decides that the available reproduction number of times is 1 or more, S1707: the license information processing unit 1236 acquires the content from the storage unit 1233, and S1708: the content decryption unit 1235 decrypts the content with the content key to reproduce it.

S1709-S1711: After the reproduction of the content, the content information stored in the content information database 1238 is updated.

Here, when the available reproduction number of times before the reproduction is 2 or more and finite, the available reproduction number of times which is described in the license information in the content information is decremented by 1. Also, when the available reproduction number of times before the reproduction is 1, the processing for deleting or canceling the content information is performed. When the available reproduction number of times is infinitely large, the content information is not updated.

Furthermore, when the content information cannot be acquired from the distribution server 1210 in S1703 and when it is decided in S1706 that the content cannot be reproduced, the processing is completed without reproducing the content.

Note that although an example of "reproduction" has been explained as one form of "usage" of a content in the present embodiment, the usage is not limited to reproduction of the content but may include any actions such as copying to the external medium 1250, printing and others.

Also, although an example of the content type has been explained as the service type in the present embodiment, the service type is not limited to the content type but may include the information on the premium value of the content such as a new work or an old one.

Also, the license information generation rule may change depending upon the information that is indicated by the above-mentioned service type. For example, the rule in the case where the service type is the information indicating the premium value of the content is that as shown in FIG. 18 (as a sample).

In FIG. 18, three types of the premium values of the content, "new", "nearly new" and "old" are defined. When the reproduction right is "reproduction is available ∞ times" and the premium value of the content is "new", it means that the license information describing that "the available reproduction number of times is 1" is to be generated. Also, when the reproduction right is "reproduction is available ∞ times" and the premium value of the content is "nearly new", it means that the license information describing that "the available reproduction number of times is N" is to be generated. Furthermore, when the reproduction right is "reproduction is available ∞ times" and the premium value of the content is "old", it means that the license information describing that "the available reproduction number of times is ∞" is to be generated. Note that N is a finite integer of 2 or more.

Also, in FIG. 18, when the reproduction right is "reproduction is available plural times" and the premium value of the content is "new", it means that the license information describing that "the available reproduction number of times is 1" is to be generated.

Also, when the reproduction right is "reproduction is available plural times" and the premium value of the content is "nearly new", it means that the license information describing that "the available reproduction number of times is N" is to be generated.

Furthermore, when the reproduction right is "reproduction is available plural times" and the premium value of the content is "old", it means that the license information describing that "the available reproduction number of times is N" is to be generated.

Furthermore, in FIG. 18, when the reproduction right is "reproduction is available 1 time", it means that the license information describing that "the available reproduction number of times is 1" is to be generated for any premium values of the content.

Just as described, in the digital content distribution system according to the second embodiment, the distribution server can distribute the license information that is most suitable for the service type to the user terminal. When the license information is generated and distributed from the usage rule describing that N-time reproduction is available, for example, the distribution of the license information becomes possible in the following manner. As for the high-value content such as a new movie, the license information describing that 1-time reproduction is available is distributed so that the user terminal communicates with the distribution server every time the content is reproduced. On the contrary, as for the low-value content such as an old movie, the license information describing an N-time (N is a finite integer of 2 or more) reproduction right is distributed.

The Third Embodiment

Figure 19:
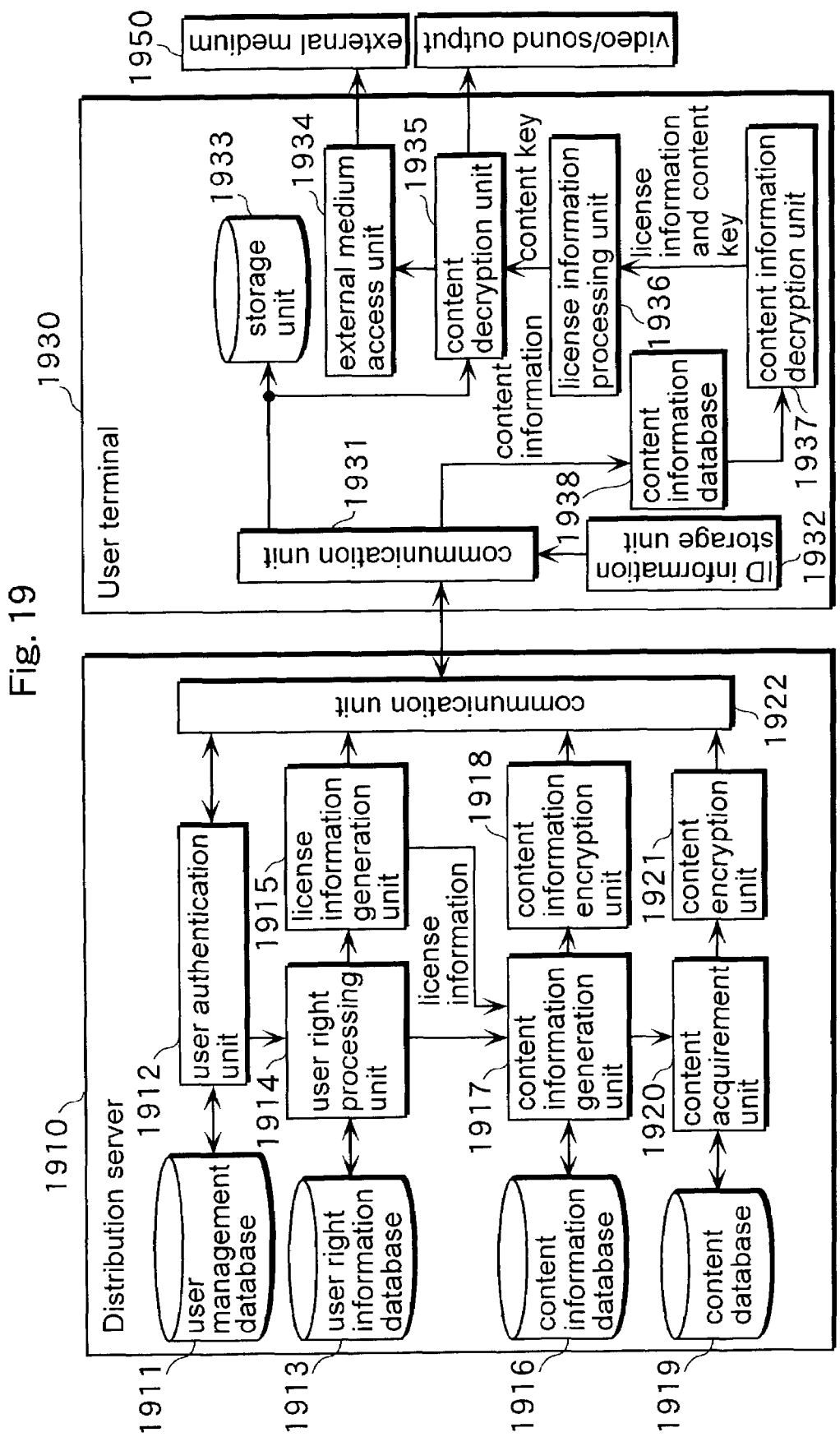
FIG. 19 is a block diagram that shows a structure of the digital content distribution system according to the third embodiment of the present invention.

The digital content distribution system according to the third embodiment for the present invention includes a distribution server 1910 and a user terminal 1930, as shown in FIG. 19. The distribution server 1910 includes a user management database 1911 which stores ID information of a user who has registered as a member and information on a payment method in the case where the user pays a content price, a user right information database 1913 which stores user right information for a content, a content information database 1916 which stores content-related information (such as a content key), a content database 1919 which stores a content, a user authentication unit 1912 which executes a user authentication, a user right processing unit 1914 which registers and updates user right information for a content, a license information generation unit 1915 which generates license information of a requested content, a content information generation unit 1917 which generates content information including license information and information on a content key, a content information encryption unit 1918 which encrypts content information, a content acquirement unit 1920 which acquires a content specified by the content database 1919, a content encryption unit 1921 which encrypts a content, and a communication unit 1922 which communicates with the user terminal 1930.

On the other hand, the user terminal 1930 includes a communication unit 1931 which communicates with the distribution server 1910, an ID information storage unit 1932 which stores ID information, a storage unit 1933 which stores an encrypted content, a content information database 1938 which stores encrypted content information, a content information decryption unit 1937 which acquires content information from the content information database 1938 and decrypts a content key and license information, a license information processing unit 1936 which decides whether or not the content key can be used based on the license information, a content decryption unit 1935 which decrypts the content with the content key acquired from the license information processing unit 1936, and an external medium access unit 1934 which outputs the content to an external medium 1950.

In this system, the right information of each user for the content is managed basically by the distribution server 1910. The content purchased (or pre-contracted) by the user is encrypted and stored in the storage unit 1933 of the user terminal 1930. When this content is used, the request is outputted to the distribution server 1910 from the user terminal 1930.

The distribution server 1910 confirms the usage rule (or contract rule) for the content requested by the user, and if there is a usage right of the user, the distribution server 1910 distributes the content information (information including license information and a content key) to the user terminal 1930 of the user.

The license information includes usage rule information for reproduction, moving and copying of the content, and the user terminal 1930 controls usage of the content based on the license information.

Figure 20:
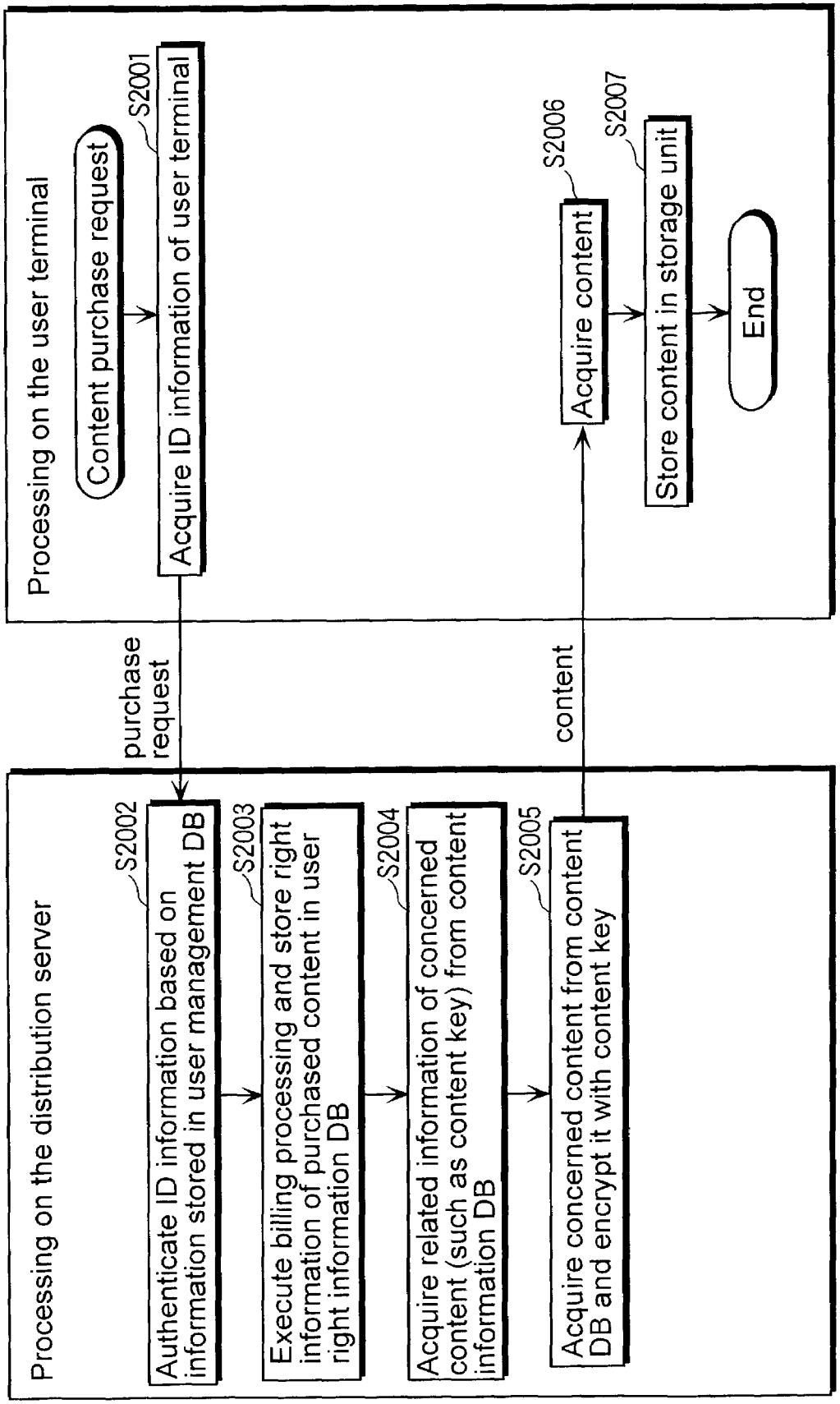
FIG. 20 is a flow chart that shows the processing which is executed when a content is purchased in the digital content distribution system according to the third embodiment.

FIG. 20 is a flow chart, which shows processing that is executed when the user terminal 1930 purchases a content from the distribution server 1910 in the digital content distribution system according to the present embodiment.

When the user makes a content purchase request,

S2001: the communication unit 1931 of the user terminal 1930 acquires the ID of the user terminal 1930 that is stored in the ID information storage unit 1932, and sends the ID information and the content purchase request to the distribution server 1910.

S2002: Once the user authentication unit 1912 receives this information via the communication unit 1922 of the distribution server 1910, the user authentication unit 1912 collates the received ID information with the ID information stored in the user management database 1911 for the user authentication, and passes the content purchase request to the user right processing unit 1914.

S2003: The user right processing unit 1914 executes billing processing for the content purchase and registers the user's right information for the purchased content onto the user right information database 1913.

S2004: The content information generation unit 1917 acquires the related information of the concerned content (such as the content key) from the content information database 1916 and passes the acquired information to the content acquirement unit 1920.

S2005: The content acquirement unit 1920 acquires the concerned content from the content database 1219, and the content encryption unit 1921 encrypts this content with the content key. The communication unit 1922 of the distribution server 1910 sends the encrypted content to the user terminal 1930.

S2006: Once the communication unit 1931 of the user terminal 1930 receives the encrypted content, S2007: the communication unit 1931 sends the content to the storage unit 1933 to have it stored.

Figure 21:
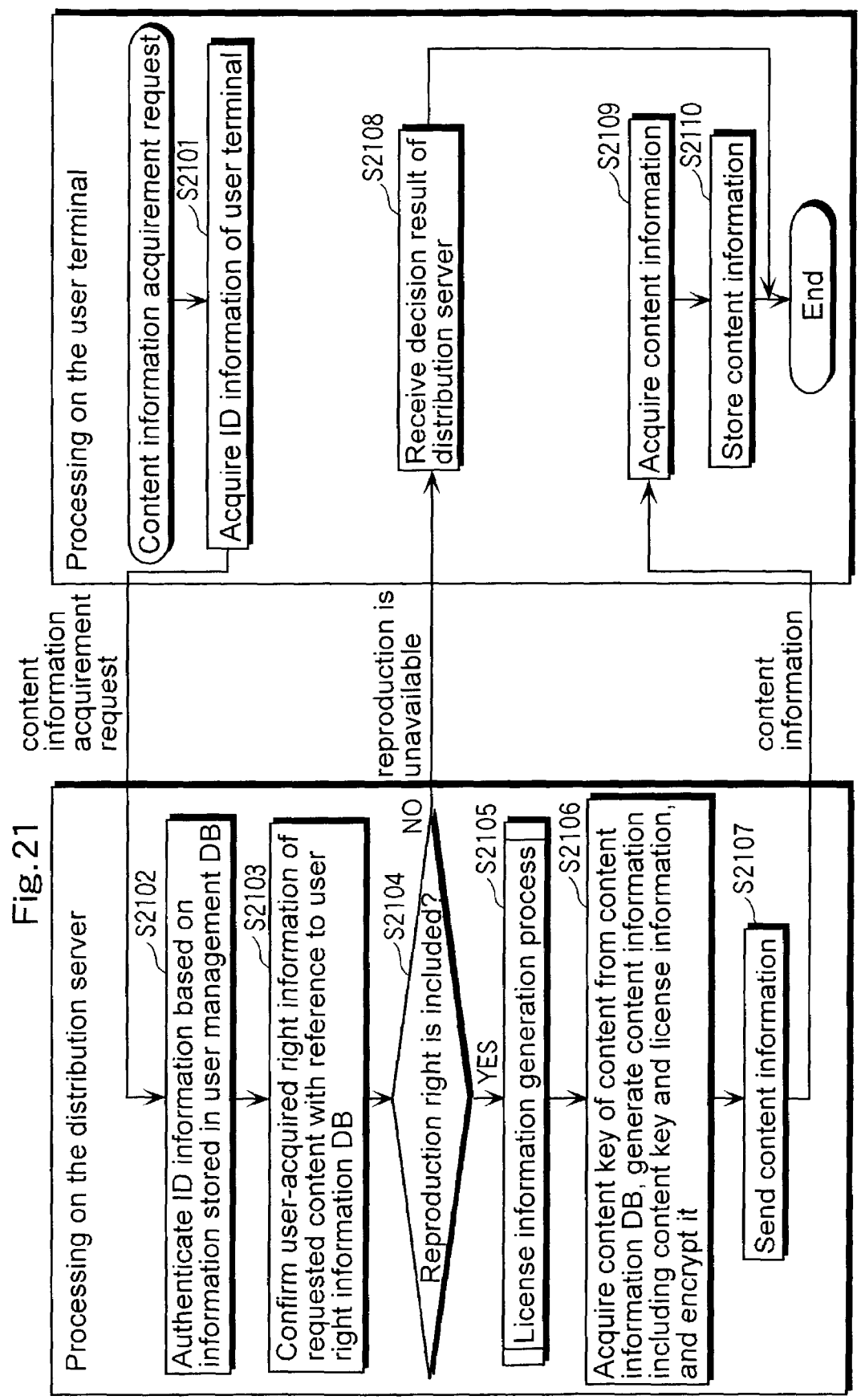
FIG. 21 is a flow chart that shows the processing which is executed when content information is acquired in the digital content distribution system according to the third embodiment.

Next, the processing in the case where the user terminal 1930 acquires the content information to reproduce the content (content information acquirement process) in the digital content distribution system according to the present embodiment will be explained with reference to FIG. 21.

When there is a request made by the user to acquire the content information for reproducing the content (LT issuance request/ELI (expected LT information)), S2101: the communication unit 1931 of the user terminal 1930 acquires the ID information of the user terminal 1930 that is stored in the ID information storage unit 1932, and sends the ID information and the content information acquirement request (LT issuance request/ELI) to the distribution server 1910.

S2102: Once the user authentication unit 1912 receives the ID information through the communication unit 1922 on the distribution server 1910, the user authentication unit 1912 collates the received ID information with the ID information stored in the user management database 1911 for the user authentication, and passes the user information and the content information acquirement request (LT issuance request/ELI) to the user right processing unit 1914.

S2103: With reference to the user right information database 1913, the user right processing unit 1914 confirms the right information for the user who is specified with the user information passed in S2102 and of the content that has been subject to the content information acquirement request.

S2104: When the right information that is confirmed in S2103 includes the reproduction right, the user right processing unit 1914 passes the details of the reproduction right to the license information generation unit 1915.

Here, the details of the reproduction right are the information indicating that "reproduction is available N times", for example. After that, S2105: the license information generation process will be executed as described below.

S2106: The content information generation unit 1917 reads out the content key of the concerned content from the content information database 1916, and generates the content information including this content key and the license information which is generated in the license information generating process. The content information encryption unit 1918 encrypts this content information.

S2107: The communication unit 1922 of the distribution server 1910 sends the encrypted content information to the user terminal 1930.

Note that when the user's right information does not include the reproduction right of the concerned content in S2104, the distribution server 1910 sends the notice that the content cannot be reproduced to the user terminal 1930 (S2108).

On the other hand, at the user terminal 1930 side,

S2109: once the communication unit 1931 of the user terminal 1930 receives the content information, S2110: the communication unit 1931 sends the content information to the content information database 1938 to have it stored.

Figure 22:
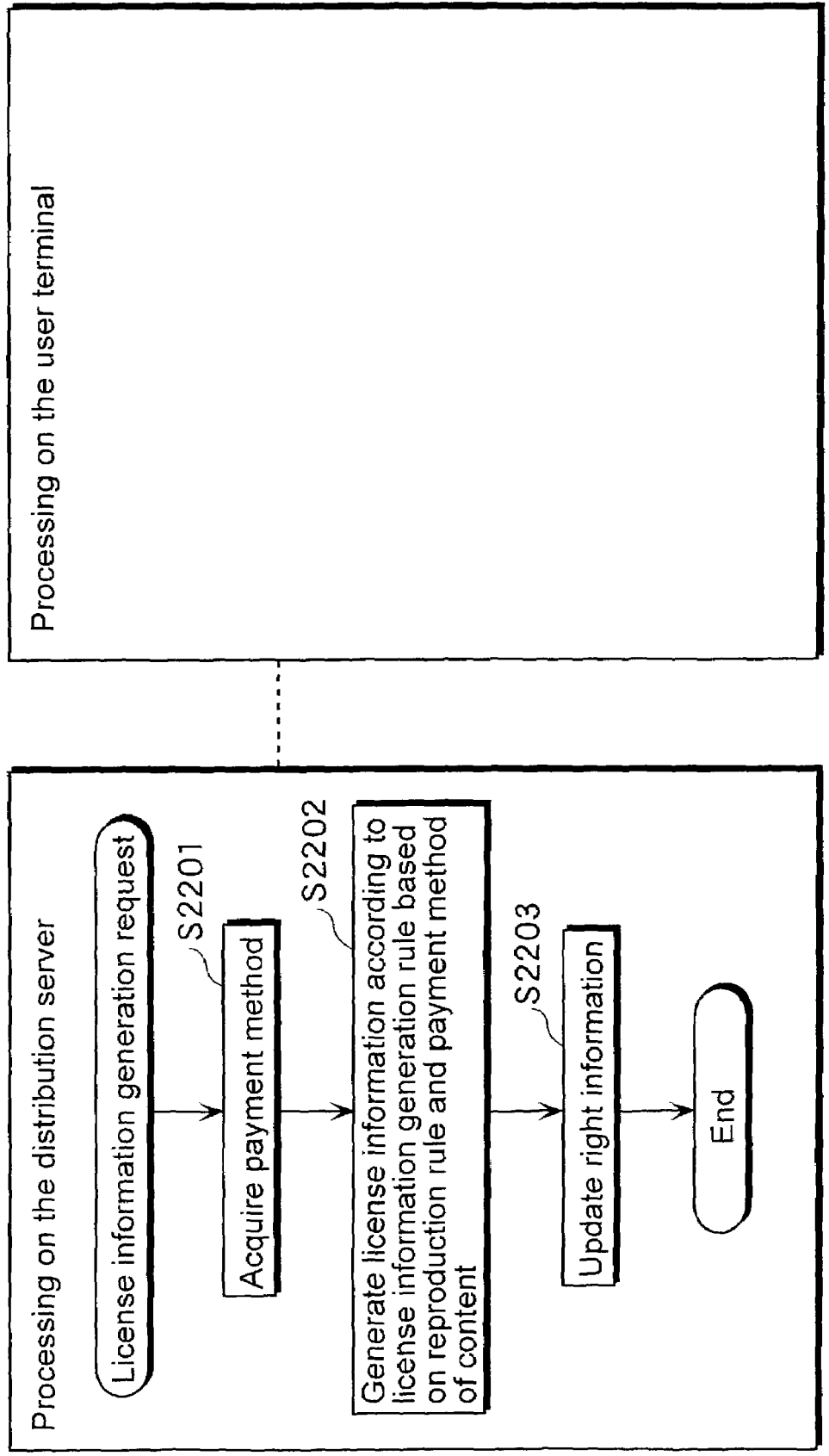
FIG. 22 is a flow chart that shows the processing which is executed when license information is generated in the digital content distribution system according to the third embodiment.

FIG. 22 shows the processing flow in the case where the distribution server 1910 generates license information (the license information generation process) in the digital content distribution system according to the present embodiment. When there is a license information generation request, S2201: the license information generation unit 1915 obtains the information on the reliability of the user who requests the content information from the user management database 1911.

In the present embodiment, the information on the reliability is, for example, the information on the payment method of the content price such as a cash payment for a bill.

S2202: The license information generation unit 1915 generates the license information according to the license information generation rule (whose sample is shown in FIG. 23) describing the generation rule of the license information, based on the information on the detail of the reproduction right which is received in S2104 and the reliability of the user which is obtained in S2201, and passes the generated license information to the content information generation unit 1917.

S2203: The user right processing unit 1914 updates the details of the reproduction right in the right information which is stored in the user right information database 1913 (or decrements the value of the available reproduction number of times which is described in the reproduction right by the value of the available reproduction number of times which is described in the license information generated in S2202).

Note that when the available reproduction number of times is infinitely large among the reproduction rights, the user right processing unit 1914 does not update the details of the reproduction right.

Here, the license information generation rule as shown in FIG. 23 will be explained in detail.

The license information generation rule as shown in FIG. 23 determines the details of the license information to be generated based on the information on the detail of the reproduction right and the reliability of the user. As for the reliability of the user, the following two types are defined: "payment method: cash payment for a bill" and "payment method: credit card".

According to the license information generation rule as shown in FIG. 23, when the detail of the reproduction right received in S2104 is "reproduction is available ∞ times" and the information on the user reliability obtained in S2201 is "payment method: cash payment for a bill", the license information describing that "the available reproduction number of times is 1" is to be generated. On the other hand, when the detail of the reproduction right received in S2104 is "reproduction is available ∞ times" and the information on the user reliability obtained in S2201 is "payment method: credit card", the license information describing that "the available reproduction number of times is ∞" is to be generated.

Also, according to the license information generation rule as shown in FIG. 23, when the detail of the reproduction right received in S2104 is "reproduction is available plural times" and the information on the user reliability obtained in S2201 is "payment method: cash payment for a bill", the license information describing that "the available reproduction number of times is 1" is to be generated. On the other hand, when the detail of the reproduction right received in S2104 is "reproduction is available plural times" and the information on the user reliability obtained in S2201 is "payment method: credit card", the license information describing that "the available reproduction number of times is N" is to be generated. Note that N is a finite integer of 2 or more.

Furthermore, according to the license information generation rule as shown in FIG. 23, when the detail of the reproduction right received in S2104 is "reproduction is available 1 time", for example, it means that the license information describing that "the available reproduction number of times is 1" is to be generated for any type of the user reliability. In this manner, it becomes possible to set the license information generation rule flexibly in accordance with the user reliability.

Figure 24:
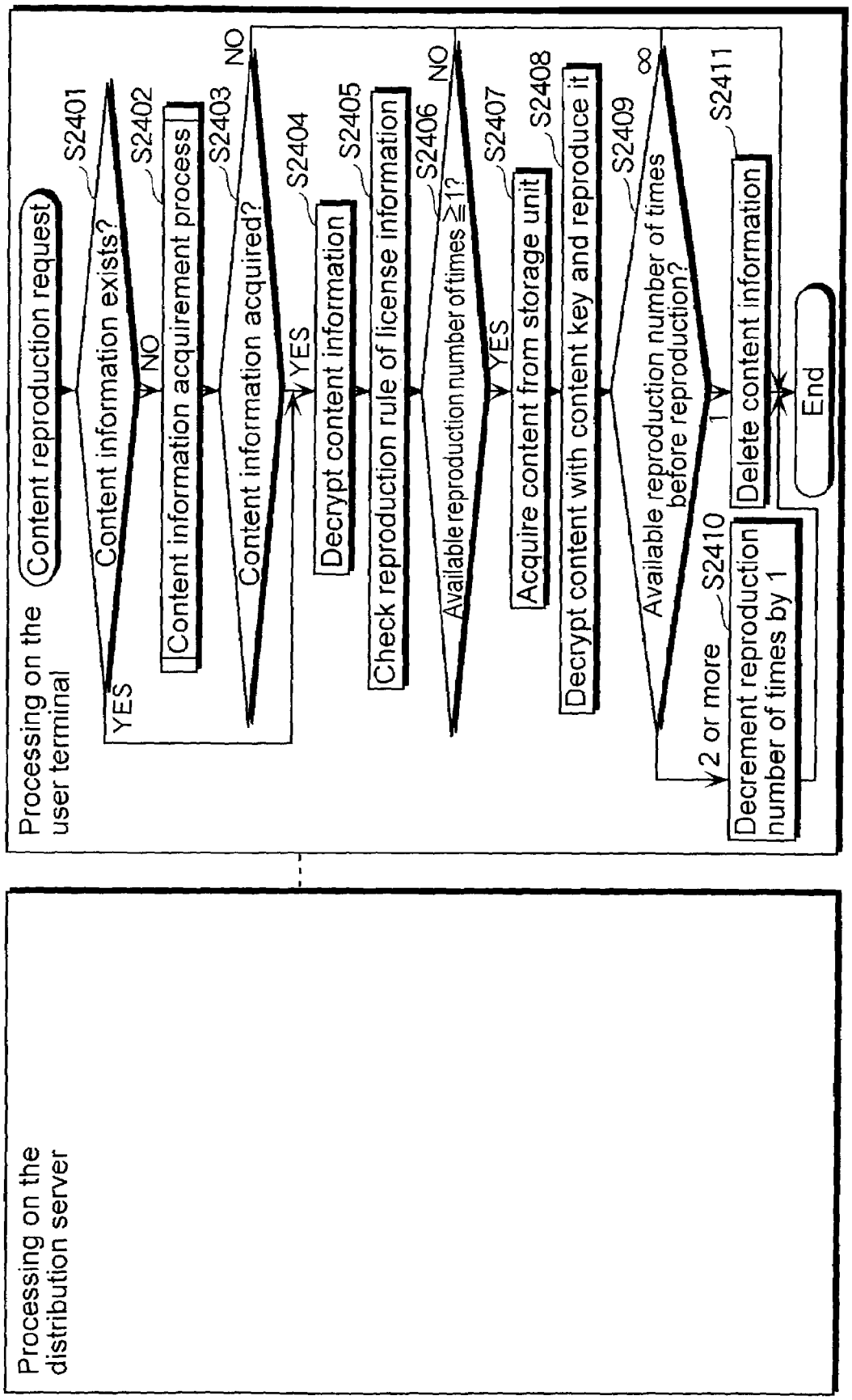
FIG. 24 is a flow chart that shows the processing which is executed when the content is reproduced in the digital content distribution system according to the third embodiment.

FIG. 24 shows a processing flow in the case where the user terminal 1930 reproduces a content in the digital content distribution system according to the present embodiment.

When there is a content request made by a user,

S2401: the content information decryption unit 1937 checks whether or not the content information corresponding to the content whose reproduction is requested exists in the content information database 1938. When the content information exists in the content information database 1938, the processing in S2402 and S2403 is skipped to move on to the processing in S2404.

S2402: When the content information does not exist in S2401, the above-mentioned content information acquirement process is executed.

S2403: When the content information can be acquired because the content information acquirement process is executed, S2404: the content information decryption unit 1937 decrypts the content information to obtain the license information and the content key, and passes them to the license information processing unit 1936.

S2405: The license information processing unit 1936 checks the reproduction rule described in the license information.

S2406: When license information processing unit 1936 decides that the available reproduction number of times is 1 or more, S2407: the license information processing unit 1936 acquires the content from the storage unit 1933, and S2408: the content decryption unit 1935 decrypts the content with the content key to reproduce it.

S2409-S2411: After the reproduction of the content, the content information stored in the content information database 1938 is updated. Here, when the available reproduction number of times before the reproduction is 2 or more and finite, the available reproduction number of times which is described in the license information in the content information is decremented by 1. Also, when the available reproduction number of times before the reproduction is 1, the processing for deleting or canceling the content information is performed. When the available reproduction number of times is infinitely large, the content information is not updated.

Furthermore, when the content information cannot be acquired from the distribution server 1910 in S2403, and when it is decided in S2406 that the content cannot be reproduced, the processing is completed without reproducing the content.

Note that although "reproduction" has been explained as one form of "usage" of a content in the present embodiment, the usage is not limited to the reproduction of the content, but may include any actions such as copying onto the external medium, printing and others.

Also, although the payment method has been explained as the information on the user reliability in the present embodiment, the information on the user reliability is not limited to the payment method, but may include the information on the user status such as a platinum member and an ordinary member. Here, the user status is determined based on the total amount of the contents that the user purchased, his payment results, and others.

Also, the license information generation rule may change in accordance with the information on the user reliability. For example, when the information on the user reliability indicates the user status, the license information generation rule is what is shown in FIG. 25 (a sample).

In FIG. 25, the user status is divided into three types: a "platinum member", a "silver member" and an "ordinary member", and it is defined that the status of the platinum member is highest and that of the ordinary member is lowest.

When the reproduction right is "reproduction is available times", it means that the license information describing that "the available reproduction number of times is ∞" is to be generated for the "platinum member." Also, when the reproduction right is "reproduction is available ∞ times", it means that the license information describing that "the available reproduction number of times is N" is to be generated for the "silver member." Furthermore, when the reproduction right is "reproduction is available ∞ times", it means that the license information describing that "the available reproduction number of times is 1" is to be generated for the "ordinary member." Note that N is a finite integer of 2 or more.

Also, when the reproduction right is "reproduction is available plural times", it means that the license information describing that "the available reproduction number of times is N" is to be generated for the "platinum member." Also, when the reproduction right is "reproduction is available plural times", it means that the license information describing that "the available reproduction number of times is 1" is to be generated for the "silver member." Furthermore, when the reproduction right is "reproduction is available plural times", it means that the license information describing that "the available reproduction number of times is 1" is to be generated for the "ordinary member." Note that N is a finite integer of 2 or more.

Furthermore, when the reproduction right is "reproduction is available 1 time", it means that the license information describing that "the available reproduction number of times is 1" is to be generated for users of any status. In this manner, it becomes possible to set and issue the license information flexibly depending upon the user status.

Just as described, in the digital content distribution system according to the third embodiment, the distribution server can distribute the license information that is most suitable for the user reliability. When the license information is generated and distributed from the usage rule describing that an N-time reproduction is available, for example, it becomes possible to distribute the license information describing that N-time reproduction is available to the highly reliable user, and the license information describing that 1-time reproduction is available to the less reliable user.

The Fourth Embodiment

The following is a detailed explanation of the fourth embodiment of the present invention with reference to figures.

Figure 26:
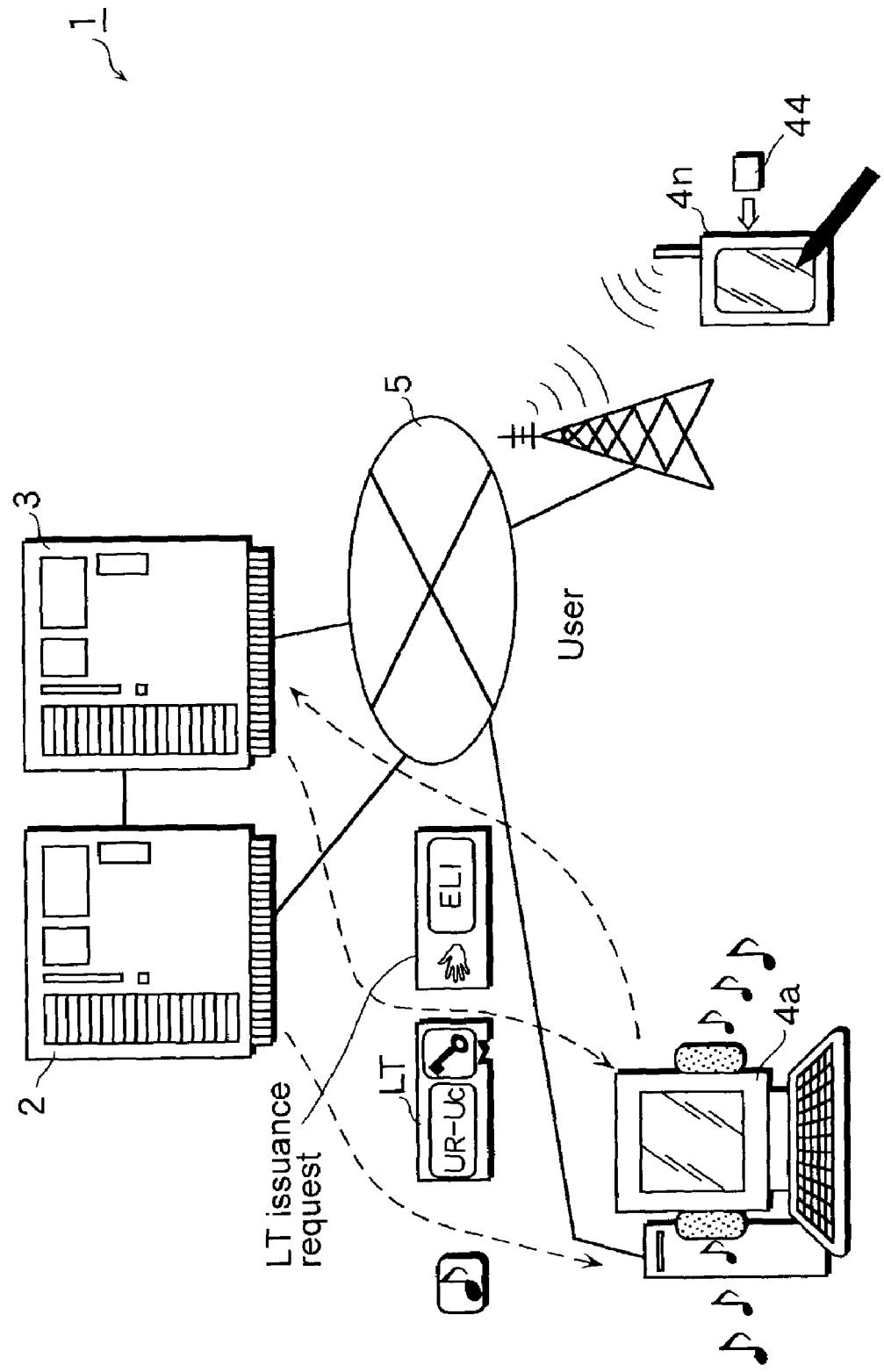
FIG. 26 shows an overall structure of the content usage management system (also referred to as NetDRM system) related to the fourth embodiment of the present invention.

FIG. 26 shows an overall structure of the content usage management system (also referred to as NetDRM system) related to the fourth embodiment.

This NetDRM system 1 is a system that protects a copy right of content by distributing a digitized content such as music, movies and books, having a usage right (license) of each content granted to a user who subscribes (requests) the content which is mainly under a content provider's management in a dynamic manner, distributing a license ticket (hereinafter also referred to as "LT") to use the content based on the user's request (LT issuance request), and making the content available for use within a range of a usage rule (UR-Uc) contained in LT. The NetDRM system 1 is comprised of a content distribution server 2 and a usage rule management server 3 that are owned by the provider who manages content usage, a user terminal(s) 4a, . . . , 4n owned by a user who joins this NetDRM system 1, and a communication network 5 which connects these entities. Hereinafter, when one of the indefinite number of NetDRM terminals such as user terminals 4a, . . . , 4n is indicated, it is referred to as user terminal 4.

The content distribution server 2 is a computer such as a workstation and is functioned as a content distribution server. To be more specific, the content distribution server a has a web page that accepts a request of content distribution, and distributes an encrypted content to the user terminal 4 according to a content distribution request from the user terminal 4.

The usage rule management server 3 is a computer such as a workstation and is functioned as a user management server, a billing server and a license management server. To be more specific, the usage rule management server 3 has a web page that manages a user who joins this system 1 and a terminal that is owned by the user, accepts a usage right subscription request of the content from the user terminal 4, etc., accepts a license ticket issuance request (hereinafter also referred to as "LT issuance request") from the user terminal 4a, etc., then bills accordingly for the usage right subscription request of the content from the user terminal 4, and distributes the LT based on an LT issuance request, which makes the encrypted content available for use on the user terminal 4.

This LT includes a content key to decrypt an encrypted content and a part of usage rule (UR-Uc) extracted from a usage right (license) granted to the user for the content.

The user terminal 4 is a computer device such as a personal computer, a mobile information terminal and a digital television, which is functioned as a client for the usage rule management server 3. To be more specific, the user terminal 4 accesses to a web page of the usage rule management server 3 by using a tool such as an Internet browser software, etc. according to the user's operations, sends a content subscription request, receives content distribution, sends an LT issuance request for using the content and receives the LT, and reproduces the content within a scope of the extracted usage rule of the LT.

An external media 44 for another user terminal (for example, an SD card, etc.) can be attached to the user terminal 4. The user terminal 4 is structured to make the content or LT held on the user terminal 4 be available for copying and moving to the external media 44 so that the content can be reproduced on the other user terminal.

A communication network 5 is a communication cable media like the Internet, CATV, etc. and a communication wireless media like the digital broadcasting, etc.

Figure 27:
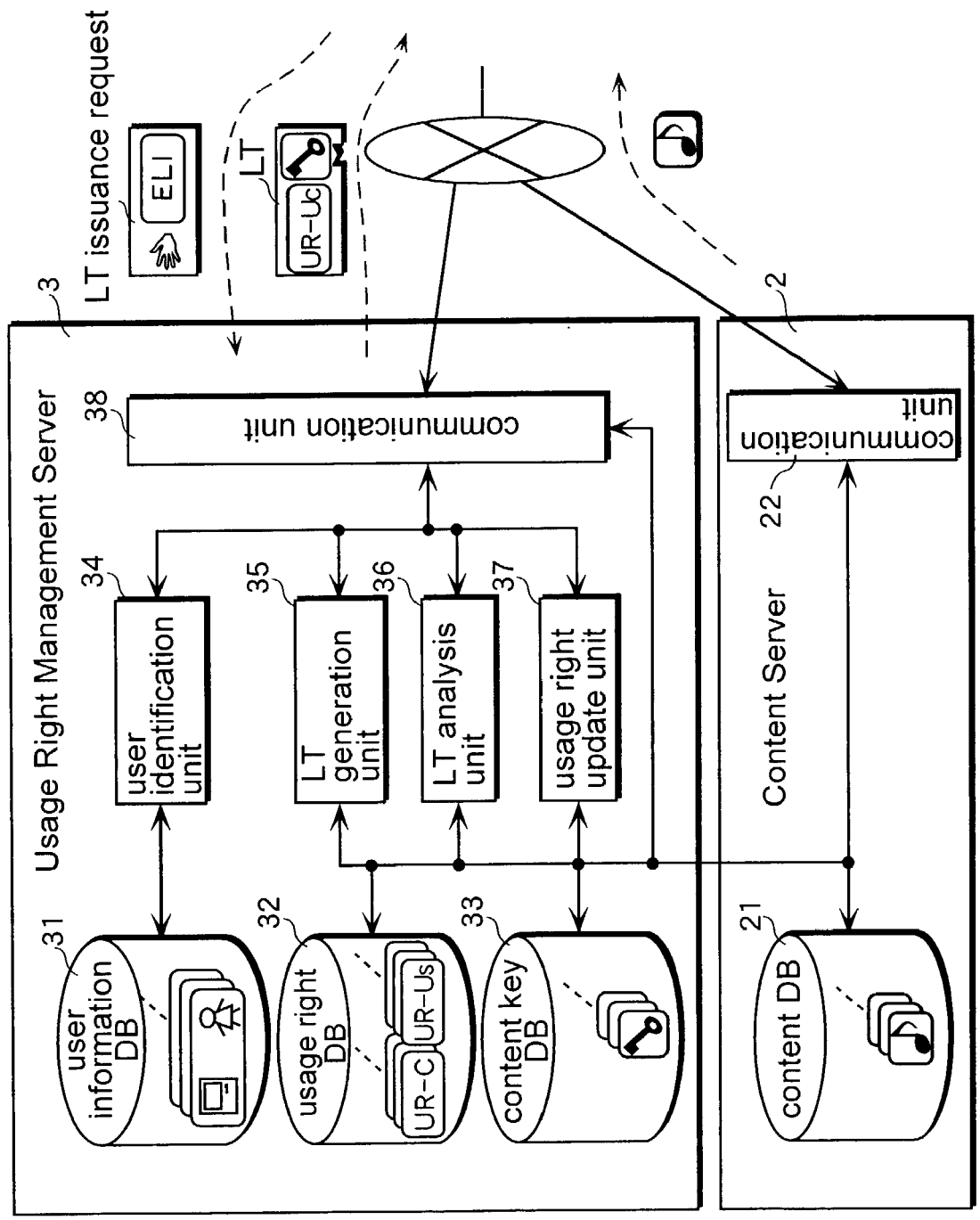
FIG. 27 is a function block diagram to show structures of the content distribution server and the usage rule management server indicated in FIG. 26.

FIG. 27 is a function block diagram to show the structures of the content distribution server 2 and the usage rule management server 3 indicated in FIG. 26. The communication network 5 is also shown in FIG. 27.

The content distribution server 2 is equipped with a content database 21 and a communication unit 22. The encrypted content is associated with a content ID, etc. that is a unique identifier assigned to this content and held in the content database 21. The communication unit 22 accepts a content distribution request from the user terminal 4 and distributes the requested content.

A structure of the usage management server 3 is roughly divided into a data unit (a user information database 31, a usage right database 32 and a content key database 33) that is realized by a data file, etc. stored in a hard disk, etc., and a processing unit (a user identification unit 34, an LT generation unit 35, an LT analysis unit 36, a usage right update unit 37 and a communication unit 38) that is realized by a program, etc. executed by a CPU and hardware such as a CPU, RAM, ROM, etc.

Using the terminal ID of the user terminal 4, the user information database 31 memorizes a user ID and a user name, etc. of the user who purchases the user terminal and registers the user as a member of this content usage management system. The usage right database 32 stores the usage right (UR-C) per content decided by a content provider and the user's right information (license) of the content. To be more specific, the usage right database 32 is a memory unit that memorizes multiple numbers of the contents that are subscribed by the user and the remaining information of the usage right (license) owned by the user for the content based on each type of usage (for example, reproduction, printing, etc.) The content key database 33 stores related information of the content (such as a content key). To be more specific, a multiple number of content keys to encrypt the content are associated with the content ID and memorized in the database.

Using the terminal ID of the user terminal 4, the user identification unit 34 identifies a user ID, etc. that corresponds to this terminal ID. The LT generation unit 35 generates the corresponding LT based on the ELI contained in the LT issuance request sent from the user terminal 4. The LT analysis unit 36 analyzes the LT sent from the user terminal 4 and updates details of the UR-Us according to a result of the analysis. The usage right update unit 37 updates details of the UR-Us stored in the usage right database 32 if the LT is sent from the LT generation unit 35 to the user terminal 4.

The communication unit 38 communicates with the user terminal 4. To be more specific, the communication unit 38 is a communication interface realized by a script, a program, etc. which is described in the web page that communicates with the user terminal 4 via the communication network 5. The communication unit 38 analyzes a command and a message sent from the user terminal 4, requests a process according to its result to the user identification unit 34 and the LT analysis unit 36, distributes the LT passed from the LT generation unit 35 to the user terminal 4, and forms a SAC (Secure Authentication Channel) with the user terminal 4. The communication unit 38 acquires information related to the UR-Us of the usage right database 32 according to the request from the user terminal 4 and information related to the content in the content database 21 via a bus, sends this information to the user terminal 4 that is making such a request, and provides a GUI (Graphical User Interface) for LT subscription and LT issuance requests.

Figure 28:
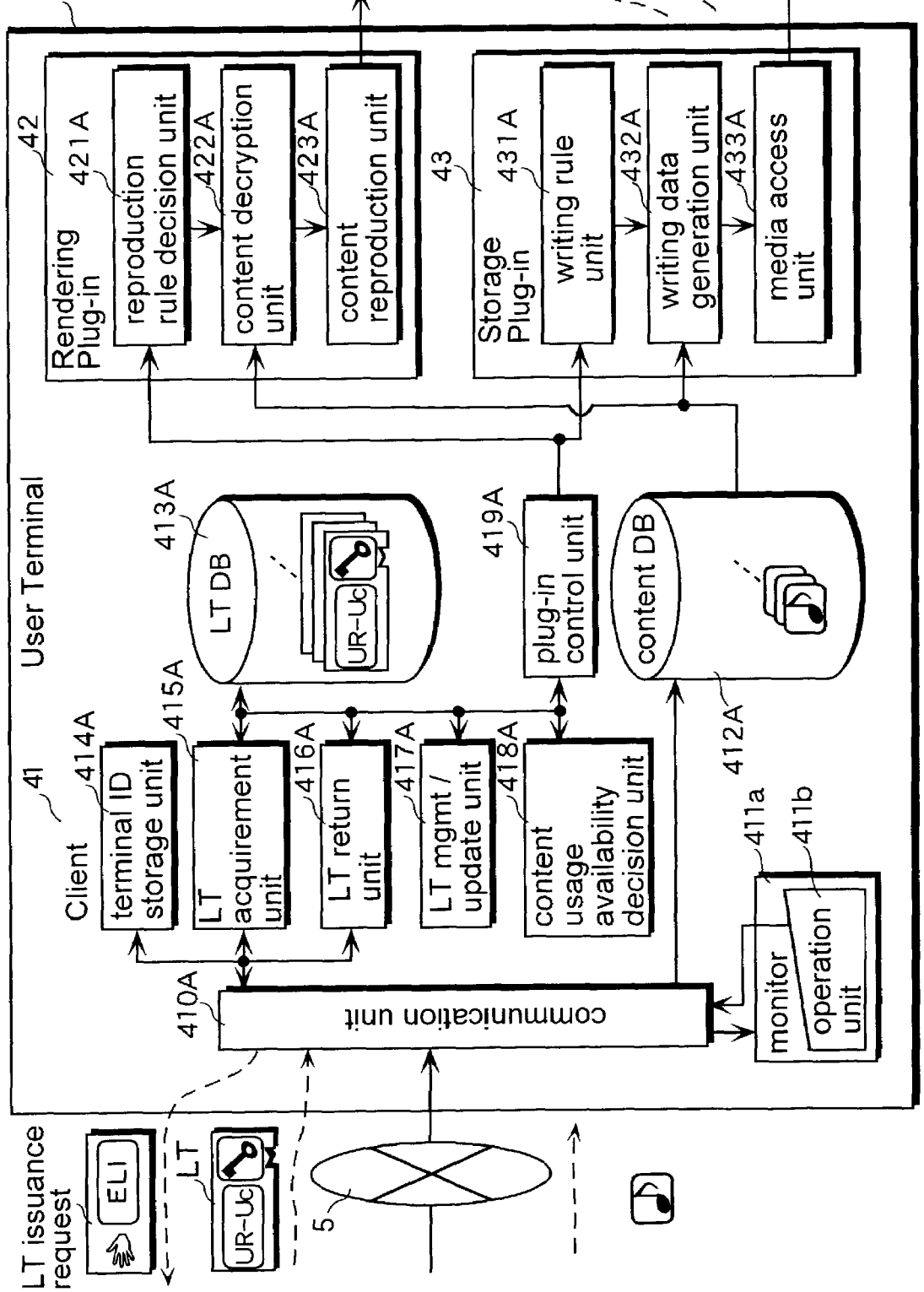
FIG. 28 is a functional block diagram to show a structure of the user terminal indicated in FIG. 26.

FIG. 28 is a functional block diagram to show the structure of the user terminal 4 indicated in FIG. 26. The communication network 5 is also shown in FIG. 28.

A structure of the user terminal 4 is roughly divided into a client 41 that requests to issue an LT and manages the acquired LT comprehensively, a rendering plug-in 42 that reproduces content such as music, movies, etc., a storage plug-in 43 that writes the acquired content and LT to some external media and an external media 44 such as an SD card, etc. that stores the written content and LT.

The client 41 consists of a communication unit 410A, a monitor 411a, an operation unit 411b, a content database 412A, an LT database 413A, a terminal ID storage unit 414A, an LT acquirement unit 415A, an LT return unit 416A, an LT management/update unit 417A, a content usage availability decision unit 418A and a plug-in control unit 419A. The rendering plug-in 42 consists of a reproduction rule decision unit 421A, a content decryption unit 422A and a content reproduction unit 423A. The storage plug-in 43 consists of a writing rule decision unit 431A, a writing data generation unit 432A and a media access unit 433A.

The communication unit 410A of the client 41 communicates with the content distribution server 2 and the usage rule management server 3. To be more specific, the communication unit 410A is a communication interface that communicates with the content distribution server 2 and the usage rule management server 3 via the communication network 5 according to a browser software, etc., which stores the content sent from the content distribution server 2 according to a request from the operation unit 411b into the content database 412A, forms a SAC (Secure Authentication Channel) with the communication unit 38 of the usage rule management server 3, sends messages such as content usage right subscription requests and LT issuance requests to the usage rule management server 3, and stores an LT sent from the usage rule management server 3 into the LT database 413A.

The monitor 411a displays a web page provided by the usage rule management server 3, and also displays GUI, etc. for LT subscription and LT issuance requests. The operation unit 411b is a user interface that accepts a user's operations. The content database 412A consists of, for example, a HDD (hard disk drive), etc. and stores the encrypted content. The LT database 413A stores the LT sent from the communication unit 410A securely. The terminal ID storage unit 414A stores a terminal ID, etc. of the user terminal 4.

The LT acquirement unit 415A generates an LT issuance request, sends the LT issuance request to the usage rule management server 3 via the communication unit 410A, and acquires an LT sent from the usage rule management server 3 and stores the acquired LT into the LT database 413A. The LT return unit 416A returns the LT to the usage rule management server 3 via the communication unit 410A when necessary. The LT management/update unit 417A manages the LT stored in the LT database 413A and updates a usage rule contained in the LT. The content usage availability unit 418A decides whether or not the LT can be used based on a usage rule of the LT. The plug-in control unit 419A is equipped with a secure clock mechanism that measures the time spent for content reproduction through the rendering plug-in 42 and controls an available reproduction number of times based on the measured time.

A reproduction rule decision unit 421A of the rendering plug-in 42 decides a reproduction rule based on a rule (P rule) in the rendering plug-in 42 sent from the client 41. The content decryption unit 422A decrypts the content acquired from the content database 412A with a content key sent from the client 41. The content reproduction unit 423A reproduces the decrypted content.

A writing rule decision unit 431A of the storage plug-in 43 decides a writing rule based on a rule (P rule) in the storage plug-in 43 sent from the client 41. The writing data generation unit 432A converts the received LT and the content acquired from the content database 412A into a data format for the external media 44. The media access unit 433A writes the formatted data into the external media 44.

In this NetDRM system 1, a usage rule (UR) is specified by a content provider and managed along with a usage rule UR-C subject for user subscription in the usage rule management server. The usage rule (UR) consists of the usage rule UR-Us that is subscribed and currently owned by the user and the usage rule UR-Uc that is an extraction from the UR-Us as its part and managed in the user terminal. Regarding the UR-Us, a number of times, etc. is reduced from the UR-C in accordance with an issuance of an LT corresponding to the ELI contained in an LT issuance request. Whereas UR-Us can handle multiple contents subscribed by one user as one group, the UR-Uc handles only one content. ELI is information embedded into the LT issuance request to indicate which content is used with what rule. LT is information combining a content key and UR-Uc for the specified content. If there is an LT issuance request, information (S rule, for example, a number of terminals used at the same time) managed in the NetDRM server is used to decide whether or not the LT can be issued. In the NetDRM client, whether or not an action can be initiated is based on a client rule (C rule, for example, an effective period, a number of times available to use, accumulative usage duration). Also, the plug-in controls reproduction based on a plug-in rule (P rule, for example, 2ch reproduction, etc.).

Figure 29:
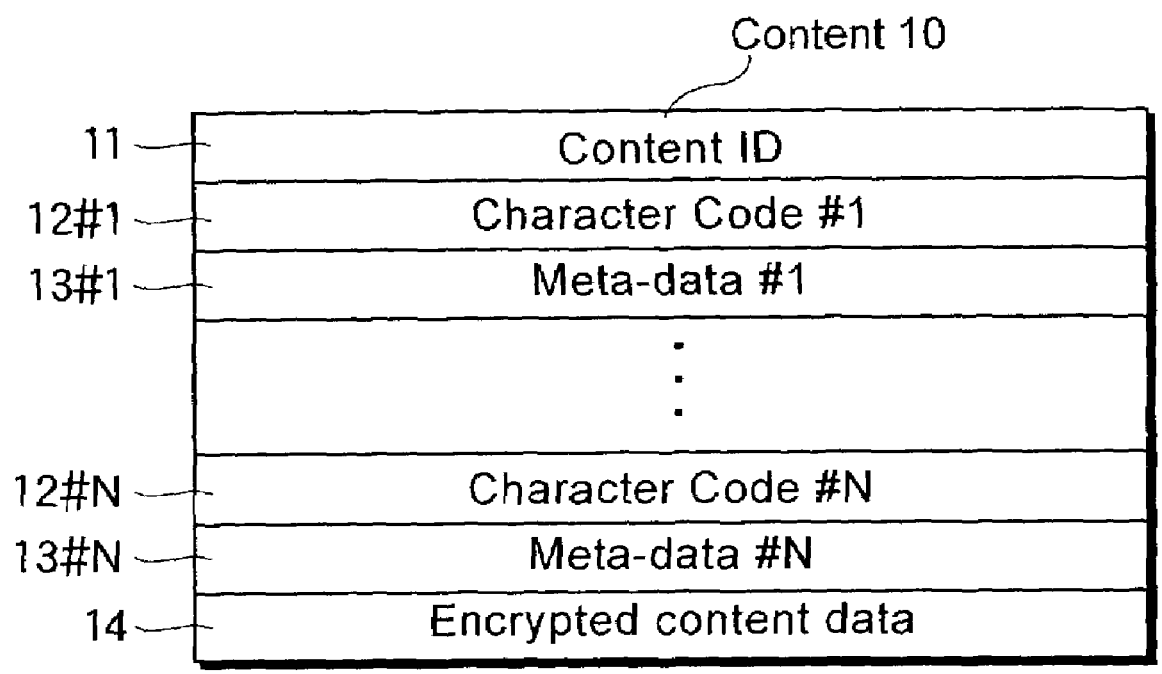
FIG. 29 shows a sample structure of a data format of the contents held in the content database indicated in FIG. 27.

FIG. 29 shows a sample structure of a data format of the contents held in the content database 21 indicated in FIG. 27.

The content 10 consists of the content ID 11 as a unique identifier that is assigned to the content, a single or multiple character code(s) 12 #1, . . . , #N, detail meta-data 13 #1, . . . #N indicated by this character code 12 #1 to #N, and the encrypted content data 14.

For example, when the content is music called "Surfer George", "riderjogi" is described in the content ID 11. Also, in the character code 12 #1, . . . , #N, there is a description showing if it is an EUC (Extended Unix Code) or a junet code (iso-2022-jp code). In the meta-data 13 #1, . . . , #N, for example, a "track" name, a "singer", a "back band", a "lyric writer", or a "composer", etc. are described. Additionally, the content itself (music, "Surfer George in this example) is stored in the encrypted content data 14 after the content is encrypted with a pre-specified key.

This encrypted content data 14 in the content 10 cannot be viewed without having it be decrypted by acquiring the content key that is associated by the content ID 11. Therefore, the content 10 can be freely downloaded even from general users who are not a member of this system.

FIG. 30 is a diagram that shows a sample structure of a user information table held in the user information database 31 indicated in FIG. 27.

The user information table 50 is a table to specify a user with a terminal ID of his terminal purchased by the user and registered on the usage rule management server 3, which contains fields such as "Terminal ID" 51 that is a unique identifier to the user terminal in this system, "User ID" 52 that is a unique identifier to the user in this system who purchases this user terminal, a user name, an address, a telephone number, etc. (not shown in FIG. 30).

For example, in the case of a user Okamoto who purchases two sets of the user terminal and registers these user terminals to the system, "XXX111" and "XXX222" as the terminal IDs are respectively assigned to these user terminals, "XXXAAA" as the user ID is assigned to Okamoto, and his user name, address and telephone number, etc. are stored in two records. In the case of a user Azuma who purchases a set of the user terminal and registers this user terminal to the system, "XXX333" as the terminal ID is assigned to this user terminal, "XXXBBB" as the user ID is assigned to Azuma, and his user name, address and telephone number are stored in one record.

FIG. 31 is a diagram to show a sample structure of a usage right management table held in the usage right database 32 indicated in FIG. 27.

The usage right management table 60 is a table to manage a usage right (UR-Us) for each content that is subscribed to by a user with his user ID, and consists of fields of "User ID" 60A and "UR-Us" 60B for details of the usage right managed in this usage rule management server 3.

For example, in the case of the user Okamoto (User ID "XXXAAA") who subscribes usage rights for two contents: a track "Surfer George" and an electric dictionary "Kyojien", the usage rights of "Surfer George" and of "Kyojien" are stored in each respective record within UR-Us60B.

Additionally, in the case of the user Azuma (User ID "XXXBBB") who subscribes a usage right for a content of a movie called "Spider girl", the usage right of "Spider girl" is stored in one record within UR-Us60B.

Figure 32:
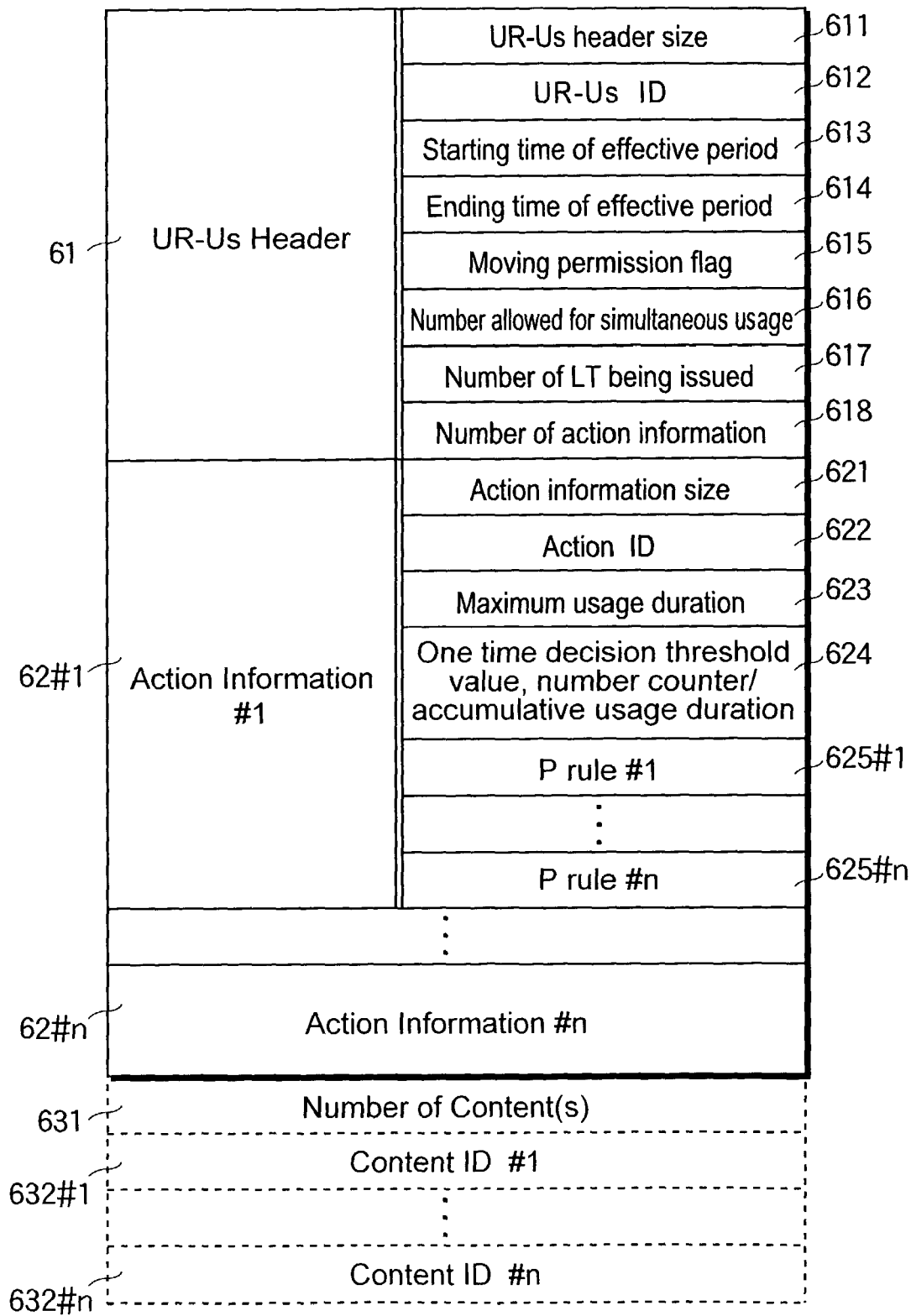
FIG. 32 is a diagram to show a detailed sample structure of UR-Us indicated in FIG. 31.

FIG. 32 is a diagram to show a detailed sample structure of the UR-Us60B indicated in FIG. 31.

A structure of the UR-Us60B is roughly divided into a UR-Us header 61 that manages basic usage details and a single or multiple action information 62 #1 to 62 #n that manages specific details of the usage right (actions such as reproduction, print moving, etc.). For details of the usage right, a content provider or a server administrator predetermines an initial value (UR-C) for each content according to an attribute of the content, and the details of the usage right are identical to UR-C granted to the user at the time of content subscription.

The UR-Us header 61 consists of a UR-Us header size 611 that shows the size of the UR-Us header 61, a unique identifier UR-Us ID 612 in this system that is assigned to the usage right for each content subscribed by this user, a starting time of an effective period 613, an ending time of the effective period 614, a moving permission flag 615, a number allowed for simultaneous usage 616, a number of LT being issued 617, the number of action information 618 that shows a number of action information 62 #1 to 62 #n.

The starting time of the effective period 613 and the ending time of the effective period 614 respectively show the beginning and ending time of the effective period for the user's usage right managed in the usage rule management server 3. However, for example, just like the case where the UR-Us indicates an effective period on a monthly basis, whereas the LT always shows an effective period on a daily basis, it is also possible for an LT to have a shorter effective duration than the one of the UR-Us. Further, if any effective period is not particularly specified, both of the time fields, 613 and 614, may have "unlimited". This effective duration specified in the LT is used as a rule/criteria to decide if a client in the NetDRM system 1 can start an action or not (hereinafter also referred to as "C rule").

The moving permission flag 615 shows whether the LT issued based on this UR-Us60B can be moved (Move-out, Export) from a recipient terminal to another terminal and some external media.

The number allowed for simultaneous usage 616 and the number of LT being issued 617 are catered for a user (for example, Okamoto who owns multiple user terminals) to cope with a situation such as where a content like an electronic book is shared among the terminals with some limitation in number. At the same time, the number allowed for simultaneous usage 616 contains information indicating how many LT(s) can be issued. The number of LT being issued 617 contains information how many LT(s) has/have been issued at the point of time. Every time an LT is issued, the number of LT being issued 617 is incremented and stops LT issuance when it reaches the number allowed for simultaneous usage. Contrary to this, if the LT being issued is returned from the user terminal, the number of LT being issued 617 is decremented. Because of this, a number of terminals allowed to use the content at the same time can be limited. The number allowed for simultaneous usage 616 and the number of LT being issued 617 are used as a rule to make a decision on the server in the NetDRM system 1 (hereinafter referred to as "S rule").

Each action information 62 #1 to 62 #n consists of action information size 621 that indicates a size of the action information 62 #1 to 62 #n, an action ID 622, a maximum usage duration 623, one time decision threshold value, a number counter/accumulative usage duration 624 and a P rule 625 #1 to 625 #n.

In the action ID 622, an identifier shows ways (types of actions) of content usage such as reproduction (Playback) and print (Print). In this action ID 622, for example, "2" is stored for reproduction (Playback) and "5" for print (print).

In the maximum usage duration 623, the maximum time length that allows consecutive usage of the content in a process such as reproduction is stored.

For the one time decision threshold value stored in the one time decision threshold value, the number counter/accumulative usage duration 624 shows the time duration that counts the content is used once. The number counter indicates a remaining number of times allowing to use the content. The accumulative usage duration indicates the accumulative time duration that allows the content to be used. The one time decision threshold value, the number counter and the maximum usage duration are exclusive to each other so that there is no case both are specified at the same time.

The value in the number counter here is decremented from the initial value accordingly for the usage rule and the license information extracted by the user's LT issuance request, and also incremented accordingly by the content provider's service provision request.

The P rules 625 #1 to 625 #n contain a control rule for each content in order to execute an action for the content through a plug-in on the user terminal. The rule would be, for instance, that the content can only be printed in black and white, or the music content must be replayed in a two-channel stereo, etc.

When the content is an album or a series of works consisting of multiple contents, a number of contents included in this album or the series of works, a number of contents 631, an identifier of the contents contained in this album or the series of works and the content ID 632 #1 to 632 #n are added to the UR-Us 60B to cope with the situation.

Figure 33:
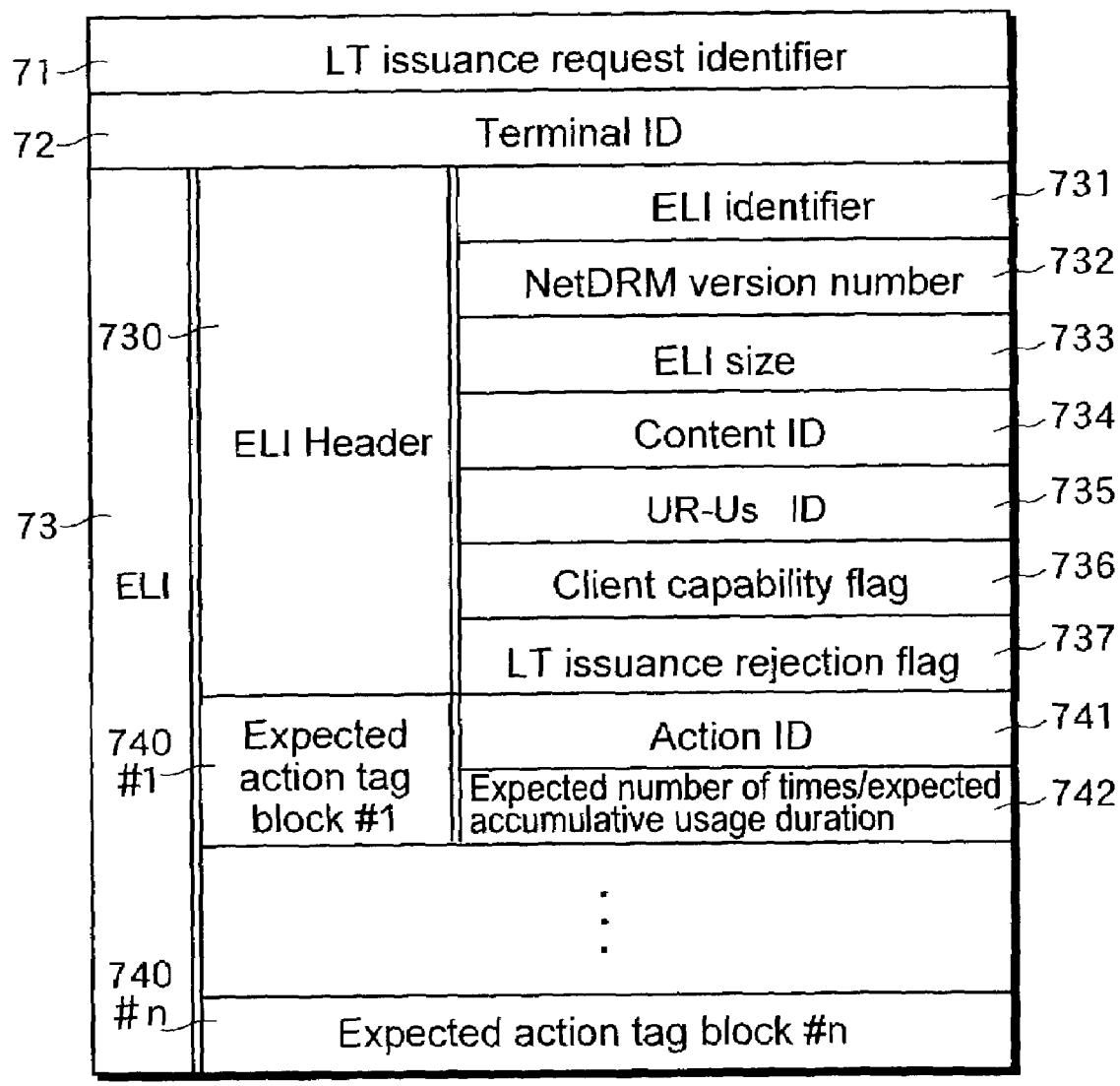
FIG. 33 is a diagram to show a sample structure of a data format of the LT issuance request indicated in FIGS. 26 to 28.

FIG. 33 is a diagram to show a sample structure of a data format of the LT issuance request 70 indicated in FIGS. 26 to 28.

A structure of the LT issuance request 70 is roughly divided into an LT issuance request identifier 71 that is a unique identifier to show that the request is an LT issuance request, a terminal ID 72 of a user terminal that generates the LT issuance request 70 and expected LT information 73 (hereinafter also referred to as "ELI") to show which content is used with what rule.

ELI 73 consists of an ELI header 730 which shows basic details of the issuance request and a single or multiple expected action tag block 740 #1 to 740 #n which shows specific details of the issuance request.

The ELI header 730 includes an ELI identifier 731 to show this ELI 73 is ELI, a NetDRM version number 732 to show a version of the user terminal defined in the specification prescribed in this NetDRM system 1, an ELI size 733 to show the size of the ELI 732, a content ID 734 of the content that is the subject for the LT requested to issue, a UR-Us ID 735 as an identifier of the usage right managed by the usage rule management server which is subject for extraction of the usage right, a client capability flag 736 that shows whether or not the client of the user terminal owns a secure database for LT storage or owns a secure clock for time management, and an LT issuance rejection flag 737 as a flag to show whether the server should not issue an LT or should issue an LT with a restricted/curtailed rule (for example, in the number of times) if the LT with the rule requested in ELI cannot be issued.

When an LT met with the rule specified in the ELI (a number of times, for example) cannot be issued, it consists of a flag to show that the server does not issue an LT or issues an LT for the number of times reduced in the rule, and an LT issuance rejection flag 737. The LT issuance rejection flag 737 stores "ON" for rejecting its issuance and "OFF" for allowing the curtailed/reduced rule.

The expected action tag block 740 #1 to 740#n consists of an identifier of the action requested to be included in the LT, an action ID 747, the number counter to indicate the number of times requested to be set in the issued LT, or an expected number of times/expected accumulative usage duration 742 that indicates accumulative usage duration requested to be set in the LT.

Figure 34:
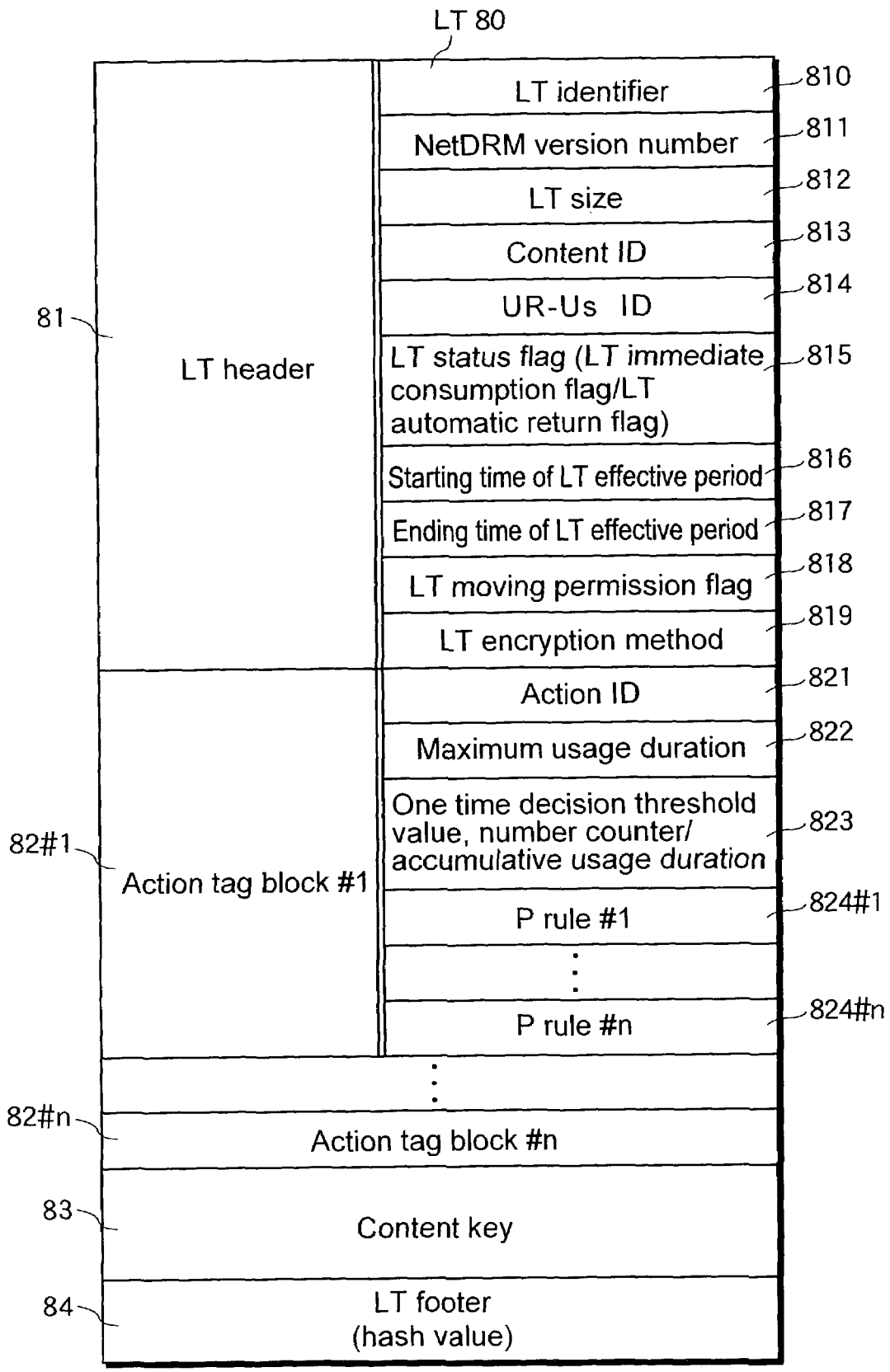
FIG. 34 is a diagram to show a sample structure of a data format of LT indicated in FIGS. 26 to 28.

FIG. 34 is a diagram to show a sample structure of a data format of the LT indicated in FIGS. 26 to 28.

A structure of LT 80 is roughly divided into an LT header 81 that manages basic details of usage, a single or multiple action tag block 82 that manages specific details (actions such as reproduction, print, etc.) of the usage right, a content key 83 and an LT footer 84 that is attachable as its option, and is indicated by a content ID, a group of C rules and P rules bounded by an action ID, a content key, etc.

The LT header 81 stores an LT identifier 810, a NetDRM version number 811, an LT size 812, a content ID 813, an UR-Us ID 814, an LT state flag (LT immediate consumption flag/LT automatic return flag) 815, the starting time of the LT effective period 816, the ending time of the LT effective period 817, an LT moving permission flag 818 and an LT encryption method 819.

The LT identifier 810 shows this data is a license ticket which is handled in this content usage management system 1. The NetDRM version number 811 shows a version of the specifications provided by the server defined in this system. The LT size 812 shows a data size of the entire LT. The content ID 813 shows an ID of the content subject for this LT. The UR-Us ID 814 indicates an ID of an UR-Us that is originated to issue this LT.

The LT status flag (LT immediate consumption flag/LT automatic return flag) 815 is the LT immediate consumption flag as a flag to show that this LT cannot be recorded to a recording medium and must be used immediately, and the LT automatic return flag as a flag to show that the LT must be returned automatically to the server when the right in this LT becomes ineffective. The LT automatic return flag is set "ON" for the case where the number allowed for simultaneous usage of UR-Us is limited, and set "OFF" for the case where the number allowed for simultaneous usage of UR-Us is unlimited. The LT immediate consumption flag is set "ON" for the case where there is no secure LT database in a client side and for the case where an expiration date is set in the UR-Us and a secure time function is unavailable in the client side, and set "OFF" for any case other than above cases.

The starting time of the LT effective period 816 shows the date and time when this LT becomes effective. The ending time of the LT effective period 817 shows the date and time when this LT becomes ineffective. The LT moving permission flag 818 shows whether this LT can be moved, moved out and exported. The LT encryption method 819 shows an encryption method (DES, AES, etc.) applied to the content key 83 and the LT footer 84 that may be added as its option.

The action tag blocks 82#1 to 82#n consist of the action ID 821, the maximum usage duration 822, the one time decision threshold value, the number counter/accumulative usage duration 823 and the P rules 824#1 to 824#n.

The action ID 821 shows an ID that specifies the action details for the content. The maximum usage duration 822 indicates the maximum time length to operate the content consecutively. the one time decision threshold value is set in the one time decision threshold value, and the number counter/accumulative usage duration 823 indicates time duration to decide that the content is used once. The accumulative usage duration is an accumulative operation time that allows content usage. In the maximum usage duration 822, the time is counted even during the time of pause, whereas time is not counted during the pause, etc. in the accumulative usage duration.

Figure 35:
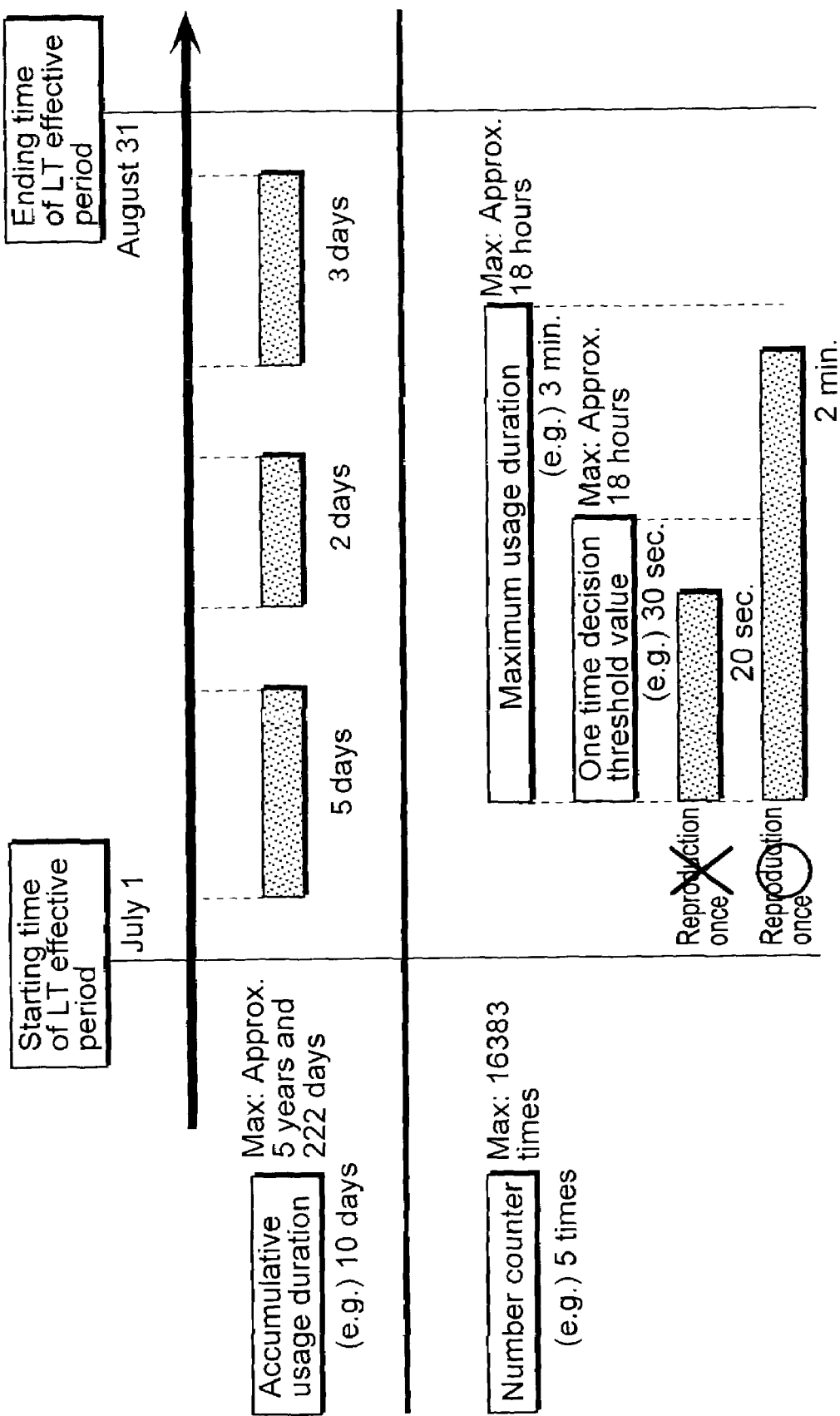
FIG. 35 is an explanation of the relationship between the number counter indicating once and the maximum usage duration, the one time decision threshold value and the accumulative usage duration.

FIG. 35 is an explanation of the relationship between the number counter indicating once and the maximum usage duration, and the one time decision threshold value and the accumulative usage duration.

The accumulative usage duration is used for the case where more strict control than one of the maximum usage durations is applied, and the time normally required to reproduce the content (for example, 10 days up to 5 years and 222 days as a maximum) is set in it. If a starting day of the LT effective period is July 1 and an ending day of the LT effective period is August 31, the content can be used at a certain time duration within the period such as 5 days, 2 days and 3 days within the period, and the content becomes no longer available to use once this accumulative time reaches the accumulative usage duration.

A discretional number of times (for example, 5 times up to 16383 times as a maximum) can be set in the number counter. Also, some discretional time length can be set in the maximum usage duration (for example, 3 minutes up to 3 hours as a maximum). Also, some discretional value is set in the one time decision threshold value (for example, 30 seconds up to 18 hours as a maximum). In the user terminal 4, if the content reproduction is stopped after 20 seconds after it is started, this reproduction is not counted as once. Contrary to this, it is counted as once if the reproduction is over 30 seconds of the one time decision threshold value and reproduction of the content can be continued until it reaches the maximum usage duration including pauses, etc. within the duration. The value in the number counter is decremented by 1 when the time passes by the value set in the one time decision threshold value.

Going back to FIG. 34, in the content key 83, the content key as a decryption key that decrypts encrypted contents associated with this LT is stored as it is being encrypted. The LT footer 84 can be added after the content key 83 as its option. A hash value that is encrypted by SHA-1 algorithms from the LT header 81 to the content key 83 is stored in this LT footer 84. If the LT is distributed through some unreliable route, the alteration check can be done by this value.

The following is an explanation of the LT acquirement action and the content reproduction action.

Figure 36:
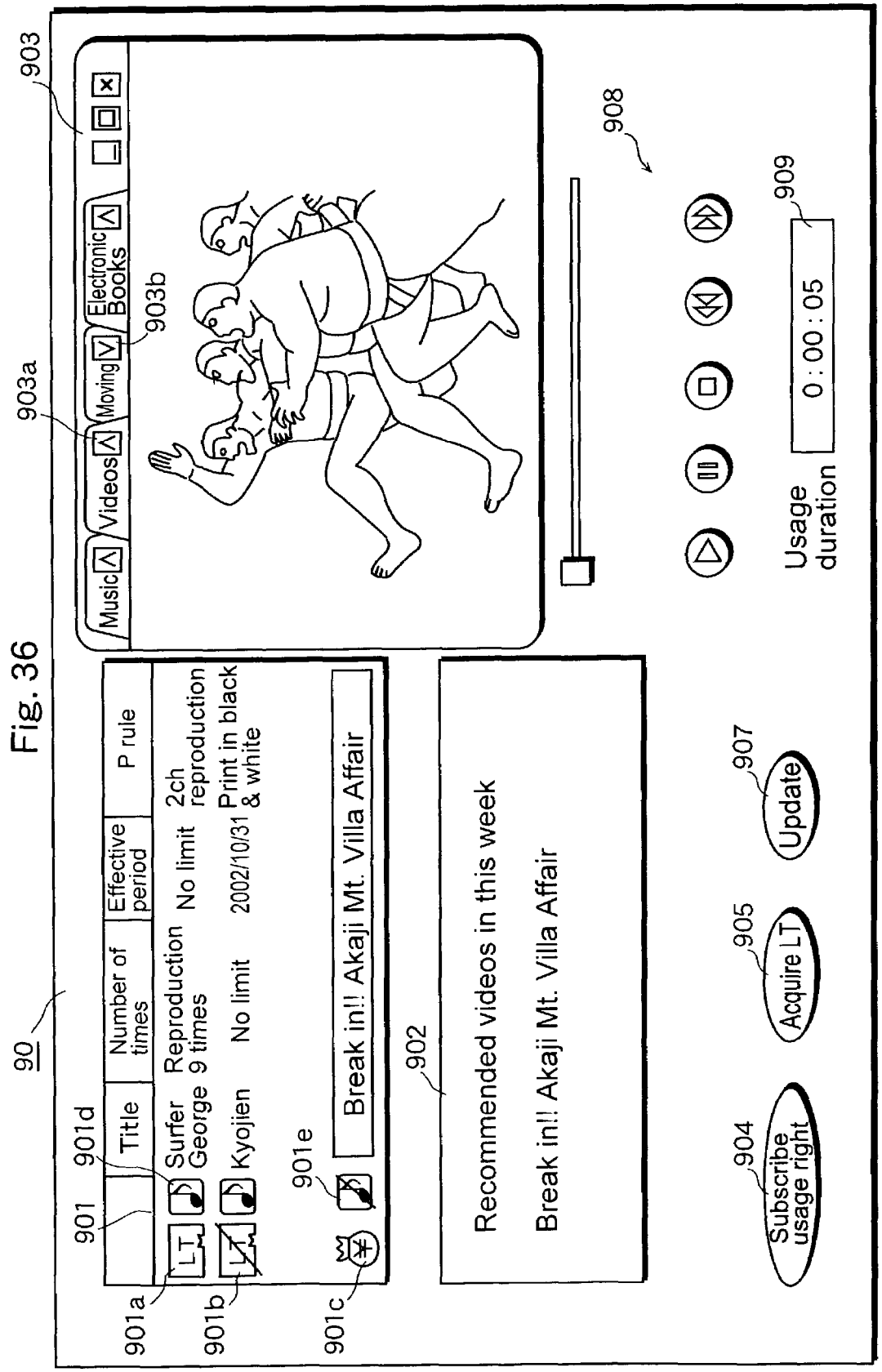
FIG. 36 is the screen that is displayed in a monitor screen of the terminal where such an LT acquirement action and a content reproduction action are executed.

In the user terminal where such an LT acquirement action and a content reproduction action are executed, the screen indicated in FIG. 36 is displayed in a monitor screen of the terminal.

As shown in FIG. 36, the screen contains a list box 901 that displays a list of contents, LT, UR-Us, P rule, etc. held on the user terminal and the server, a content description box 902 that displays a description such as for the content's overview pointed to by a cursor on the list box 901, a content reproduction box 903 that displays a reproduction image of the content pointed by the cursor on the list box 901, a usage right subscription button 904 that is clicked at the time of content usage right subscription of an LT, an LT acquirement button 905 that is pressed at the time of LT acquirement, an update button 907 that is pressed when the data displayed on this screen is updated, a reproduction operation button 908 that executes a reproduction operation to start its reproduction, stop, rewind, forward, etc., a time indicator box 909 that displays a reproduction time, etc.

In the list box 901, a title of the content ("Surfer George", "Kyojien", "Break in!! Akaji Mt. Villa Affair" in the example shown in FIG. 36), the effective period, ("No limitation", "2002/10/31" in the illustrated example), the P rule ("2ch reproduction", "Print in black and white" in the illustrated example), etc. are displayed. The content, "Break in!! Akaji Mt. Villa Affair" is a preview version sent from the content distribution server 2 for a sales promotion of the content, and FIG. 36 shows that the cursor points this content.

On a left side of this list box 901, icons 901a to 901e, etc. are displayed. The icon 901a retains the LT corresponding to the content on this terminal, and indicates that a UR-Us exists on the server. The icon 901b shows there is no LT corresponding to the content on this terminal, but there is a UR-Us on the server. The icon 901c shows that there is no LT on this terminal, and there is no UR-Us on the server. The icon 901d shows this terminal has some content. The icon 901e shows this terminal does not have any content. Using these icons 901a to 901e, it is possible to indicate any possible situation regarding the existence of UR-Us, LT and the content. The reproduction screen of the content pointed to by the cursor on the list box 901 is displayed in the content reproduction box 903.

An upper part of the content reproduction box 903 has a tab to select various types of actions such as moving of music and video, reproduction of electronic books, etc. The sample shown in FIG. 36 indicates a situation that a tab for a video to reproduce the content pointed to by the cursor in the list box 901 has been selected. When a reproduction operation button 908 for reproduction is clicked in this situation, the preview screen of the content "Break in!! Akaji Mt. Villa Affair" that has been sent from the content distribution server 2 is displayed.

The icon 903a set in the tab for video reproduction shows the plug-in for content reproduction is catered. The icon 903b set in a tab for moving the content indicates the plug-in for content reproduction (moving in this case) does not exist. In such a case, the plug-in is not available and the tab to show there is no plug-in is selected, as long as it does not have any hardware constraint, such as where no device is available to attach an external media, it accesses to the server that provides the necessary plug-in (a plug-in for moving in this case), and downloads the required plug-in to display the icon 903a.

Details displayed in the list box 901 and in the content description box 902 are generated based on the information acquired from the meta-data of the content stored in the content database 412 when this screen is displayed, right details of LT stored in the LT database 413, right details of UR-Us (including P rule) kept in the server, which is acquired by sending a command such as Get UR-Us, Get P rule text, Get meta-data to the usage rule management server 3, and meta-data of the content retaining the usage right, which does not exist on the terminal.

Figure 37:
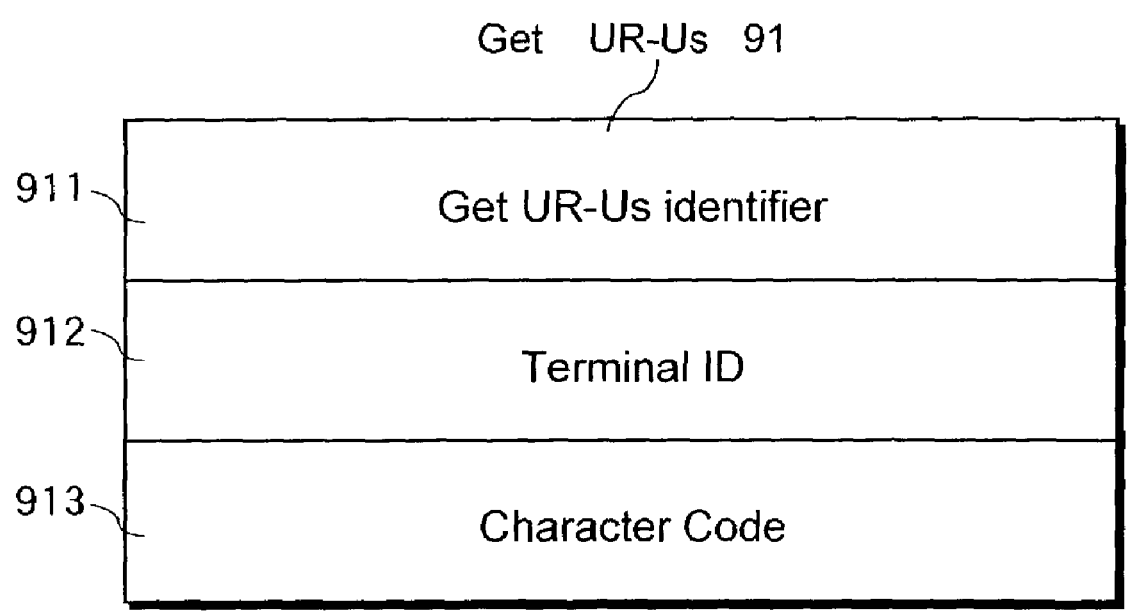
FIG. 37 is a diagram to show the structure of Get UR-Us sent from Client to the usage rule management server for the case where right details are acquired from the server.

FIG. 37 is a diagram to show the structure of a Get UR-Us that is sent from Client 41 to the usage rule management server 3 for the case where right details are acquired from the server.

This Get UR-Us 91 consists of a Get UR-Us identifier 911 as an identifier to show it is a Get UR-Us, a terminal ID 912 to identify the user terminal that has sent this Get UR-Us 91 and a character code 913 to specify what kind of language code is used to display the acquired data. Generally, an EUC, a junet code, a shift JIS code, etc. are stored in this character code 913. A list of UR-Us in the server which is managed by a user ID corresponding to the terminal ID 912 can be acquired by sending this type of Get UR-Us 91. In such a case, a UR-Us name (categories of contents, e.g. rock music in the 60's, right detail names that are stored in a filed not shown in the usage right management table 60) is also acquired at the same time by a language code specified by the character code.

Figure 38:
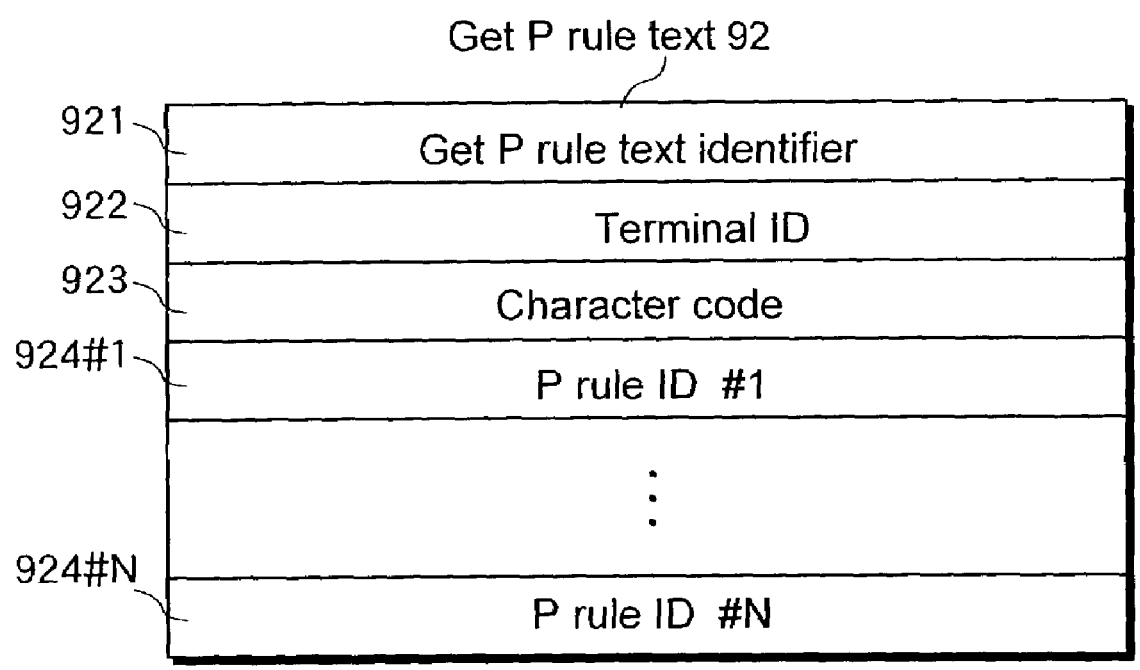
FIG. 38 is a diagram to show a sample structure of Get P rule text.

FIG. 38 is a diagram to show a sample structure of a Get P rule text.

A Get P rule text 92 is to get details that are displayed for a P rule by a language code specified in a character code, which consists of an identifier to indicate the information sent is a Get P rule text, a Get P rule text identifier 921, a terminal ID 922 to identify a user terminal that has sent the Get P rule text 92, a character code 923 to specify the language code that displays the Get P rule text 92, and a single or multiple P rule ID(s) 924#1 to 924#N. By sending the Get P rule text 92 structured in this way, it is possible to acquire the information to display the P rule contained in each UR-Us acquired in the Get UR-Us91 (for example, designation of a reproduction rule (2ch reproduction, print in black & white) and designation of an output interface at the time of reproduction (for example, analogue, protected digital, non-protected digital, etc.))

Figure 39:
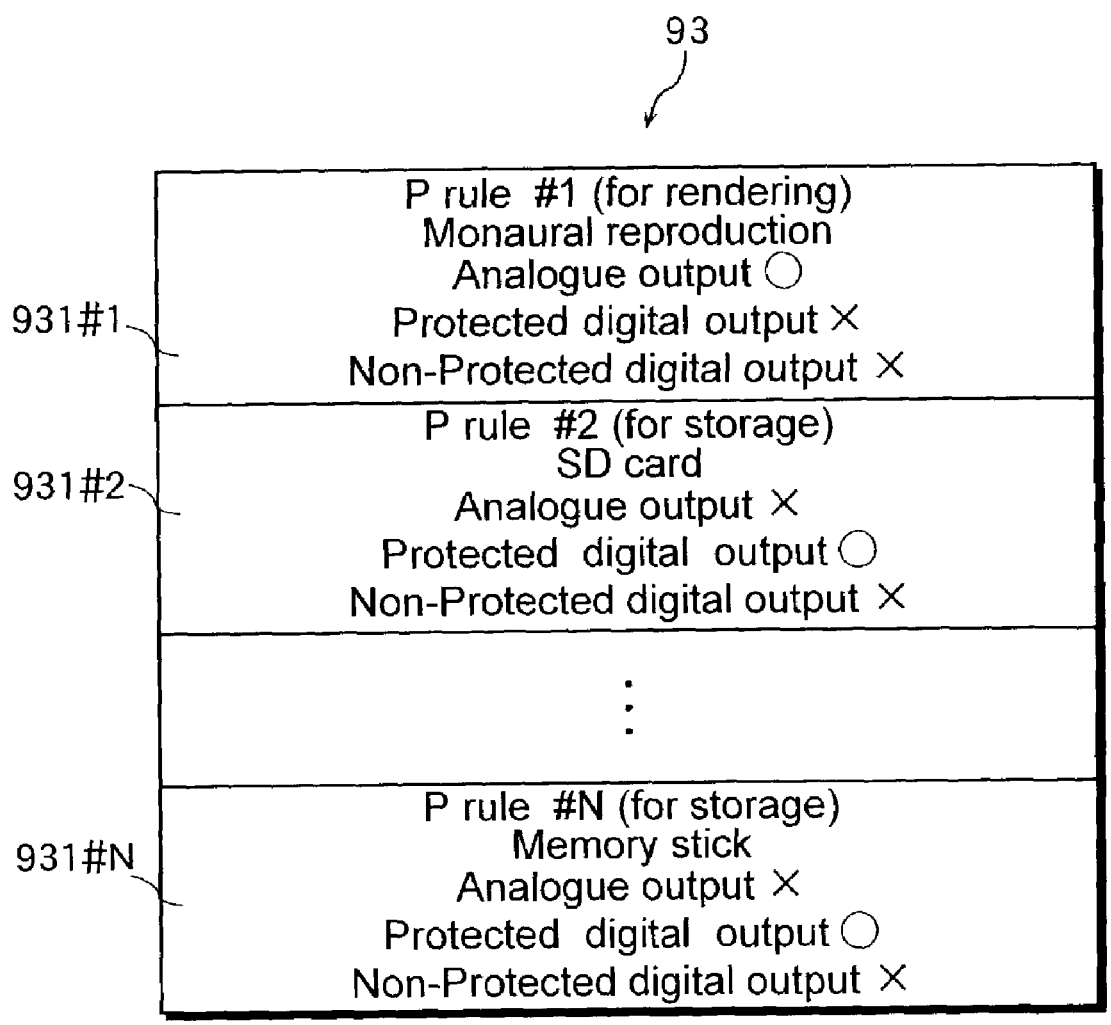
FIG. 39 is a sample structure of the information for P rule that is acquired from the usage rule management server according to the above Get P rule text.

FIG. 39 is a sample structure of the information for a P rule that is acquired from the usage rule management server 3 according to the above Get P rule text 92. The information displayed for the P rule 93 consists of multiple P rules 931 #1 to 931 #n.

The P rule 93 #1 in the sample diagram is a P rule for rendering that which allows only the case for monaural reproduction with an analog output (O in the diagram), which prohibits the protected digital output (for example, an encrypted digital output) and the non-protected digital output (for example, a digital output without being encrypted) (X in the diagram). The P rule 931 #2 is a P rule for storage in the sample diagram, which allows the protected digital output for a content transfer to the SD card, and which prohibits the analog output and the non-protected digital output. The P rule 931 #N is a P rule for storage in the sample diagram that allows the protected digital output for the content transfer to a memory stick, which prohibits the analog output and the non-protected digital output.

Figure 40:
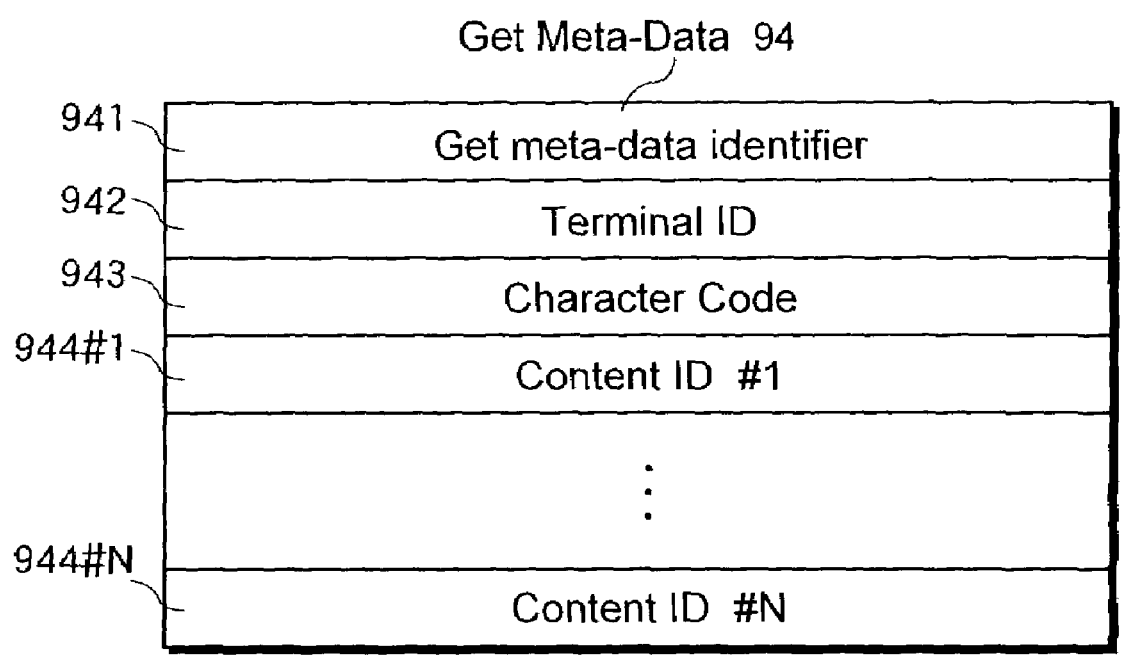
FIG. 40 is a diagram to show a sample structure of Get meta-data.

FIG. 40 is a diagram to show a sample structure of the Get meta-data.

The Get meta-data 94 consists of an identifier that shows this information is the Get meta-data 94, a Get meta-data identifier 941, a terminal ID 942 to identify the user terminal that has sent this Get meta-data 94, a character code 943 to acquire meta-data of the content by the specified language code and the content IDs 944 #1 to 944 #N which identify the content is subject for meta-data acquisition. The communication unit 38 of the usage rule management server 3 receiving this Get meta-data 94 accesses to the content database 21 of the content distribution server 2, extracts the meta-data (see FIG. 29) of the content specified in the content ID 944#1 to 944#N and sends the extracted meta-data to the user terminal 4. By doing so, the user terminal 4 can acquire the meta-data of the content that does not exist in the terminal.

The necessary information is acquired to restructure the screen by sending such Get UR-Us 91, Get P rule text 92, Get meta-data 94, etc. and receiving so that the screen shown in FIG. 36 is generated.

Then, if the LT of the content displayed in the list box 901 (for example, Kyojien) is acquired, a field of Kyojien should be pointed to by a cursor and an LT acquirement button 905 is clicked. By doing so, an LT acquirement process is started. When LT is further acquired for the content "Surfer George", this content should be pointed to by a cursor and an available reproduction number of times to acquire is entered and the LT subscription button 904 is clicked.

When such an LT acquirement button 905 is clicked, the LT acquirement process is executed in the client 41 of the user terminal 4 and the usage rule management server 3.

Figure 41:
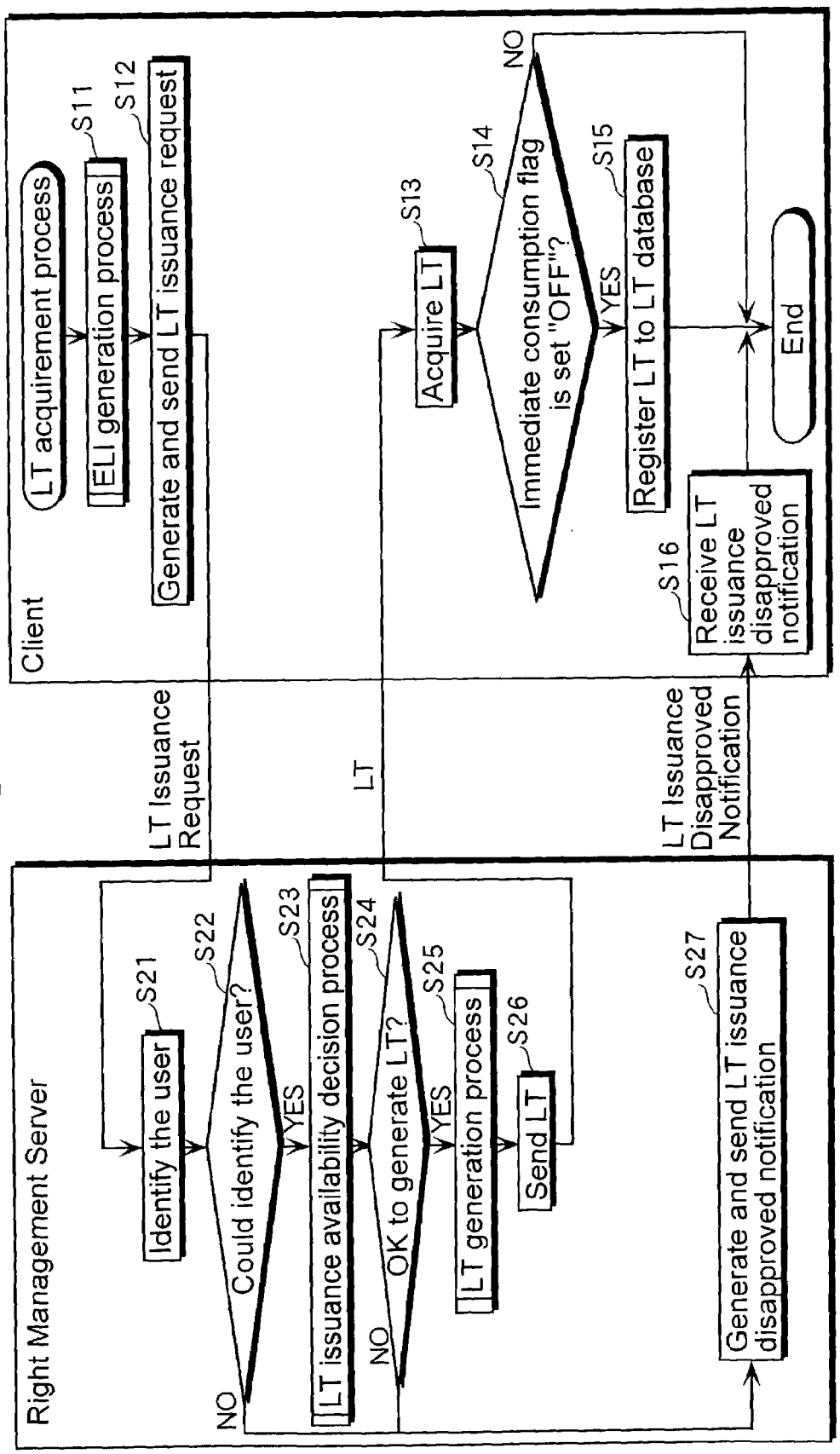
FIG. 41 is a flow chart to show actions of the LT acquirement process which is executed by the client of the user terminal and the usage rule management server.

FIG. 41 is a flow chart to show actions of the LT acquirement process which is executed by the client 41 of the user terminal 4 and the usage rule management server 3.

When the LT acquirement button 905 is clicked, the LT acquirement unit 415A of the client 41 executes a main body of the LT issuance request, i.e. an ELI generation process that generates ELI (S11). Then, by adding the LT issuance request identifier 71 and the terminal ID 72 read from the terminal ID storage unit 414A to the generated ELI, the LT acquirement unit 415A generates an LT issuance request according to a format structure indicated in FIG. 33 and sends the generated LT issuance request to the usage rule management server 3 (S12).

On the other hand, when the user identification unit 34 in the usage rule management server 3 receives the LT issuance request from the user terminal 4 via the communication unit 38, the user identification unit 34 refers to the user information database 31 and specifies the user from the terminal ID 72 contained in the LT issuance request 70 (S21).

If the user identification unit 34 identifies the user (Yes in S22), the LT generation unit 35 is held on the usage rule database 32 and executes an LT issuance availability decision process that decides whether or not an LT can be issued based on the UR-Us corresponding to the user ID specified by the user identification unit 34 (S23).

As a result of its execution, if an LT can be generated (Yes in S24), the LT generation unit 35 executes the LT generation process that generates the LT (S25), and sends the generated LT to the user terminal 4 (S26).

If the user cannot be specified in Step S22 (No in S22), or if an LT cannot be generated in Step 24 (No in S24), the LT generation unit 35 generates and sends an LT issuance disapproved notification (S27). This LT issuance disapproved notification consists of, for example, a content ID of the content subject for rejection, and an error code that shows its rejection reason such as un-subscribed, etc. in addition to a unique identifier that specifies it is the LT issuance disapproved notification.

When the LT acquirement unit 415A of the client 41 acquires an LT via the communication unit 410A (S31), the LT acquirement unit 415A refers to the LT status flag (LT immediate consumption flag/LT automatic return flag) 815 contained in the acquired LT and decides whether or not the immediate consumption flag is set "OFF" (for storage). As a result of its decision, if the immediate consumption flag is set "ON" (No in S14), the LT acquirement unit 415A terminates the LT acquirement process without storing (registering) the LT into the LT database 413A. In this case, in order to consume the LT immediately, the content reproduction is executed immediately with using this LT. Contrary to this, if the immediate consumption flag is not set "OFF" (Yes in S14), the LT acquirement unit 415A registers (stores) the acquired LT to the LT database 413A (S15), and terminates the LT acquirement process.

Also, when the LT acquirement unit 415A receives the LT issuance disapproved notification via the communication unit 410A (S16), the LT acquirement unit 415A makes the monitor 411a display a rejection reason, etc. via the communication unit 410A and terminates the LT acquirement process.

Figure 42:
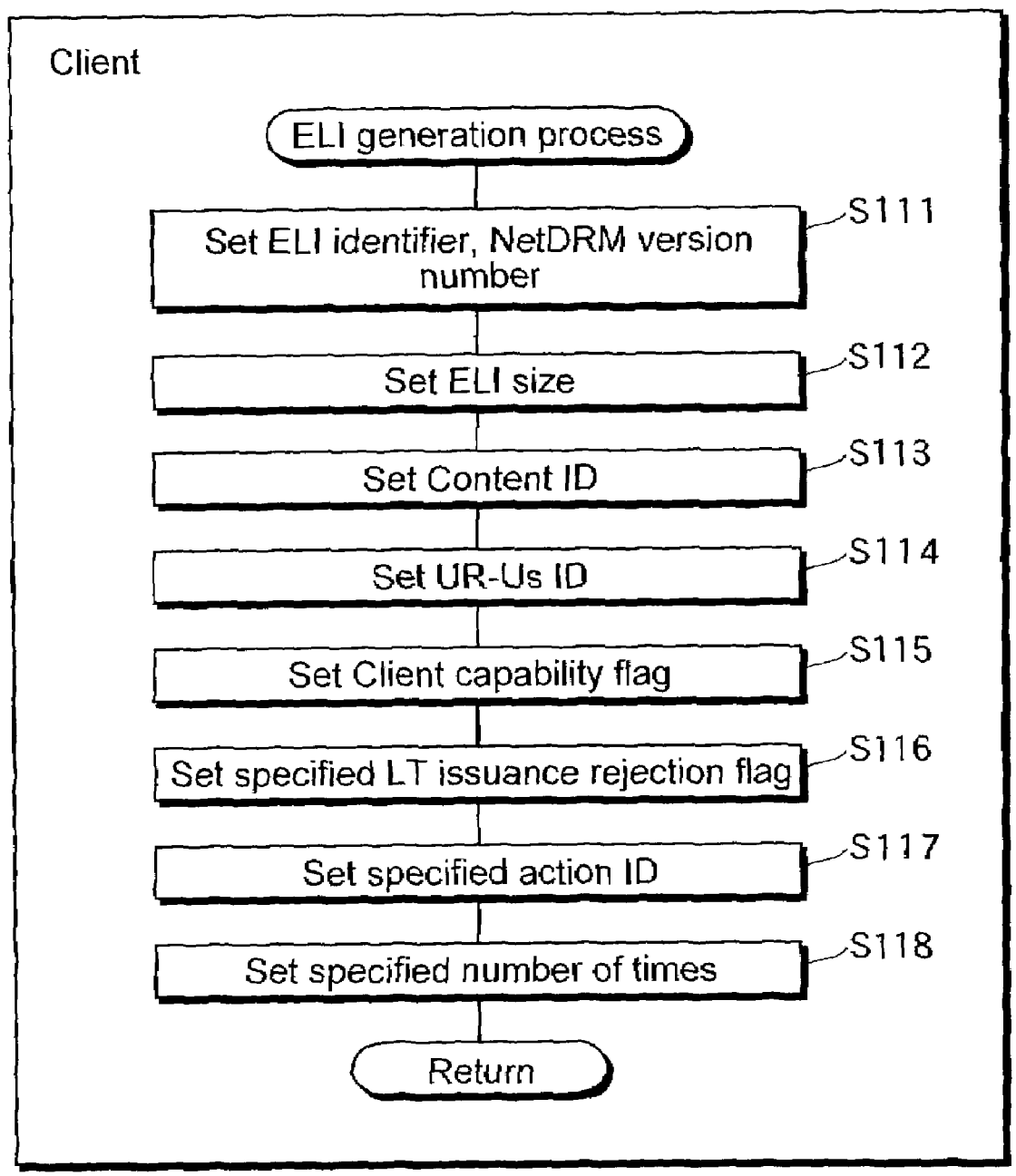
FIG. 42 is a flow chart that shows a sub-routine of the ELI generation process shown in FIG. 41.

FIG. 42 is a flow chart that shows a sub-routine of the ELI generation process (S11) shown in FIG. 41.

In this sub-routine of the ELI generation process, the LT acquirement unit 415A, at first, sets prescribed values in the ELI identifier for an ELI header to be created and in the NetDRM version number (S111). Next, the LT acquirement unit 415A calculates an ELI size and sets the calculated ELI size to the ELI header (S112). Then, the LT acquirement unit 415A sets the content ID of the content subject for the LT requested in the ELI header (S113), sets the UR-Us ID of the UR-Us that becomes a source for the LT in the ELI header (S114), sets a client capability flag that is suitable for the client's capability supported by this user terminal in the ELI header 730 (S115), and sets the value specified by the user ("ON" for issuance rejection and "OFF" for allowing curtailment) in the LT issuance rejection flag 737 (S116).

Once setup for the ELI header is completed, the LT acquirement unit 415A sets a value of the action specified by the user (for example, 2 in the case for reproduction) in the action ID 741 of the expected action tag block 740 (S117). Next, the communication unit 410A (LT acquirement unit 415A) sets the number of times specified by the user to the expected number of times/expected accumulative usage duration 742 (S118), and returns to the main routine shown in FIG. 41. By doing so, the ELI expected by the user is generated.

If there are multiple actions, Step 117 and Step 118 are repeated for as many times as these actions are provided. Also, a predetermined default value may be set in Step S116 to S118, or a value suitable for a client's capability which is automatically obtained by the LT acquirement unit 415A may be set in these Steps.

Figure 43:
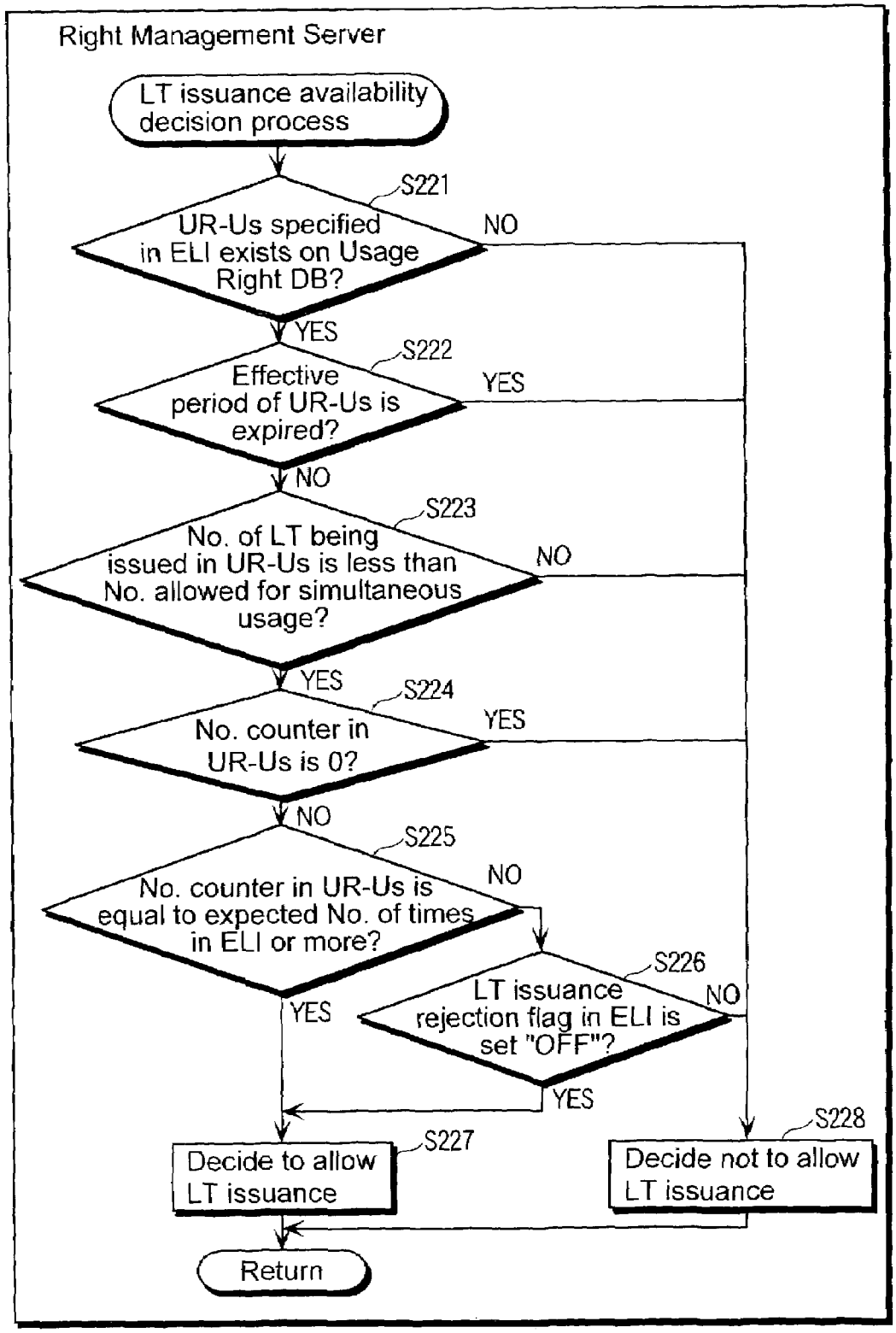
FIG. 43 is a flow chart that shows a sub-routine of the LT issuance availability decision process indicated in FIG. 41.

FIG. 43 is a flow chart that shows a sub-routine of the LT issuance availability decision process (S22) indicated in FIG. 41.

In this sub-routine of the LT issuance availability decision process, the LT generation unit 35, at first, decides whether or not a usage rule UR-Us specified in the ELI of the LT issuance request exists in the usage right DB (S221). If there is the usage rule UR-Us (Yes in S221), the LT generation unit 35 refers to the ending time of the effective period 614 of the UR-Us header 61, and decides whether or not the effective period of the UR-Us is already acquired. If it is within the effective period (Yes in S222), the LT generation unit 35 decides whether the number of LT being issued in the UR-Us is less than the number allowing for concurrent usage based on the number allowed for simultaneous usage 616 and the number of LT being issued LT 617 (S223). If it is less than the number allowed for simultaneous usage (Yes in S223), the LT generation unit 35 refers to the one time decision threshold value, number counter/accumulative usage duration 624, and decides whether or not the number counter in UR-Us is "0" (S224). If the number counter is not "0", which means the number counter is 1 or more (No in S224), the LT generation unit 35 decides whether or not the number counter of the UR-Us has a value that is equal to, or more than, the expected number of times in the ELI (S225).

If the number counter of the UR-Us does not have a value that is equal to, or more than, the expected number of times (No in S225), the LT generation unit 35 decides whether or not the LT issuance rejection flag in ELI is set "OFF" (S226). If the number counter of the UR-Us has a value that is equal to, or more than, the expected number of times (Yes in S225), the LT generation unit 35 decides that an LT can be issued (S227), terminates this sub-routine and returns to the main routine in FIG. 41. If the number counter of the UR-Us does not have a value that is equal to, or more than the expected number of times (No in S225), but the LT issuance rejection flag in ELI is set "OFF", which means it may be less than the expected number of times (Yes in S226), the LT generation unit 35 decides that an LT can be issued (S227), terminates this sub-routine, and returns to the main routine indicated in FIG. 41.

Contrary to this, if any of the following cases is applicable: 1) there is no usage rule UR-Us in the usage rule database (No in S221), 2) the effective period is already expired (Yes in S222), 3) the number counter is that is equal to, or more than, the number of times allowed for simultaneous usage (No in S223), 4) the number counter is "0" (Yes in S224), 5) the number counter is "1" or more (No in S225) and the LT issuance rejection flag is set "OFF" (No in S226), the LT generation unit 35 decides that the LT cannot be issued (S228), terminates this sub-routine and returns to the main routine indicated in FIG. 41. By doing so, it is possible to decide appropriately whether or not the LT is issued within a range of the UR-Us managed in the usage rule management server 3.

Figure 44:
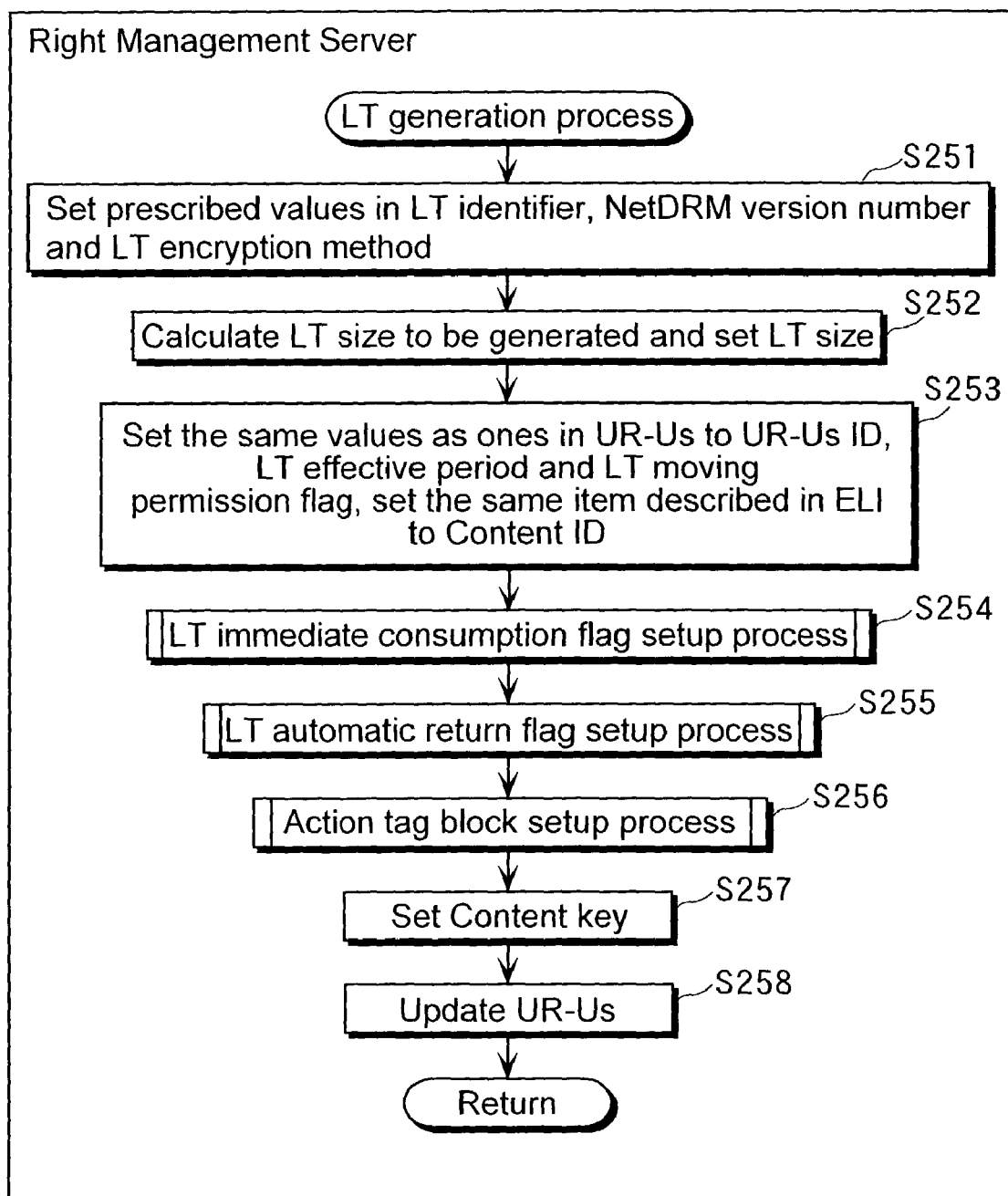
FIG. 44 is a flow chart that indicates a sub-routine of the LT generation process indicated in FIG. 41.

FIG. 44 is a flow chart that indicates a sub-routine of the LT generation process (S25) indicated in FIG. 41.

This sub-routine of the LT generation process is executed for the case where an LT can be issued (Yes in S24). In this routine, the LT generation unit 35, at first, sets prescribed values for an LT identifier, a NetDRM version number and an LT encryption method indicated by the LT on the LT header 81 (S251). Next, the LT generation unit 35 calculates the size of the generated LT and sets the LT size that has been calculated in the LT header 81 (S252). The LT generation unit 35 sets the same value as one in UR-Us in the UR-Us ID, the LT effective period and the LT moving permission flag (S253), and sets the same item described in the ELI in the content ID (S253).

Then, the LT generation unit 35 executes an LT immediate consumption flag setup process (S254) that sets an LT immediate consumption flag to indicate whether or not the LT generated is consumed immediately (S254), executes an LT automatic return flag setup process (S255) that sets an LT automatic return flag to indicate whether or not the LT is returned automatically to the server after the content usage by the LT, and terminates generation of the LT header 81.

Once the LT header 81 is generated, the LT generation unit 35 executes to set an action tag block setup process that sets a tag block for each action met with the usage request (S256), and reads the content key corresponding to the content from the content key database and sets it (S257). Once the LT generation unit 35 completes the LT generation, the usage right update unit 37 subtracts the usage rule extracted to LT from the original usage rule and updates the UR-Us within a calculation result (S258). Once the UR-Us update is completed, the usage right update unit 37 terminates this sub-routine and returns to the main routine shown in FIG. 41. By doing so, it is possible to send the LT met with user's LT issuance request that extracts a part of the usage right from the UR-Us managed by the usage rule management server 3.

Figure 45:
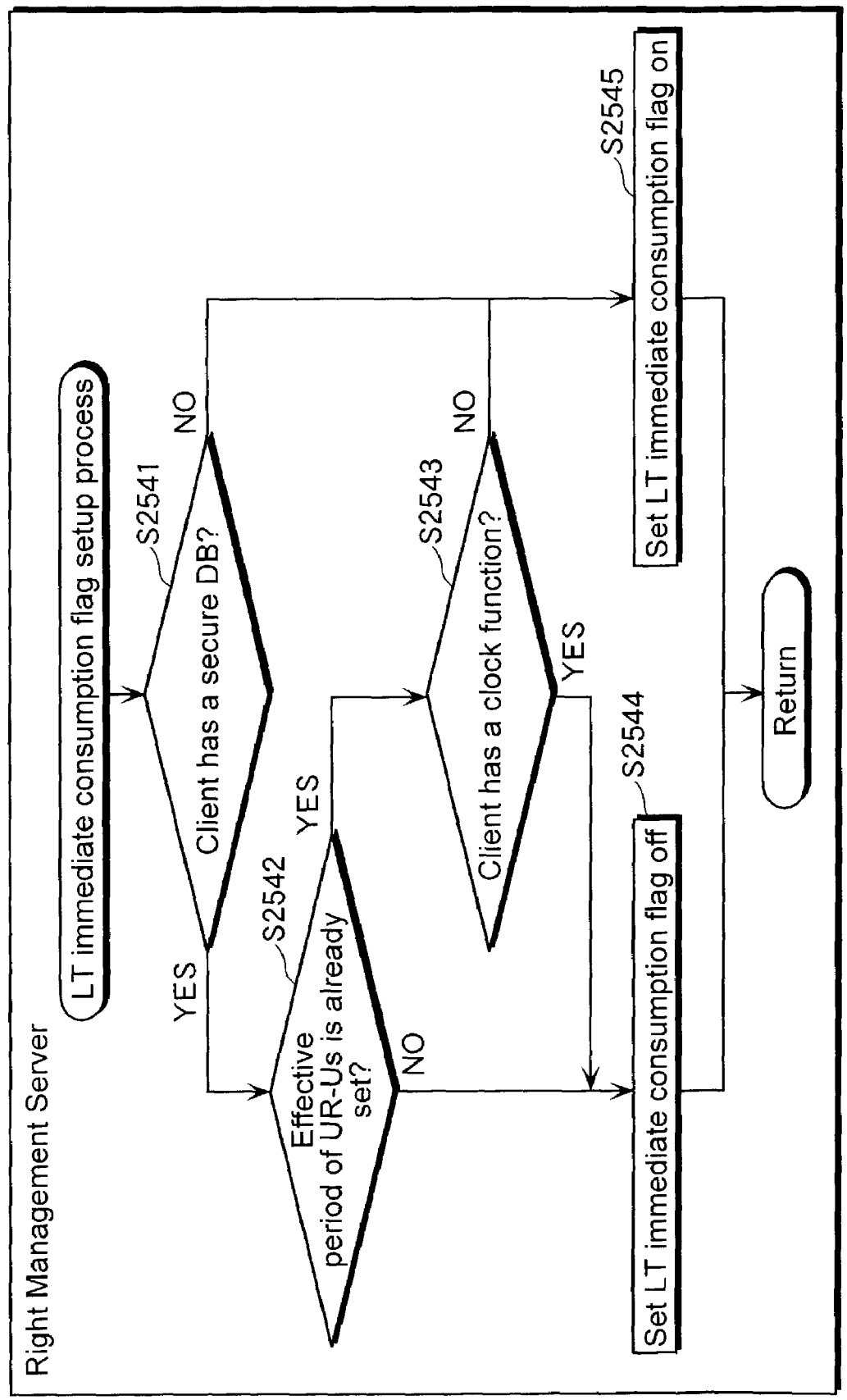
FIG. 45 is a flow chart that shows a sub-routine of the LT immediate consumption flag setup process shown in FIG. 44.

FIG. 45 is a flow chart that shows a sub-routine of the LT immediate consumption flag setup process (S254) shown in FIG. 44.

In this sub-routine of the LT immediate consumption flag setup process, the LT generation unit 35, at first, refers to the client capability flag 736 contained in the LT header 730 of the LT issuance request and decides whether or not the client has the secure LTDB (S2541). If the client has a secure LTDB (Yes in S2541), the LT generation unit 35 decides whether or not the effective period of the UR-Us is set (S2542). If the effective period is set (Yes in S2542), the LT generation unit decides whether or not the client has a secure clock function (S2543).

If the effective period is not set, which means that there is no time limitation (No in S2542), or if the effective period is set, which means that there is a time limitation (Yes in S2542) and the client has the secure clock function (Yes in S2543), the LT generation unit 35 sets OFF to the LT immediate consumption flag, which means it sets that the LT may not be consumed immediately (S2544), terminates this sub-routine, and returns the sub-routine shown in FIG. 44.

Contrary to this, if the client does not have a secure LT database (No in S2541), or if there is a time limitation (Yes in S2542) and the client does not have the secure clock mechanism (No in S2543), the LT generation unit 35 sets ON to the LT immediate consumption flag, which means that the LT should be consumed immediately (S2545), terminates this sub-routine and returns to the sub-routine shown in FIG. 44.

By doing so, it is possible to have a control over the user terminal 4 to have the user terminal 4 consume the LT immediately or store the LT, depending on the client's capability of whether the client has the secure LTDB or not, or has a secure clock mechanism or not.

Figure 46:
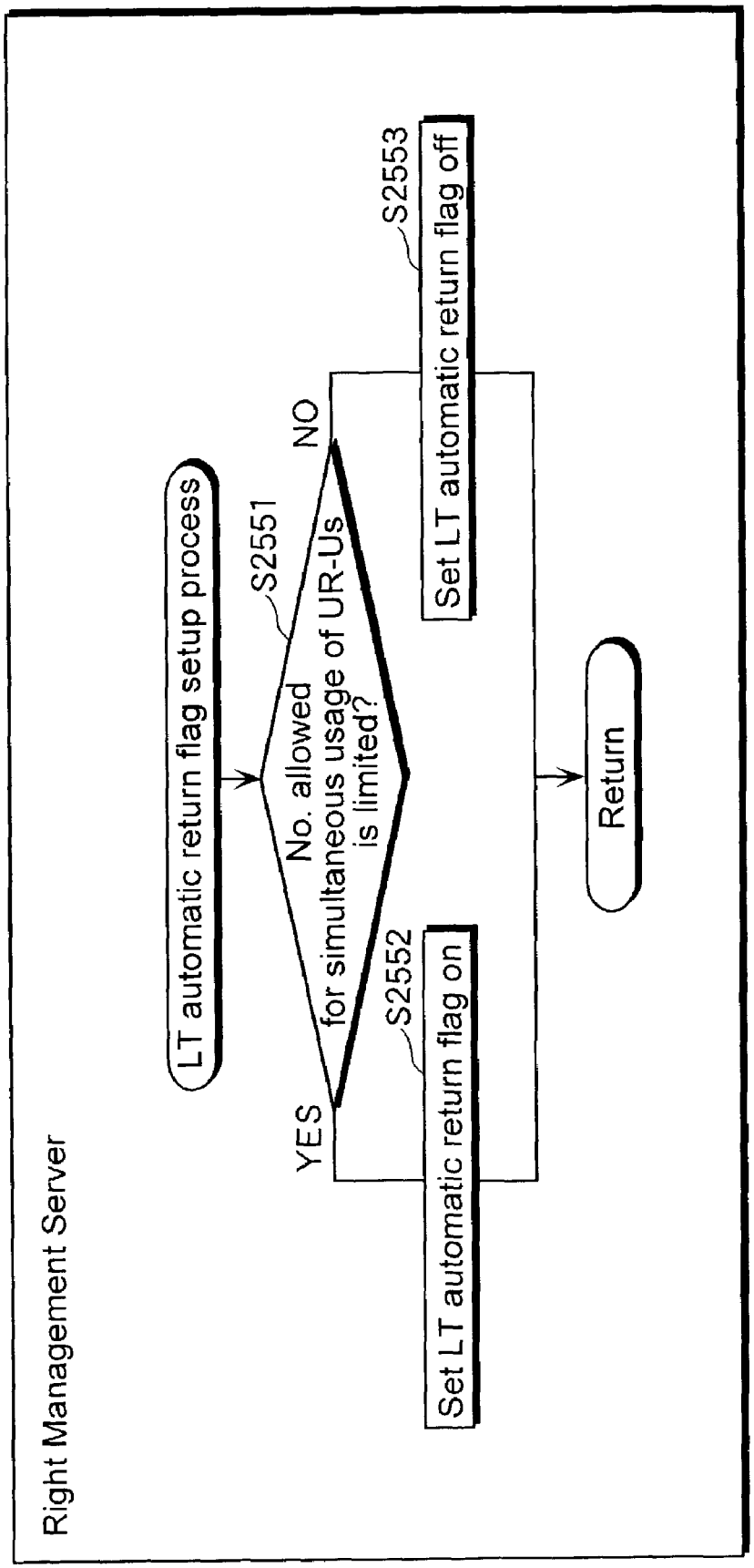
FIG. 46 is a flow chart to show a sub-routine of the LT automatic return flag setup process shown in FIG. 44.

FIG. 46 is a flow chart to show a sub-routine of the LT automatic return flag setup process (S255) shown in FIG. 44.

In this sub-routine of the LT automatic return flag setup process, the LT generation unit 35 decides whether or not the number allowed for simultaneous usage of UR-Us has a limited number (S2251). As a result of its decision, if the number allowed for simultaneous usage has a certain limited number (Yes in S2251), the LT generation unit 35 sets "ON" to the LT automatic return flag (S2252), terminates this sub-routine and returns to the sub-routine shown in FIG. 44. By doing so, it is possible to have a control over the user terminal 4 to have the user terminal 4 return the consumed LT to the usage rule management 3 after the user terminal 4 reproduces the content by using this LT, and create space for the number of usage sharing the content.

Contrary to this, if the number allowed for simultaneous usage does not have a limited number (No in S2251), to be specific, if the number allowed for simultaneous usage is "∞", the LT generation unit 35 sets "OFF" to the LT automatic return flag (S2553), terminates this sub-routine, and returns to the sub-routine shown in FIG. 44.

Figure 47:
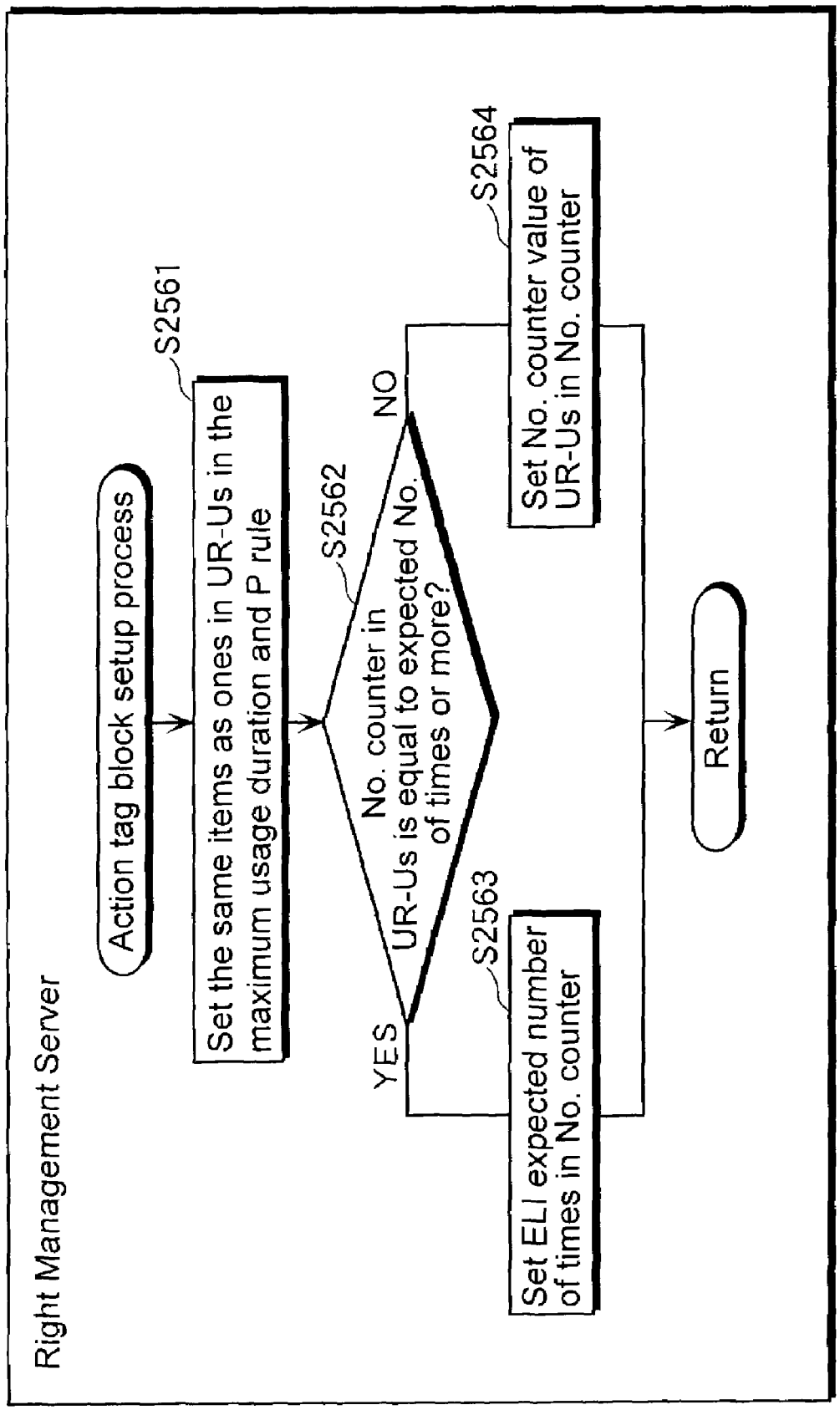
FIG. 47 is a flow chart that shows a sub-routine of the action tag block setup process shown in FIG. 44.

FIG. 47 is a flow chart that shows a sub-routine of the action tag block setup process (S256) shown in FIG. 44.

In this sub-routine of the action tag block setup process, the LT generation unit 35, at first, sets the same items as ones of UR-Us in the maximum usage duration and the P rule (S2561), and decides whether or not the number counter in UR-Us is equal to, or more than, the expected number of times contained in the ELI of the LT issuance request (S2562). As a result of its decision, if the number counter is equal to, or more than, the expected number of times (Yes in S2562), the LT generation unit 35 sets a value for the expected number of times for the ELI in the number counter in the action tag block (S2563), terminates this sub-routine and returns to the sub-routine shown in FIG. 44. By doing so, the number of times requested by the user can be set in the LT.

Contrary to this, if the number counter is less than the expected number of times (No in S2562), the LT generation unit 35 sets the value of the number counter of UR-Us in the number counter, which means a total number of times less than the expected number of times remaining in UR-Us is set (S2564), terminates this sub-routine and returns to the sub-routine shown in FIG. 44. By doing so, it is possible to set the number of times as designated (OFF) in the LT issuance rejection flag to LT, though it is less than what the user requests.

An appropriate content acquirement process can be executed by the process shown in FIGS. 41-47.

Next, if the content is used in the user terminal 4, the processes (content reproduction processes) executed in the client 41 and the rendering plug-in 42 of this user terminal 4 and the processes executed in the client 41 and the storage plug-in 43 (writing processes to the media) are explained in this sequence.

Figure 48:
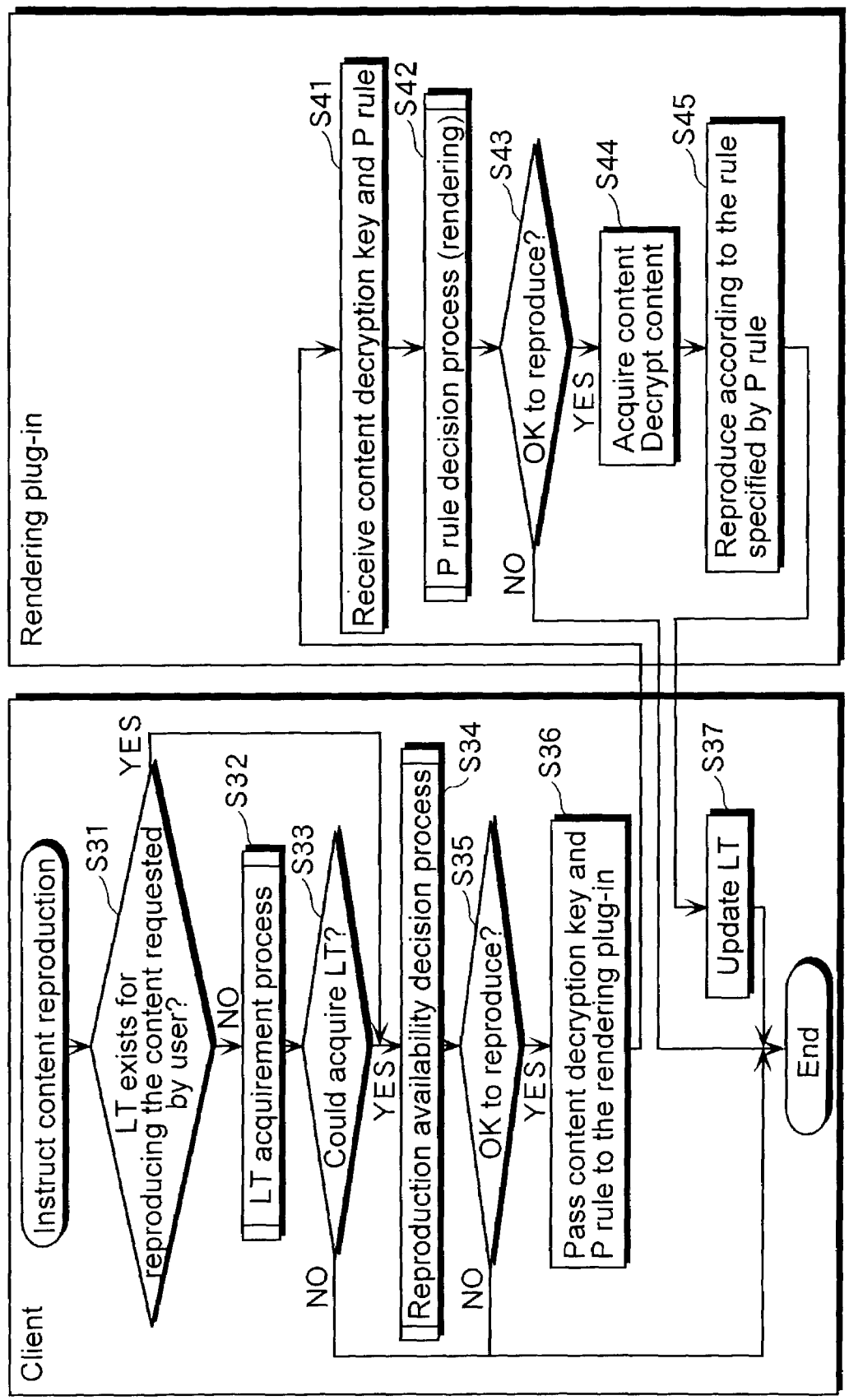

FIG. 48 is a flow chart to show the content reproduction process which is executed in the client 41 and the rendering plug-in 42.

In the screen shown in FIG. 36, this reproduction process is started by pointing to the content that is requested to be reproduced (for example, content of "Surfer George") with a cursor and clicking on a reproduction operation button 908 for Play.

When such an instruction to reproduce the content by clicking the reproduction operation button 908 is made, the plug-in control unit 419A decides whether or not the LT for the content requested to be reproduced by the user exists on the LT database 413A (S31). A case where the secure LTDB, meaning it has an LT database 413A, is available and the content usage availability decision unit 418A has a secure clock mechanism is explained here.

As a result of its decision, if the LT subject for process is stored in the LT database 413A (Yes in S31), the content usage availability decision unit 418A executes the reproduction availability decision process (S34) that validates whether or not the content can be reproduced with the LT.

Contrary to this, if there is no LT subject for process in the LT database 413A (No in S31), the content usage availability/decision unit 418A makes the LT acquirement unit 415A execute the LT acquirement process as stated above (S32) and decides whether or not the LT can be acquired (S33). In this case, as long as multiple times of consecutive reproduction is not specified, an LT issuance for one time reproduction, which is a minimum unit required for reproduction, is generally requested. Then, if the LT can be acquired (Yes in S33), the content usage availability decision unit 418A executes the reproduction availability decision process (S34).

Once the reproduction availability decision process (S34) is executed, the plug-in control unit 419A decides whether or not reproduction can be done by the LT based on the result of availability decision made by the reproduction availability decision process 418A (S35).

As a result of its decision (Yes in S35), the plug-in control unit 419A passes the content key and P rule (2ch reproduction, etc.) contained in LT to the rendering plug-in 42 (S36).

Contrary to this, if the LT cannot be acquired (No in S33), or if the plug-in control unit 419A decides reproduction should not be done (No in S35), the plug-in control unit 419A terminates the content reproduction process.

Contrary to this, when the reproduction rule decision unit 421A in the rendering plug-in 42 receives the content decryption key and P rule (S41), the reproduction rule decision unit 421A executes the P rule decision process (rendering) (S42), and decides whether or not reproduction is allowed based on its execution result (S43).

As a result of its decision, if reproduction is allowed (Yes in S43), the content information decryption unit 422 acquires content from the content database 412A and decrypts the acquired content by using the content key (S44). Then, the content reproduction unit 423A reproduces the decrypted content under the rule specified by P rule (S45).

Contrary to this, if the reproduction rule decision unit 421A does not allow to write (No in S43), it reports this decision to the plug-in control unit 419A.

When reproduction is executed in the rendering plug-in 42, the plug-in control unit 419A starts a timer and controls one time by the maximum usage duration, the number counter threshold value, and the accumulative usage duration. When the plug-in unit 419A counts as one, the LT control update unit 41 updates LT details (number of times) (S37), and terminates the content reproduction process. If reproduction is not allowed at the rendering plug-in 42 (No in S43), the LT control update unit 417A terminates the content reproduction process.

When the content reproduction process is ended, the LT return unit 416A refers to the LT status flag (LT automatic return flag) 815 of the LT, and if LT automatic return flag is on, the LT is returned to the usage rule control server 3 via the communication unit 410A.

Figure 49:
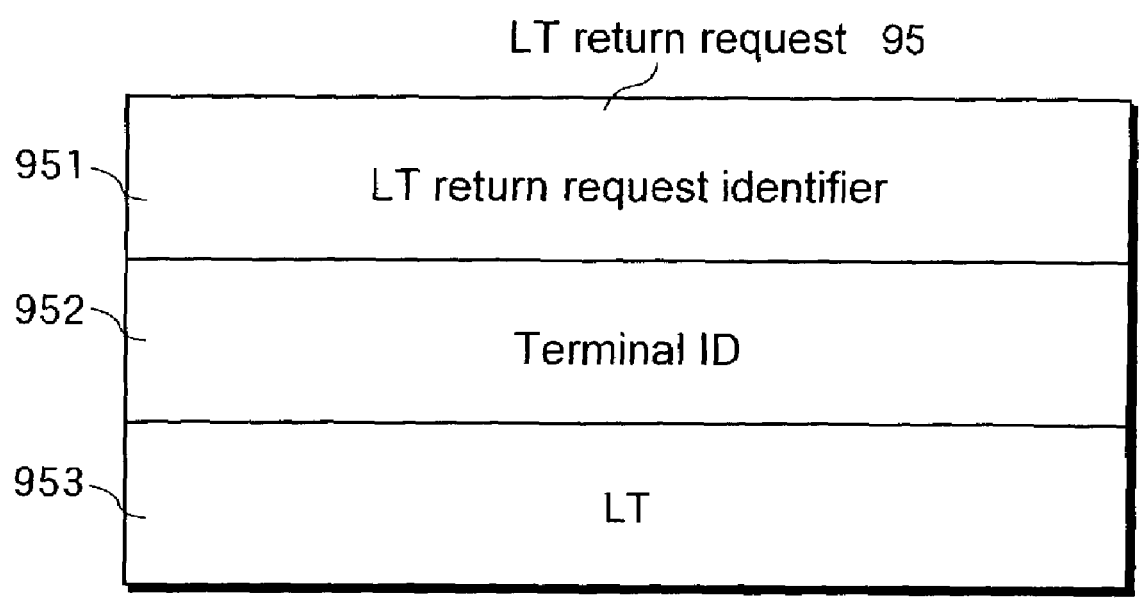
FIG. 49 is a diagram to show a sample structure of the LT return request for returning LT.

FIG. 49 is a diagram to show a sample structure of the LT return request 95 for returning the LT.

This LT return request 95 consists of an LT return request identification 951, which is a unique identifier to show that this request is an LT return request, a terminal ID of the user terminal that returns the LT and the returned LT 953. The LT analysis unit 36 of the usage rule control server 3 that receives this request returns the request to the UR-Us corresponding to the terminal ID 952 and updates the number of times and number allowing for concurrent usage of the UR-Us. By doing so, it is possible to back up the LT to the usage rule control server 3 and reduce the number of LTs being issued 617. If the number of LT being issued is reduced, the content can be commonly used by another terminal.

Figure 50:
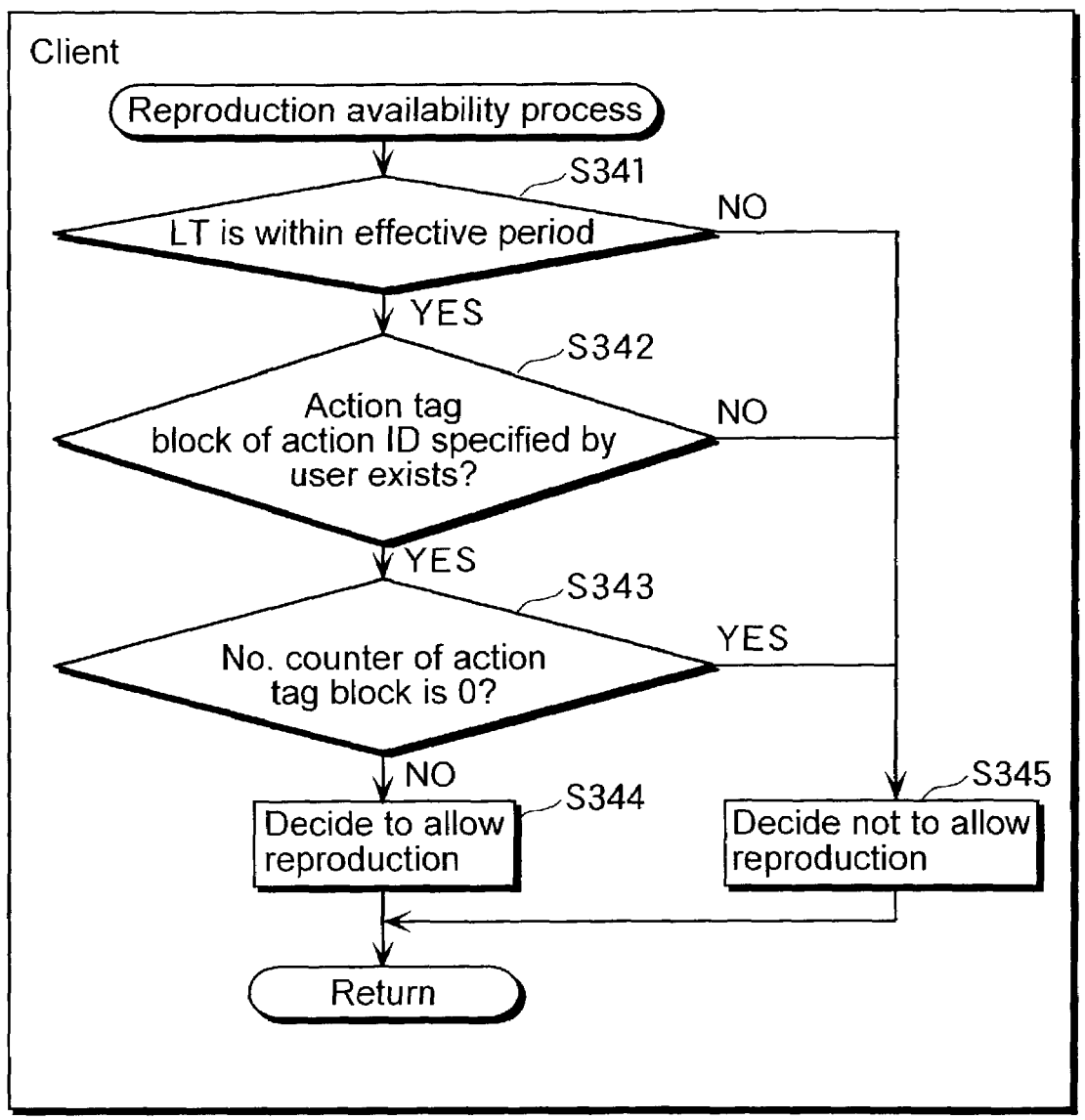
FIG. 50 is a flow chart that shows a sub-routine of the reproduction availability decision process shown in FIG. 48.

FIG. 50 is a flow chart that shows a sub-routine of the reproduction availability decision process (S34) shown in FIG. 48.

In this sub-routine of the reproduction availability decision process, the content usage availability decision unit 418A, at first, decides whether the LT is within the effective period (S341). If the LT is within the effective period (Yes in S341), the content usage availability decision unit 418A decides whether there is an action tag block of the action ID specified by the user (S342). As a result of its decision, if the LT is within the effective period (Yes in S342), the content usage availability decision unit 418A decides whether or not the number counter action tag block is "0" (S343). If the number counter is not "0" (No in S343), the content usage availability decision 418A decides to allow reproduction (S344), terminates this reproduction availability decision process and returns to the main routine shown in FIG. 48.

Contrary to this, if the LT is not within the effective period (No in S341), if the action tag block of the action ID is not specified by the user (No in S342), or if the number counter is "0" (Yes in S343), the content usage availability decision unit 418A decides reproduction is not allowed (S345), terminates this reproduction availability decision process and returns to the main routine shown in FIG. 48.

By doing so, an appropriate judgment can be made as to whether reproduction is allowed or is not allowed.

Figure 51:
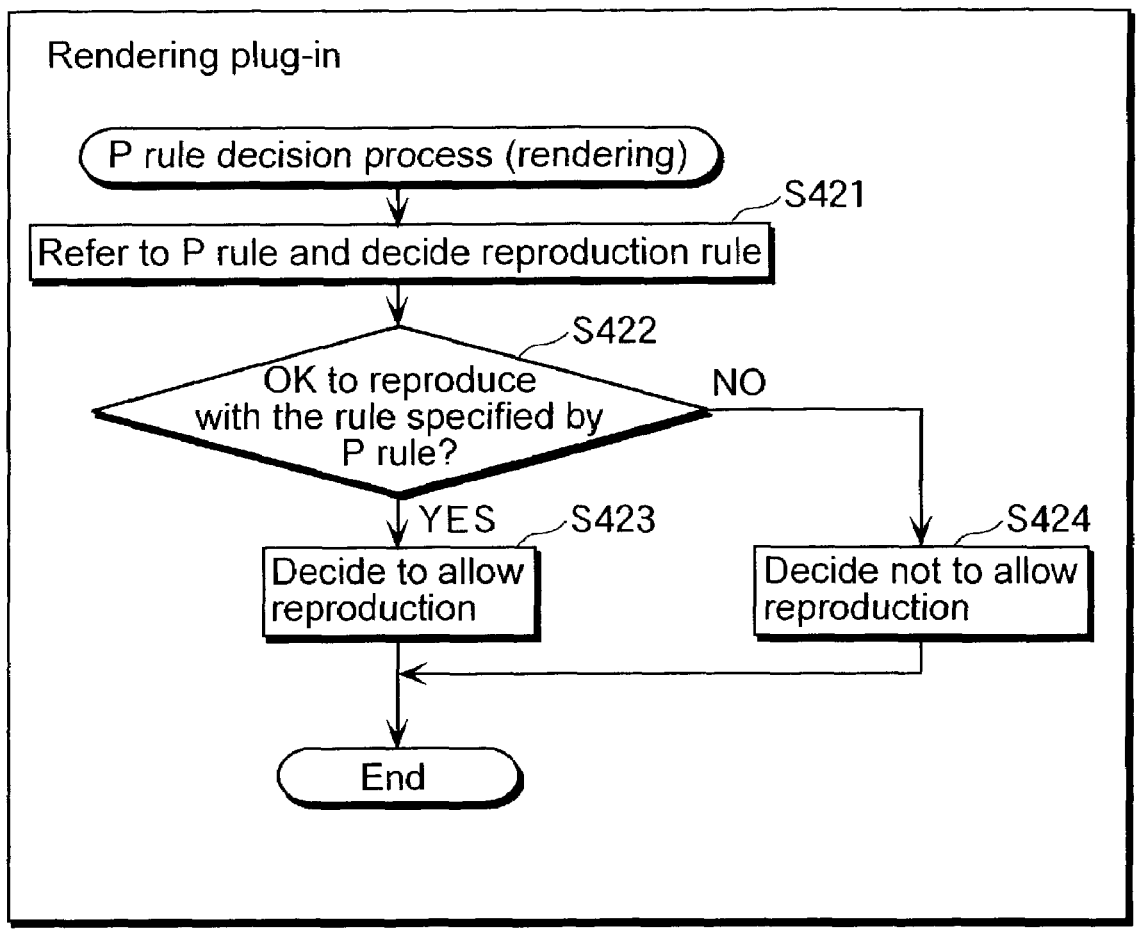
FIG. 51 is a flow chart that shows a sub-routine of the P rule decision process (rendering) shown in FIG. 48.

FIG. 51 is a flow chart that shows a sub-routine of the P rule decision process (rendering) (S42) shown in FIG. 48.

In the sub-routine of this P rule decision process, the reproduction rule decision unit 421A refers to the P rule (for example, reproduction in monaural with analog output) and decides the reproduction rule (S421). As a result of its decision, if reproduction is possible under the rule specified in the P rule (Yes S422), the reproduction rule decision unit 421A decides reproduction is possible (S423), terminates this P rule decision process, and returns to the main routine shown in FIG. 48. By doing so, the content is reproduced under the reproduction rule, which follows the P rule.

Contrary to this, if reproduction cannot be done under the rule specified in the P rule (No in S422), the reproduction rule decision unit 421A decides that reproduction is unable to be performed (S424), terminates this P rule decision process and returns to the main routine shown in FIG. 48.

Such processes that are indicated in FIGS. 48 to 51 execute an appropriate content reproduction process.

Next, the processes which are executed in the client 41 and the storage plug-in 43 (writing process to the media) are explained.

Figure 52:
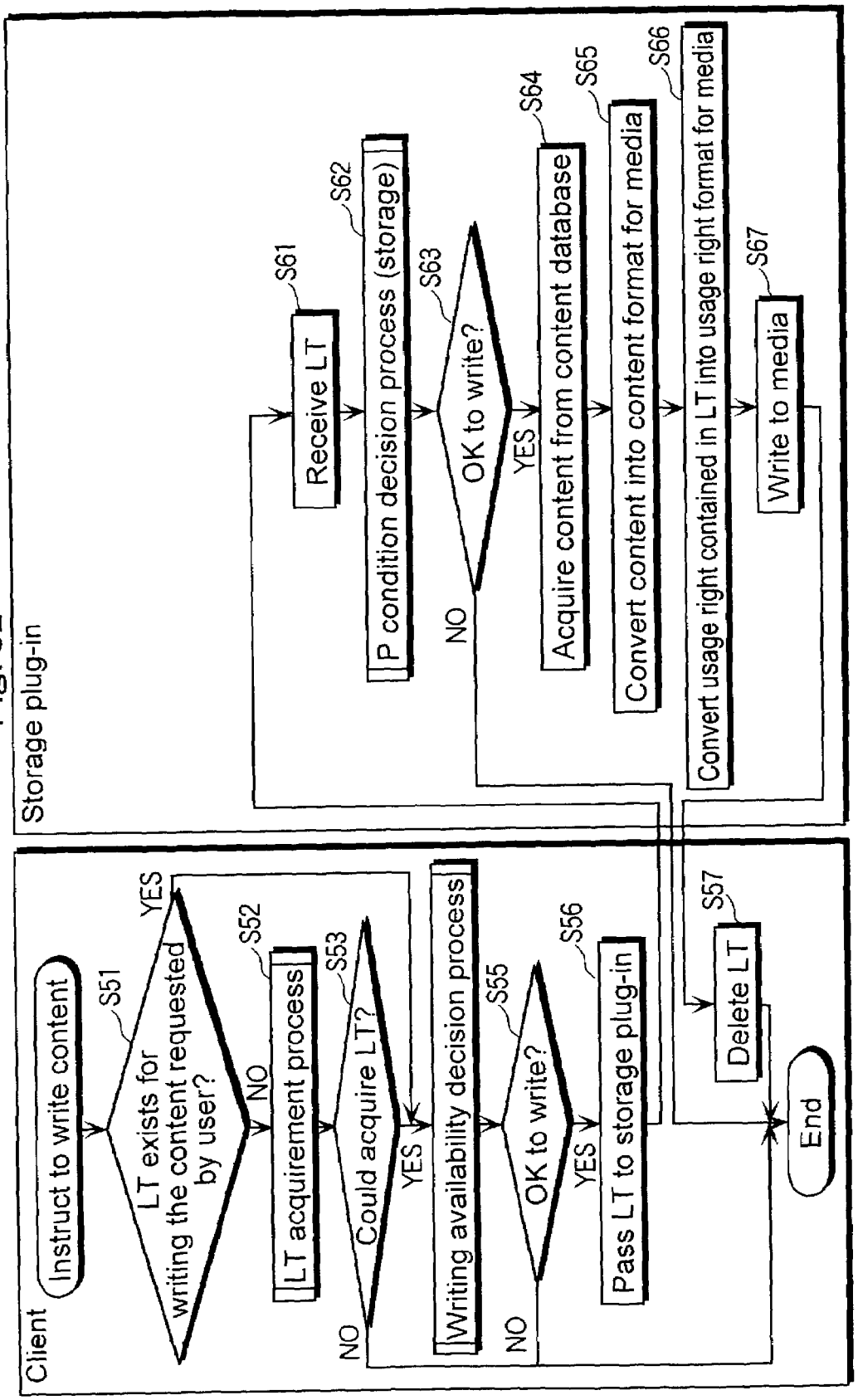

FIG. 52 is a flow chart to show the content writing process which is executed in the client 41 and the storage plug-in 43.

In this content writing process, the moving tab of the screen shown in FIG. 36 is to be selected. If this moving tab is selected, on a screen (not shown in FIG. 36) that is displayed in the content reproduction box 903 where fields of "moved from" and "moved to" are indicated, the writing process is permitted for an object in the "moved from". The content (not shown in FIG. 36) requested for the writing (moving) process and an external media where the content is moved to are selected on the screen. By clicking the writing button (not shown in FIG. 36), the content writing process is started.

If there is a content writing instruction by clicking such a writing button, the plug-in control unit 419A decides whether the LT that the user wants to write exists in the LT database 413A (S51). In the same way as the above reproduction process, a case of having a secure LTDB, meaning to have the LT database 413A, as well as having a secure clock function in the content usage availability decision unit 418A is explained here.

As a result of its decision, if the LT subject for process is stored in the LT database 413A (Yes in S51), the content usage availability decision unit 418A executes a wiring availability decision process (S54) that decides whether or not the LT subject for process can be written.

Contrary to this, if there is no LT subject for process in the LT database 413A (No in S51), the plug-in control unit 419A directs the LT acquirement unit 415A to execute the LT acquirement process (S52) which has the same content as above, and decides whether or not the LT can be acquired (S53). Then, if there is an LT in the LT database 413A (Yes in S51), or if the LT has been acquired (Yes in S53), the content usage availability decision unit 418A executes the writing availability decision process (S54).

When the writing availability decision process (S54) is executed, the plug-in control unit 419A decides whether or not the content can be written with the LT based on a result of the availability decision process performed by the content usage availability decision unit 418A (S55). As a result of its decision, if writing is allowed (Yes in S55), the plug-in control unit 419A passes the LT subject for process to the storage plug-in 43 (S56).

Contrary to this, if the LT cannot be acquired (No in S53), or if writing is decided not to be allowed (No in S55), the plug-in control unit 419A terminates the content writing process.

Contrary to this, when the writing rule decision unit 431A of the storage plug-in 43 receives the LT (S61), the writing rule decision unit 431A executes the P rule decision process (storage) (S62) and decides whether or not writing is allowed based on a result of execution (S63). As a result of its decision, if writing is allowed (Yes in S63), the writing data generation unit 432A acquires the content from the content database 412A (S64) and converts the acquired content into the media content format (S65). Next, the writing data generation unit 432A converts the usage right contained in the LT to a media usage right format (S66). Then, when the format conversion is completed, the writing data generation unit 432A writes the format-converted content and the usage right to an external media with the rule specified in the P rule (S67). Contrary to this, if writing is not allowed (No in S63), it is reported to the plug-in control unit 419A.

When the writing process performed by the storage plug-in 43 is completed, the LT control/update unit 418 deletes the LT (S57) and terminates the writing process. Also, if writing is unable with the storage plug-in 43 (No in S63), the plug-in control unit 419A terminates the content writing process.

Figure 53:
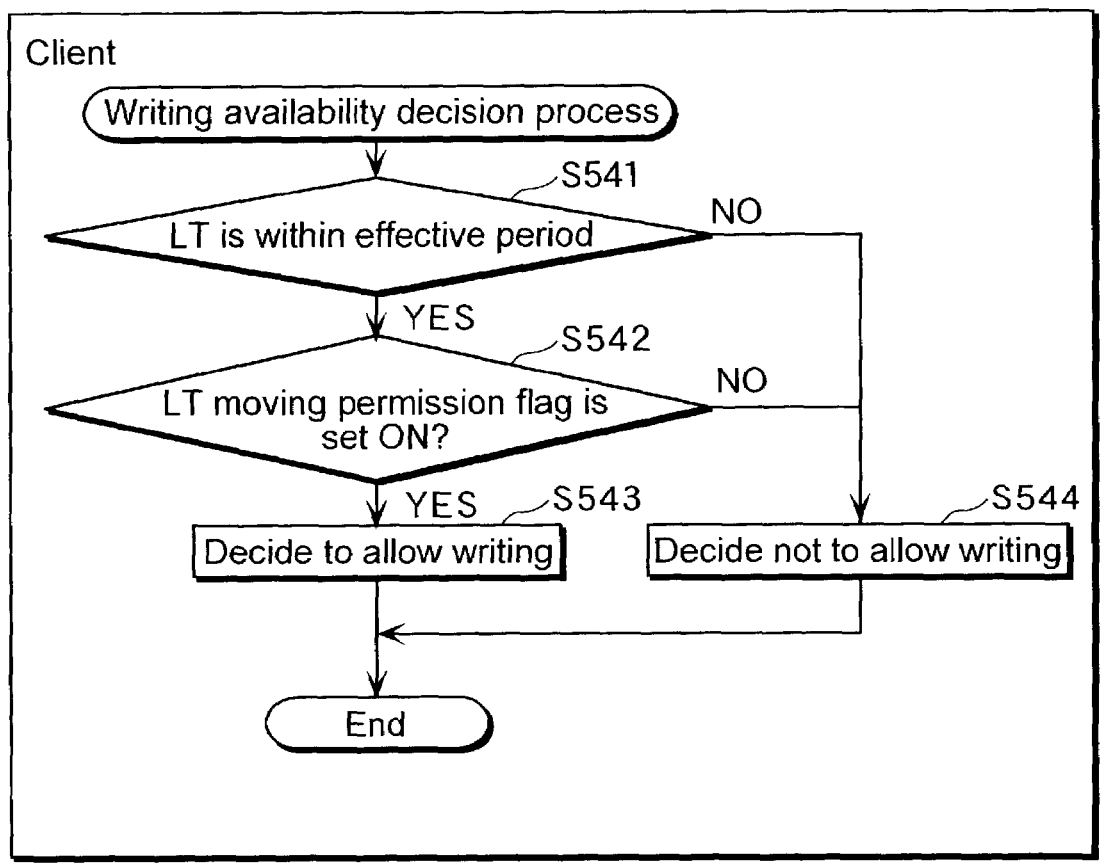
FIG. 53 is a flow chart that shows a sub-routine of the writing availability decision process shown in FIG. 52.

FIG. 53 is a flow chart that shows a sub-routine of the writing availability decision process (S54) shown in FIG. 52.

In the sub-routine of this reproduction availability decision process, the content usage availability decision unit 418A, at first, decides whether or not the LT is within the effective period (S541). If the LT is within the effective period (Yes in S541), the content usage availability decision unit 418A decides whether or not an LT moving permission flag in the LT specified by the user is set on (S542). As a result of its decision, if the LT moving permission flag is set on (Yes in S542), the content usage availability decision unit 418A decides writing is allowed (S543), terminates this reproduction availability decision process and returns to the main routine shown in FIG. 52.

Contrary to this, if the LT is not within the effective period (No in S541), or if the LT moving permission flag is not set on (No in S542), the content usage availability decision unit 418A decides writing is not allowed (S544), terminates this reproduction availability decision process and returns to the main routine shown in FIG. 52.

By doing so, whether writing is allowed or not allowed can be judged appropriately.

Figure 54:
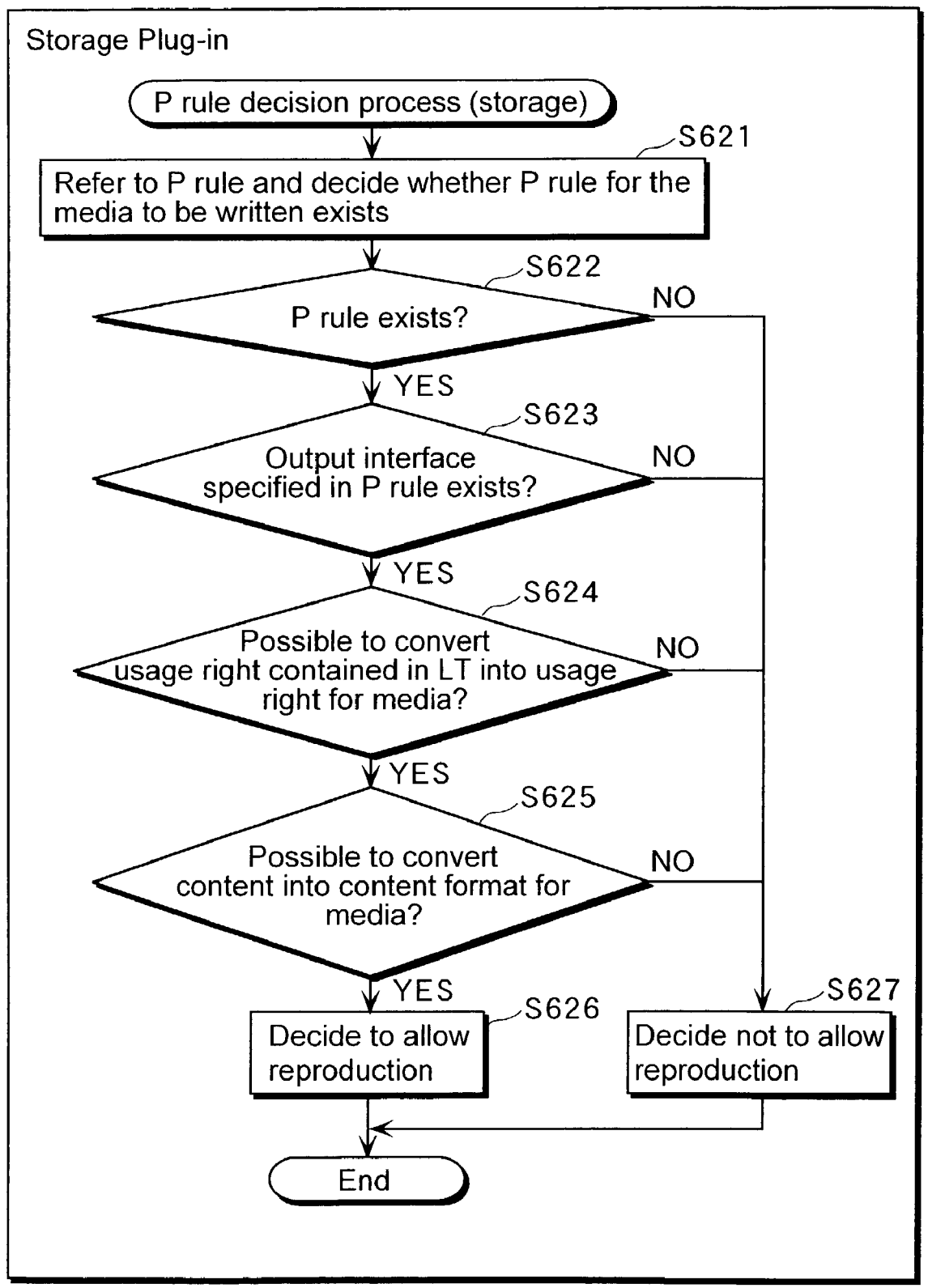
FIG. 54 is a flow chart that shows a sub-routine of the P rule decision process (storage) shown in FIG. 52.

FIG. 54 is a flow chart that shows a sub-routine of the P rule decision process (storage) (S62) shown in FIG. 52.

In the sub-routine of this P rule decision process, the writing rule decision unit 431A, at first, refers to the P rule (for example, there is P rule available for SD card, if it is to be written on the SD card), and decides whether or not there is a P rule for the media to be written on (S621). If there is a P rule (Yes in S622), the writing rule decision unit 431A decides whether or not there is an output interface specified in the P rule (S623). As a result of its decision, if there is the output interface specified in the P rule (Yes in S623), the writing rule decision unit 431A decides whether or not the usage right contained in the LT can be converted into the usage right for media (S624). For example, in a case such as the external media only supports ∞, but the right in the LT indicates a limited number of times, it is interpreted that writing is not allowed. If the usage right can be converted (Yes in S624), the writing rule decision unit 431A decides whether the content can be converted into the content format for media (S625).

If a format of the content can be converted (Yes in S625), the writing rule decision unit 431A decides writing is not possible (S626), terminates this P rule decision process and returns to the main routine shown in FIG. 52. Contrary to this, if there is no P rule (No in S622), if there is no output interface specified in the P rule (No in S623), if the usage rule cannot be converted into the usage right for media (No in S624), or if the content cannot be converted into the content format for media (No in S625), the writing rule decision unit 431A decides writing is not possible (S627), terminates this P rule decision process and returns to the main routine shown in FIG. 52.

Such processes in FIGS. 52 to 54 can execute an appropriate content writing process.

In an LT issuance request 70 of this fourth embodiment, the client capability is supposed to be notified. As a derivation of this example, the client capability may be pre-registered to the user information database when the user terminal is purchased, etc. so that the LT immediate consumption flag can be set based on the client capability that is pre-registered to the user information database when there is an LT issuance request.

Also, SAC is created when the server is accessed. At the time of its creation, a certificate containing the terminal ID of the user terminal and client capability, etc. is sent to the server. If there is an LT issuance request, the LT immediate consumption flag may be set based on the client capability written on the certificate.

Moreover, in this fourth embodiment, the content is distributed from the content distribution server, whereas the content may be distributed from the usage rule control server.

In short, the content distribution server and the usage rule control server may be identical.

INDUSTRIAL APPLICABILITY

As mentioned above, the content management system related to the present invention consists of a server device and a terminal device. This server device may be used as a computer device that distributes license information per content, and the terminal device may be used as a computer device such as a set top box, a personal computer, a digital television, a printer, and a mobile phone that receives the license information.

The invention claimed is:

1. A content usage management system comprising:
a first terminal device for sending a license request comprising terminal capability information indicating a capability of said first terminal device with regard to content usage control, said first terminal device including a secure clock, and the terminal capability information including information indicating that said first terminal device includes a secure clock;
a second terminal device for sending a license request comprising terminal capability information indicating a capability of said second terminal device with regard to content usage control, said second terminal device not including a secure clock, and the terminal capability information including information indicating that said second terminal device does not include a secure clock; and
a server device for managing a usage rule of a user, receiving the terminal capability information from the first and second terminal devices, generating a first license ticket including part or all of the usage rule for processing content based on the terminal capability information sent from said first terminal device, sending the first license ticket to said first terminal device, generating a second license ticket including: part or all of the usage rule for processing content; a content identification; and a license ticket status flag set to indicate that the license information must be consumed upon receipt without being written on a recording medium based on the terminal capability information sent from said second terminal device, which indicates that the second terminal device does not include a secure clock, and sending the second license ticket to said second terminal device;
wherein said first terminal device controls content usage in accordance with the usage rule included in the first license ticket; and
said second terminal device determines the status of the license ticket status flag in the second license ticket and controls content usage, in accordance with the usage rule included in the second license ticket, thereby immediately executing the content identified by the content identification in response to the license ticket status flag being set to indicate that the license ticket must be consumed upon receipt without being written on a recording medium.

2. The content usage management system according to claim 1, wherein said first terminal device controls content usage based on the first license ticket held on said first terminal device, and requests said server device to send the first license ticket to said first terminal device.

3. The content usage management system according to claim 1, wherein said server device generates different license tickets even from the same usage rule based on license information generation control information that controls generation of the license.

4. The content usage management system according to claim 1, wherein said second terminal device controls content usage based on the second license ticket held on said second terminal device, and for requesting said server device to send the second license ticket to said second terminal device.

5. A content usage management system comprising:
a first terminal device for sending a license request comprising terminal capability information indicating a capability of said first terminal device with regard to content usage control, said first terminal device including a storage unit for a secure recording medium, and the terminal capability information including information indicating that said first terminal device includes a storage unit for a secure recording medium;
a second terminal device for sending a license request comprising terminal capability information indicating a capability of said second terminal device with regard to content usage control, said second terminal device not including a storage unit for a secure recording medium, and the terminal capability information including information indicating that said second terminal device does not include a storage unit for a secure recording medium;
a server device for managing a usage rule of a user, receiving the terminal capability information from the first and second terminal devices, generating a first license ticket including part or all of the usage rule for processing content based on the terminal capability information sent from said first terminal device, sending the first license ticket to said first terminal device, generating a second license ticket including: part or all of the usage rule for processing content; a content identification; and a license ticket status flag set to indicate that the license information must be consumed upon receipt without being written on a recording medium based on the terminal capability information sent from said second terminal device, and sending the second license ticket to said second terminal device;
wherein said first terminal device controls content usage in accordance with the usage rule included in the first license ticket; and
said second terminal device determines the status of the license ticket status flag in the second license ticket and controls content usage, in accordance with the usage rule included in the second license ticket, thereby immediately executing the content identified by the content identification in response to the license ticket status flag being set to indicate that the license ticket must be consumed upon receipt without being written on a recording medium.

6. The content usage management system according to claim 5, wherein said first terminal device controls content usage based on the first license ticket held on said first terminal device, and for requesting said server device to send the first license ticket to said first terminal device.

7. The content usage management system according to claim 5, wherein said server device generates different license information even from the same usage rule based on license information generation control information that controls generation of the license information.

8. A content usage management method for a system that includes a first terminal device including a secure clock, a second terminal device not including a secure clock, and a server device managing usage of digital content on the terminal device,
wherein, in the first terminal device, said method comprises sending a license request comprising terminal capability information indicating a capability of the first terminal device with regard to content usage control, the terminal capability information including information indicating that the first terminal device includes a secure clock;
wherein, in the second terminal device, said method comprises sending a license request comprising terminal capability information indicating a capability of the second terminal device with regard to content usage control, the terminal capability information including information indicating that the second terminal device does not include a secure clock;
wherein, in the server device, said method comprises managing a usage rule of a user, receiving the terminal capability information from the first and second terminal devices, generating a first license ticket including part or all of the usage rule for processing content based on the terminal capability information sent from the first terminal device, sending the first license ticket to the first terminal device, generating a second license ticket including: part or all of the usage rule for processing content; a content identification; and a license ticket status flag set to indicate that the license ticket must be consumed upon receipt without being written on a recording medium based on the terminal capability information sent from the second terminal device, and sending the second license ticket to the second terminal device;
wherein, in the first terminal device, said method further comprises controlling content usage in accordance with the usage rule included in the first license ticket; and
in the second terminal device, said method further comprises, determining the status of the license ticket status flag in the second license ticket and controlling content usage, in accordance with the usage rule included in the second license ticket, thereby immediately executing the content identified by the content identification in response to the license ticket status flag being set to indicate that the license ticket must be consumed upon receipt without being written on a recording medium.

* * * * *

UNITED STATES PATENT AND TRADEMARK OFFICE
CERTIFICATE OF CORRECTION

PATENT NO. : 7,395,245 B2
APPLICATION NO. : 10/161673
DATED : July 1, 2008
INVENTOR(S) : Ryuichi Okamoto et al.

Page 1 of 1

It is certified that error appears in the above-identified patent and that said Letters Patent is hereby corrected as shown below:

In column 43, claim 3, line 3, please add the term "ticket" after the term "license".

Signed and Sealed this

Sixth Day of January, 2009

JON W. DUDAS
*Director of the United States Patent and Trademark Office*